United States Patent
Curtis et al.

(10) Patent No.: US 9,763,048 B2
(45) Date of Patent: Sep. 12, 2017

(54) SECONDARY INDICATIONS OF USER LOCATIONS AND USE THEREOF BY A LOCATION-BASED SERVICE

(75) Inventors: Scott Curtis, Durham, NC (US); Steven L. Petersen, Los Gatos, CA (US); Sean T. Purdy, Durham, NC (US)

(73) Assignee: Waldeck Technology, LLC, Wilmington, DE (US)

(*) Notice: Subject to any disclaimer, the term of this patent is extended or adjusted under 35 U.S.C. 154(b) by 1030 days.

(21) Appl. No.: 12/840,579

(22) Filed: Jul. 21, 2010

(65) Prior Publication Data
US 2012/0046049 A1  Feb. 23, 2012

Related U.S. Application Data

(60) Provisional application No. 61/227,192, filed on Jul. 21, 2009.

(51) Int. Cl.
*H04W 4/02* (2009.01)

(52) U.S. Cl.
CPC .................................. *H04W 4/025* (2013.01)

(58) Field of Classification Search
CPC ....... H04W 4/023; H04W 4/02; H04W 4/025; H04W 4/04; H04W 64/00; H04W 4/206; H04W 4/028
USPC .... 455/456.1, 456.3, 456.5, 456.6, 466, 558
See application file for complete search history.

(56) References Cited

U.S. PATENT DOCUMENTS

| | | |
|---|---|---|
| 5,539,232 A | 7/1996 | Nakanishi et al. |
| 6,204,844 B1 | 3/2001 | Fumarolo et al. |
| 6,240,069 B1 | 5/2001 | Alperovich et al. |
| 6,490,587 B2 | 12/2002 | Easty et al. |
| 6,529,136 B2 | 3/2003 | Cao et al. |
| 6,708,172 B1 | 3/2004 | Wong et al. |
| 6,819,783 B2 | 11/2004 | Goldberg et al. |

(Continued)

FOREIGN PATENT DOCUMENTS

| | | |
|---|---|---|
| EP | 1338966 A2 | 8/2003 |
| EP | 1463354 | 12/2005 |

(Continued)

OTHER PUBLICATIONS

"CitySense—Powered by Sense Networks," at <http://www.citysense.com/moreinfo.php>, copyright 2008, Sense Networks, printed Sep. 8, 2009, 2 pages.

(Continued)

*Primary Examiner* — Dinh P Nguyen

(57) ABSTRACT

Systems and methods are disclosed for obtaining secondary indications of locations of users for use by a location-based service. In one embodiment, a secondary indication of a location of one or more users is obtained from a source of secondary indications of locations of users. The secondary indication includes a location of the one or more users and timing information defining when the one or more users were or will be located at the location. The secondary indication of the location of the one or more users is then stored and utilized to provide the location-based service. In one embodiment, the secondary indication is utilized to store historical aggregate user profile data by location and/or to provide aggregate user profile data for crowds of users formed via a spatial crowd formation process.

23 Claims, 30 Drawing Sheets

(56) References Cited

U.S. PATENT DOCUMENTS

| | | |
|---|---|---|
| 6,819,919 B1 | 11/2004 | Tanaka |
| 6,968,179 B1 | 11/2005 | De Vries |
| 6,987,885 B2 | 1/2006 | Gonzalez-Banos et al. |
| 7,116,985 B2 | 10/2006 | Wilson et al. |
| 7,117,254 B2 | 10/2006 | Lunt et al. |
| 7,123,918 B1 | 10/2006 | Goodman |
| 7,158,798 B2 | 1/2007 | Lee et al. |
| 7,236,739 B2 | 6/2007 | Chang |
| 7,247,024 B2 | 7/2007 | Bright et al. |
| 7,249,123 B2 | 7/2007 | Elder et al. |
| 7,272,357 B2 | 9/2007 | Nishiga et al. |
| 7,280,822 B2 | 10/2007 | Fraccaroli |
| 7,398,081 B2 | 7/2008 | Moran |
| 7,418,268 B1 | 8/2008 | Cabano et al. |
| 7,423,580 B2 | 9/2008 | Markhovsky et al. |
| 7,444,655 B2 | 10/2008 | Sardera |
| 7,509,131 B2 | 3/2009 | Krumm et al. |
| 7,558,404 B2 | 7/2009 | Ma et al. |
| 7,620,404 B2 | 11/2009 | Chesnais et al. |
| 7,680,959 B2 | 3/2010 | Svendsen |
| 7,787,886 B2 | 8/2010 | Markhovsky et al. |
| 8,010,601 B2 | 8/2011 | Jennings et al. |
| 8,208,943 B2 | 6/2012 | Petersen et al. |
| 2001/0013009 A1 | 8/2001 | Greening et al. |
| 2001/0036224 A1* | 11/2001 | Demello et al. ............. 375/220 |
| 2002/0010628 A1 | 1/2002 | Burns |
| 2002/0049690 A1 | 4/2002 | Takano |
| 2002/0086676 A1 | 7/2002 | Hendrey et al. |
| 2002/0087335 A1 | 7/2002 | Meyers et al. |
| 2002/0111813 A1 | 8/2002 | Capps |
| 2003/0005056 A1 | 1/2003 | Yamamoto et al. |
| 2003/0006911 A1* | 1/2003 | Smith et al. ................. 340/988 |
| 2004/0009750 A1 | 1/2004 | Beros et al. |
| 2004/0025185 A1 | 2/2004 | Goci et al. |
| 2004/0181668 A1 | 9/2004 | Blew et al. |
| 2004/0192331 A1 | 9/2004 | Gorday et al. |
| 2005/0038876 A1 | 2/2005 | Chaudhuri |
| 2005/0070298 A1 | 3/2005 | Caspi et al. |
| 2005/0143097 A1* | 6/2005 | Wilson et al. ............. 455/456.3 |
| 2005/0174975 A1 | 8/2005 | Mgrdechian et al. |
| 2005/0210387 A1 | 9/2005 | Alagappan et al. |
| 2005/0231425 A1 | 10/2005 | Coleman et al. |
| 2006/0046743 A1 | 3/2006 | Mirho |
| 2006/0085419 A1 | 4/2006 | Rosen |
| 2006/0161599 A1 | 7/2006 | Rosen |
| 2006/0166679 A1 | 7/2006 | Karaoguz et al. |
| 2006/0195361 A1 | 8/2006 | Rosenberg |
| 2006/0256959 A1 | 11/2006 | Hymes |
| 2006/0270419 A1 | 11/2006 | Crowley et al. |
| 2007/0005419 A1 | 1/2007 | Horvitz et al. |
| 2007/0015518 A1 | 1/2007 | Winter et al. |
| 2007/0030824 A1 | 2/2007 | Ribaudo et al. |
| 2007/0032242 A1 | 2/2007 | Goodman |
| 2007/0073937 A1 | 3/2007 | Feinberg et al. |
| 2007/0075898 A1 | 4/2007 | Markhovsky et al. |
| 2007/0135138 A1 | 6/2007 | Brown et al. |
| 2007/0142065 A1 | 6/2007 | Richey et al. |
| 2007/0149214 A1 | 6/2007 | Walsh et al. |
| 2007/0150444 A1 | 6/2007 | Chesnais et al. |
| 2007/0167174 A1 | 7/2007 | Halcrow et al. |
| 2007/0174243 A1 | 7/2007 | Fritz |
| 2007/0179863 A1 | 8/2007 | Stoll |
| 2007/0203644 A1 | 8/2007 | Thota et al. |
| 2007/0210937 A1 | 9/2007 | Smith et al. |
| 2007/0218900 A1 | 9/2007 | Abhyanker |
| 2007/0255785 A1 | 11/2007 | Hayashi et al. |
| 2007/0282621 A1 | 12/2007 | Altman et al. |
| 2007/0290832 A1 | 12/2007 | Kalinichenko et al. |
| 2008/0016018 A1 | 1/2008 | Malik |
| 2008/0016205 A1 | 1/2008 | Svendsen |
| 2008/0076418 A1 | 3/2008 | Beyer, Jr. |
| 2008/0077595 A1 | 3/2008 | Leebow |
| 2008/0086741 A1 | 4/2008 | Feldman et al. |
| 2008/0097999 A1 | 4/2008 | Horan |
| 2008/0106599 A1 | 5/2008 | Liu et al. |
| 2008/0113674 A1 | 5/2008 | Baig |
| 2008/0118106 A1 | 5/2008 | Kilambi et al. |
| 2008/0140650 A1 | 6/2008 | Stackpole |
| 2008/0146250 A1 | 6/2008 | Aaron |
| 2008/0155080 A1 | 6/2008 | Marlow et al. |
| 2008/0182563 A1 | 7/2008 | Wugofski et al. |
| 2008/0182591 A1 | 7/2008 | Krikorian |
| 2008/0183814 A1 | 7/2008 | Sanghavi |
| 2008/0188261 A1 | 8/2008 | Arnone |
| 2008/0201225 A1 | 8/2008 | Maharajh et al. |
| 2008/0222295 A1 | 9/2008 | Robinson et al. |
| 2008/0227473 A1 | 9/2008 | Haney |
| 2008/0242317 A1 | 10/2008 | Abhyanker |
| 2008/0248815 A1* | 10/2008 | Busch ........................ 455/456.5 |
| 2008/0250312 A1 | 10/2008 | Curtis |
| 2008/0288355 A1 | 11/2008 | Rosen |
| 2008/0294556 A1* | 11/2008 | Anderson ........................ 705/44 |
| 2008/0306826 A1 | 12/2008 | Kramer et al. |
| 2008/0318597 A1 | 12/2008 | Berns et al. |
| 2009/0023410 A1 | 1/2009 | Ghosh |
| 2009/0024315 A1 | 1/2009 | Scheibe |
| 2009/0030778 A1* | 1/2009 | Zapata et al. ................... 705/10 |
| 2009/0030999 A1 | 1/2009 | Gatzke et al. |
| 2009/0047972 A1 | 2/2009 | Neeraj |
| 2009/0076894 A1 | 3/2009 | Bates et al. |
| 2009/0082038 A1* | 3/2009 | McKiou et al. ........... 455/456.6 |
| 2009/0094527 A1* | 4/2009 | Parupudi et al. ............. 715/744 |
| 2009/0104920 A1* | 4/2009 | Moon et al. ................ 455/456.3 |
| 2009/0112467 A1 | 4/2009 | Jiang et al. |
| 2009/0115570 A1 | 5/2009 | Cusack, Jr. |
| 2009/0115617 A1 | 5/2009 | Sano et al. |
| 2009/0125230 A1 | 5/2009 | Sullivan |
| 2009/0132365 A1 | 5/2009 | Gruenhagen et al. |
| 2009/0132652 A1 | 5/2009 | Athale et al. |
| 2009/0138346 A1 | 5/2009 | Kalaboukis et al. |
| 2009/0144211 A1 | 6/2009 | O'Sullivan et al. |
| 2009/0150501 A1 | 6/2009 | Davis et al. |
| 2009/0157693 A1 | 6/2009 | Palahnuk |
| 2009/0164431 A1 | 6/2009 | Zivkovic et al. |
| 2009/0164459 A1 | 6/2009 | Jennings et al. |
| 2009/0164503 A1 | 6/2009 | Jung et al. |
| 2009/0201896 A1 | 8/2009 | Davis et al. |
| 2009/0210480 A1 | 8/2009 | Sivasubramaniam et al. |
| 2009/0234711 A1 | 9/2009 | Ramer et al. |
| 2009/0286550 A1* | 11/2009 | Weinroth .................... 455/456.1 |
| 2009/0287783 A1 | 11/2009 | Beare et al. |
| 2009/0299990 A1 | 12/2009 | Setlur et al. |
| 2009/0307263 A1 | 12/2009 | Skibiski et al. |
| 2010/0004857 A1 | 1/2010 | Pereira et al. |
| 2010/0004997 A1* | 1/2010 | Mehta et al. ............... 705/14.66 |
| 2010/0017261 A1 | 1/2010 | Evans et al. |
| 2010/0020776 A1 | 1/2010 | Youssef et al. |
| 2010/0030578 A1 | 2/2010 | Siddique et al. |
| 2010/0030740 A1 | 2/2010 | Higgins et al. |
| 2010/0042511 A1 | 2/2010 | Sundaresan et al. |
| 2010/0064007 A1 | 3/2010 | Randall |
| 2010/0094878 A1 | 4/2010 | Soroca et al. |
| 2010/0103277 A1 | 4/2010 | Leebow |
| 2010/0130226 A1 | 5/2010 | Arrasvuori et al. |
| 2010/0130233 A1* | 5/2010 | Parker ........................ 455/456.3 |
| 2010/0197318 A1 | 8/2010 | Petersen et al. |
| 2010/0197319 A1 | 8/2010 | Petersen et al. |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0203953 A1* | 8/2010 | Alderucci et al. ............. 463/25 |
| 2011/0136506 A1 | 6/2011 | Stewart |
| 2012/0003998 A1* | 1/2012 | McGary ........................ 455/466 |
| 2012/0041983 A1 | 2/2012 | Jennings |
| 2012/0072495 A1 | 3/2012 | Jennings et al. |

FOREIGN PATENT DOCUMENTS

| | | |
|---|---|---|
| EP | 2151787 A2 | 2/2010 |
| EP | 2154481 A1 | 2/2010 |
| EP | 2166788 A1 | 3/2010 |
| WO | 2007/103886 A2 | 9/2007 |

(56) References Cited

FOREIGN PATENT DOCUMENTS

| WO | WO 2008/000046 | 1/2008 |
|---|---|---|
| WO | WO 2009/039350 | 3/2009 |
| WO | WO 2009/055501 | 4/2009 |
| WO | WO 2009/077655 | 6/2009 |
| WO | 2009/116049 A2 | 9/2009 |
| WO | 2009/126941 A1 | 10/2009 |
| WO | 2010/022185 A1 | 2/2010 |

OTHER PUBLICATIONS

Clarke, Roger and Wigan, Marcus, "You are where you have been," Third Workshop on the Social Implications of National Security, Australia and the New Technologies: Evidence Based Policy in Public Administration, Jul. 23-24, 2008, Canberra, Australia, article 13, pp. 155-172, Eds. Michael, K. and Michael, M.G., copyright 2008, University of Wollongong and authors, 28 pages.
"Loopt—About Us," at <https://loopt.com/loopt/aboutUs.aspx>, from the Internet Archive, dated Jun. 29, 2007, copyright 2007, Loopt, Inc., 1 page.
"Picasa," Wikipedia, at <http://en.wikipedia.org/wiki/Picasa>, from the Internet Archive, dated Feb. 5, 2009, last modified Feb. 4, 2009, printed May 17, 2012, 7 pages.
"Welcome to Facebook!—Facebook," at <http://www.facebook.com/>, copyright 2008, Facebook, printed Jan. 9, 2008, 1 page.
Vigueras, G. et al., "A comparative study of partitioning methods for crowd simulations," Applied Soft Computing, vol. 10, Issue 1, Jan. 2010, received Dec. 20, 2008, received in revised form Jul. 1, 2009, available online Jul. 22, 2009, pp. 225-235, 12 pages.
Oh, Sejin et al., "CAMAR: Context-aware Mobile Augmented Reality in Smart Space," In Proceedings of International Workshop on Ubiquitous Virtual Reality 2009, Bruce Thomas et al. (Eds.), Jan. 15-18, 2009, University of South Australia, Adelaide, Australia, pp. 48-51, 4 pages.
"ConnectingCadence.com—Mapping the social world.," at <http://www.connectingcadence.com/>, found on the Internet Archive, copyright 2008, ConnectingCadence, printed Apr. 28, 2011, 1 page.
Wu et al., "Crowd Flow Segmentation Using a Novel Region Growing Scheme," In Proceedings PCM 2009, 10th Pacific Rim Conference on Multimedia, Bangkok, Thailand, Dec. 15-18, 2009, pp. 898-907, 10 pages.
Benford, S. et al., "Crowded Collaborative Virtual Environments," Proceedings of the SIGCHI Conference on Human Factors in Computing Systems, Atlanta, Georgia, Mar. 22-27, 1997, 7 pages.
Anciaux, N. et al., "Data Degradation: Making Private Data Less Sensitive Over Time," CIKM 2008, Oct. 26-30, 2008, Napa Valley, California, 2 pages.
Ngai, Wang Kay et al., "Efficient Clustering of Uncertain Data," Proceedings of the Sixth International Conference on Data Mining (ICDM'06), Dec. 18-22, 2006, pp. 436-445, copyright 2006, IEEE, 10 pages.
"Final: OpenID Attribute Exchange 1.0—Final," at <http://openid.net/specs/openid-attribute-exchange-1_0.html>, Dec. 5, 2007, printed May 11, 2012, 11 pages.
Ertoz, L. et al., "Finding Clusters of Different Sizes, Shapes, and Densities in Noisy, High Dimensional Data," Proceedings of the 2003 SIAM International Conference on Data Mining (SDM 2003), Jan. 24, 2003, pp. 47-58, San Francisco, CA, 12 pages.
"Fire Eagle," at <http://fireeagle.yahoo.net>, copyright 2007-2011, Yahoo! Inc., printed Apr. 28, 2011, 2 pages.
"Flickr Shapefiles Public Datatet 1.0," posted by aaron on May 21, 2009, found at <http://code.flickr.com/blog/2009/05/21/flickr-shapefiles-public-dataset-10/>, Yahoo! Inc., printed Jul. 13, 2011, 5 pages.
"Friend of a Friend (FOAF) project," at <http://www.foaf-project.org/>, from the Internet Archive dated May 26, 2008, printed Aug. 10, 2012, 2 pages.
Arrington, M., "I Saw the Future of Social Networking the Other Day," TechCrunch, Apr. 9, 2008, at <http://www.techcrunch.com/2008/04/09/i-saw-the-future-of-social-networking-the-other-day/>, printed May 27, 2009, 28 pages.
Estrin, M., "Is the MySpace crowd lying to marketers?", Oct. 16, 2007, posted at iMedia Connection, at <http://www.imediaconnection.com/content/16993.asp>, copyrighted by iMedia Communications, Inc., printed Apr. 28, 2011, 2 pages.
"About Loopt," at <http://about.loopt.com/>, printed May 3, 2011, 4 pages.
"MobiClique," copyright 2007-2009, Thomson, originally found at <http://www.thlab.net/~apietila/mobiclique/>, printed Oct. 23, 2009, 5 pages.
Abstract, Ratti, C. et al., "Mobile Landscapes: using location data from cell phones for urban analysis," Environment and Planning B: Planning and Design, vol. 33, No. 5, 2006, pp. 727-748, 1 page.
Hardt, D. et al., "OpenID Attribute Exchange 1.0—Final," at <http://openid.net/specs/openid-attribute-exchange-1_0.html>, Dec. 5, 2007, 11 pages.
"OpenID Foundation website," at <http://openid.net>, copyright 2006-2011, OpenID Foundation, printed Apr. 28, 2011, 2 pages.
Quinn, M. et al., "Parallel Implementation of the Social Forces Model," Proceedings of the Second International Conference in Pedestrian and Evacuation Dynamics, Greenwich, England, 2003, pp. 63-74, found at <http://web.engr.oregonstate.edu/~metoyer/docs/parallelPeds.pdf>, 12 pages.
"Plazes—Right Plaze, Right Time," at <http://plazes.com>, copyright 2004-2011, Plazes AG, printed May 3, 2011, 2 pages.
Miller, B. N. et al., "PocketLens: Toward a Personal Recommender System," ACM Transactions on Information Systems, vol. 22, No. 3, Jul. 2004, pp. 437-476, 40 pages.
Cox, L.P. et al., "Presence-Exchanges: Toward Sustainable Presence-Sharing," In Proc. of 7th IEEE Workshop on Mobile Computing Systems and Applications, Apr. 6-7, 2006, Semiahmoo Resort, Washington, pp. 55â€ "60, 6 pages.
"Resource Description Framework (RDF) / W3C Semantic Web Activity," at <http://www.w3.org/RDF/>, from the Internet Archive dated Jul. 30, 2008, printed Aug. 10, 2012, 6 pages.
Abstract, "Self-Organized Pedestrian Crowd Dynamics: Experiments, Simulations, and Design Solutions," by Helbing, D. et al., Transportation Science, vol. 39, Issue 1, Feb. 2005, obtained from ACM Digital Library at <http://portal.acm.org/citation.cfm?id=1247227>, printed Apr. 28, 2011, 2 pages.
"Sense Networks," at <http://www.sensenetworks.com/about_us.php>, copyright 2008-2010, Sense Networks, printed Apr. 28, 2011, 1 page.
"Sense Networks—Machine Learning," at <http://www.sensenetworks.com/machine_learning.php>, copyright 2008-2009, Sense Networks, printed Jan. 12, 2009, 2 pages.
"Sense Networks—Technology," at <http://www.sensenetworks.com/technology.php>, copyright 2008-2009, Sense Networks, printed Jan. 12, 2009, 2 pages.
"Sense Networks—The Minimum Volume Embedding Algorithm," at <http://www.sensenetworks.com/mve_algorithm.php>, copyright 2008-2009, Sense Networks, printed Jan. 12, 2009, 2 pages.
Abstract, "Sensor networks for social networks," by Farry, M.P., Thiesis, Dept. of Electrical Engineering and Computer Science, Massachusetts Institute of Technology, Feb. 2006, obtained from Dspace@MIT, at <http://dspace.mit.edu/handle/1721.1/36764>, printed Apr. 28, 2011, 3 pages.
"Six degrees of separation," at <http://en.wikipedia.org/wiki/Six_degrees_of_separation>, last modified on Apr. 19, 2011, printed Apr. 28, 2011, 11 pages.
Cox et al., "SmokeScreen: Flexible Privacy Controls for Presence-Sharing," Proceedings of the 5th International Conference on Mobile Systems, Applications, and Services (2007) (MobiSys '07), Jun. 11-13, 2007, San Juan, Puerto Rico, 13 pages.
Agostini, A. et al., "Towards Highly Adaptive Services for Mobile Computing," In Proceedings of IFIP TC8 Working Conference on Mobile Information Systems (MOBIS), Sep. 15-17, 2004, Oslo, Norway, Springer, 2004, pp. 121-134, 14 pages.

(56) References Cited

OTHER PUBLICATIONS

"What is LinkedIn?," at <http://www.linkedin.com/static?key=what_is_linkedin&trk=hb_what>, copyright 2011, LinkedIn Corporation, printed Apr. 28, 2011, 1 page.

* cited by examiner

SECONDARY INDICATIONS OF USER LOCATIONS AND USE THEREOF BY A LOCATION-BEsed SERVICE

RELATED APPLICATIONS

This application claims the benefit of provisional patent application Ser. No. 61/227,192, filed Jul. 21, 2009, the disclosure of which is hereby incorporated herein by reference in its entirety.

FIELD OF THE DISCLOSURE

The present disclosure relates to secondary indications of user locations and use thereof by a location-based service.

BACKGROUND

Location-based services typically rely on location updates received for corresponding users from location-aware devices (e.g., mobile phones equipped with Global Positioning System (GPS) receivers) of the users. One issue with such systems is that the users may sometimes forget to carry their location-aware devices or mobile devices of the users may be turned off intentionally or inadvertently. In these situations, the location-based services do not have knowledge of, at least accurate knowledge of, the locations of the users, which results in undesirable results. Another issue is that location-based services are typically starved for data upon initial launch of the location-based services. Specifically, when a new location-based service initially launches, the new location-based service may not yet have a sufficient number of users to provide meaningful results.

SUMMARY

Systems and methods are disclosed for obtaining secondary indications of locations of users for use by a location-based service. In one embodiment, a secondary indication of a location of one or more users is obtained from a source of secondary indications of locations of users. The source of secondary indications may be, for example, a financial institution that provides secondary indications of locations of users based on credit card usage of the users, a source of public records that provides secondary indications of locations of users based on information contained in public records (e.g., newspapers), an electronic invitation service that provides secondary indications of locations of users based on electronic invitations sent to and accepted by the users, or a source of geo-tagged and time-stamped digital images that provides secondary indications of locations of users based on geo-tags and timestamps of digital images in which the users appear. The secondary indication includes a location of the one or more users and timing information defining when the one or more users were or will be located at the location. In one embodiment, the secondary indication also includes information identifying the one or more users that correlates the secondary indication with known user profiles of the one or more users. In another embodiment, the secondary indication also includes user profile data for the one or more users provided by the source of secondary indications. The secondary indication of the location of the one or more users is then stored and utilized by the location-based service. In one embodiment, the secondary indication is utilized to store historical aggregate user profile data by location and/or to provide aggregate user profile data for crowds of users formed via a spatial crowd formation process.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
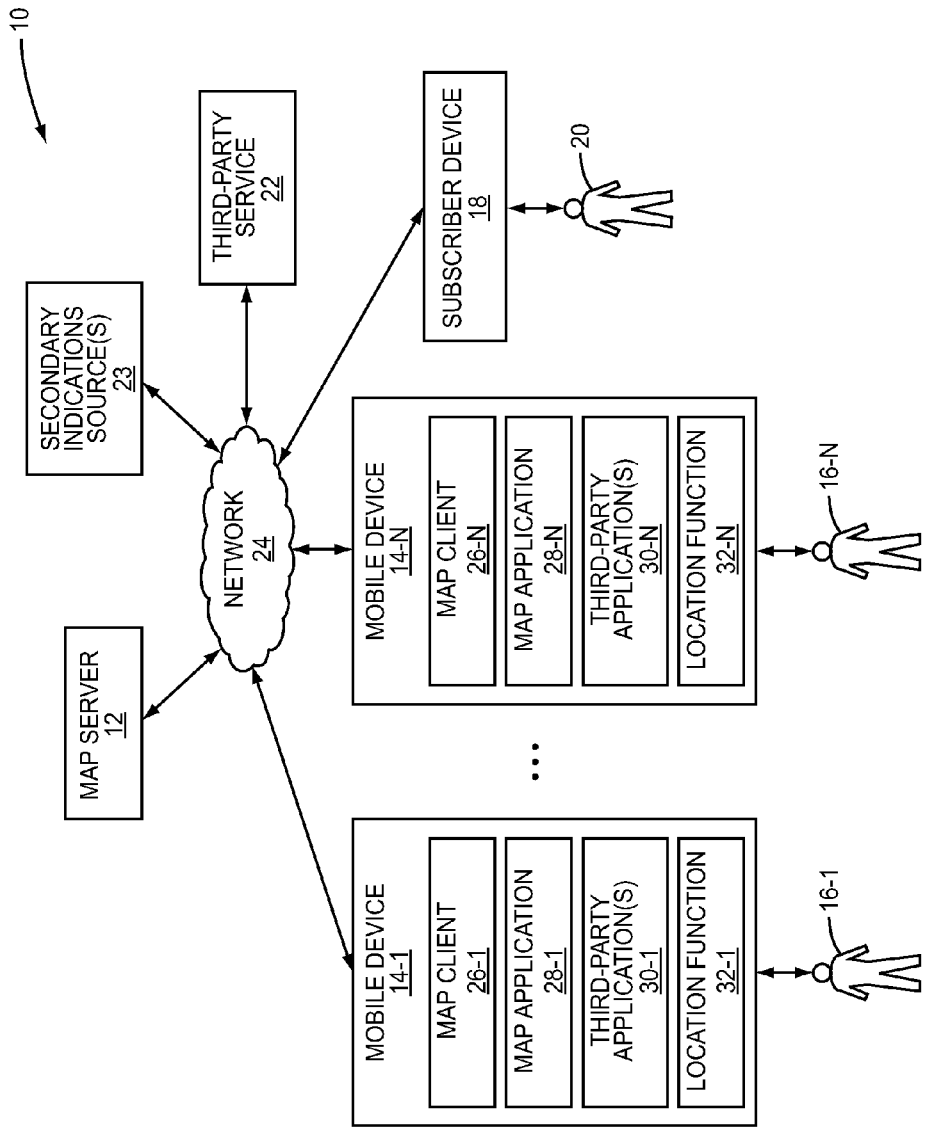
FIG. 1 illustrates a Mobile Aggregate Profile (MAP) system according to one embodiment of the present disclosure.
Figure 6:
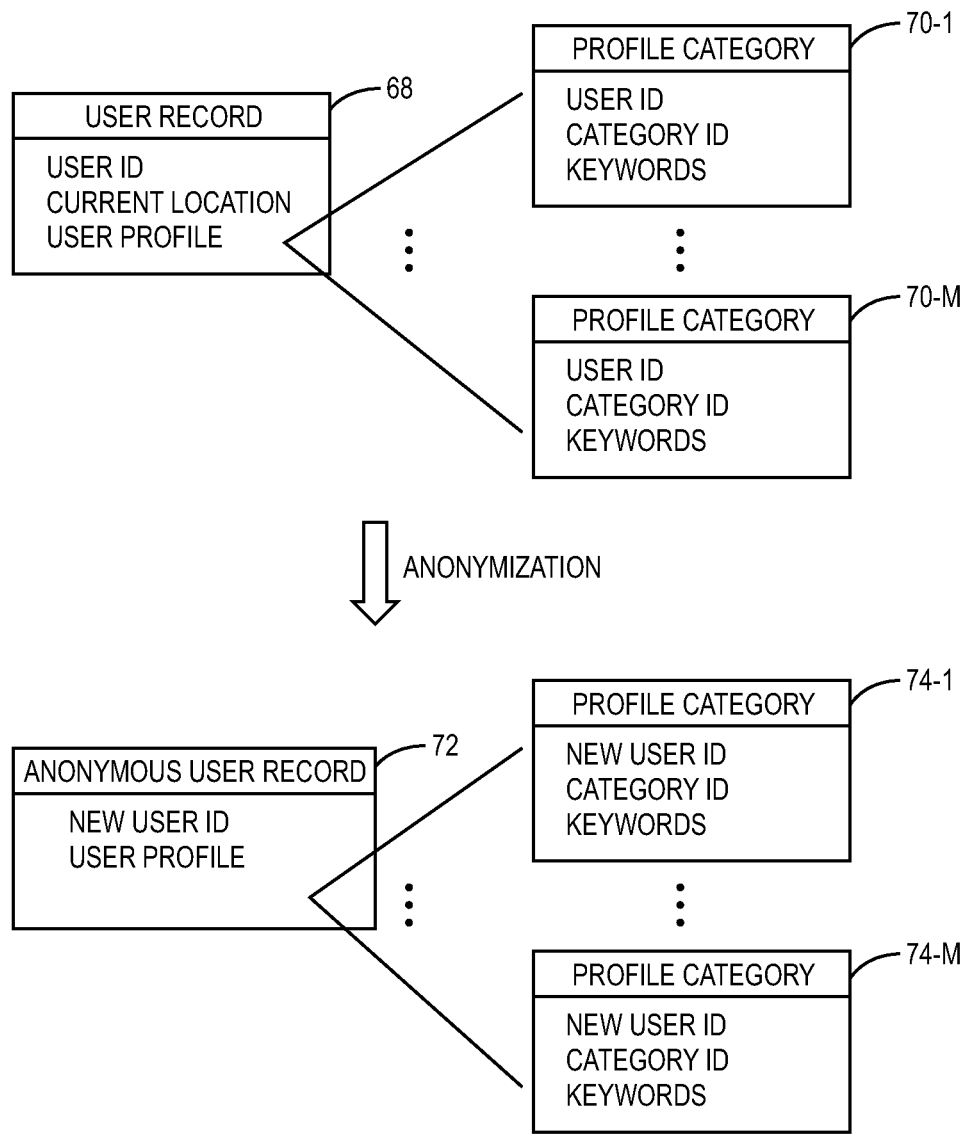
Figure 7:
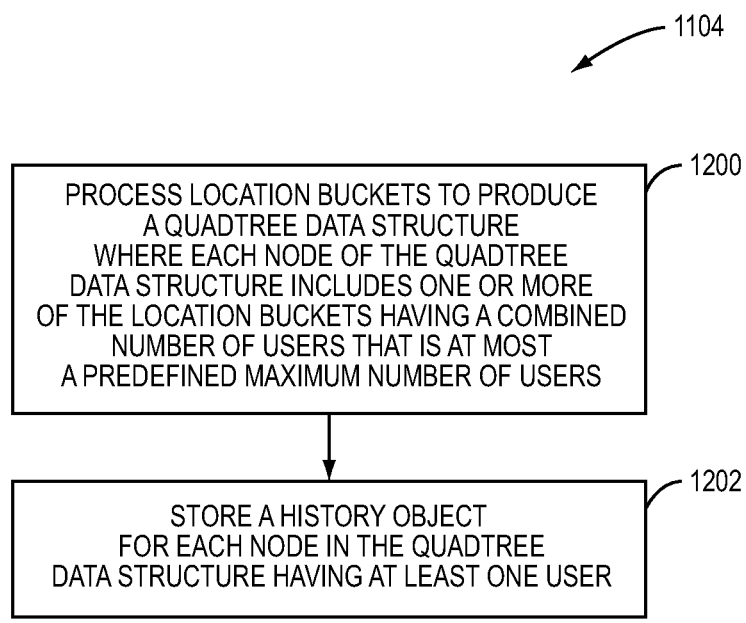
Figure 8:
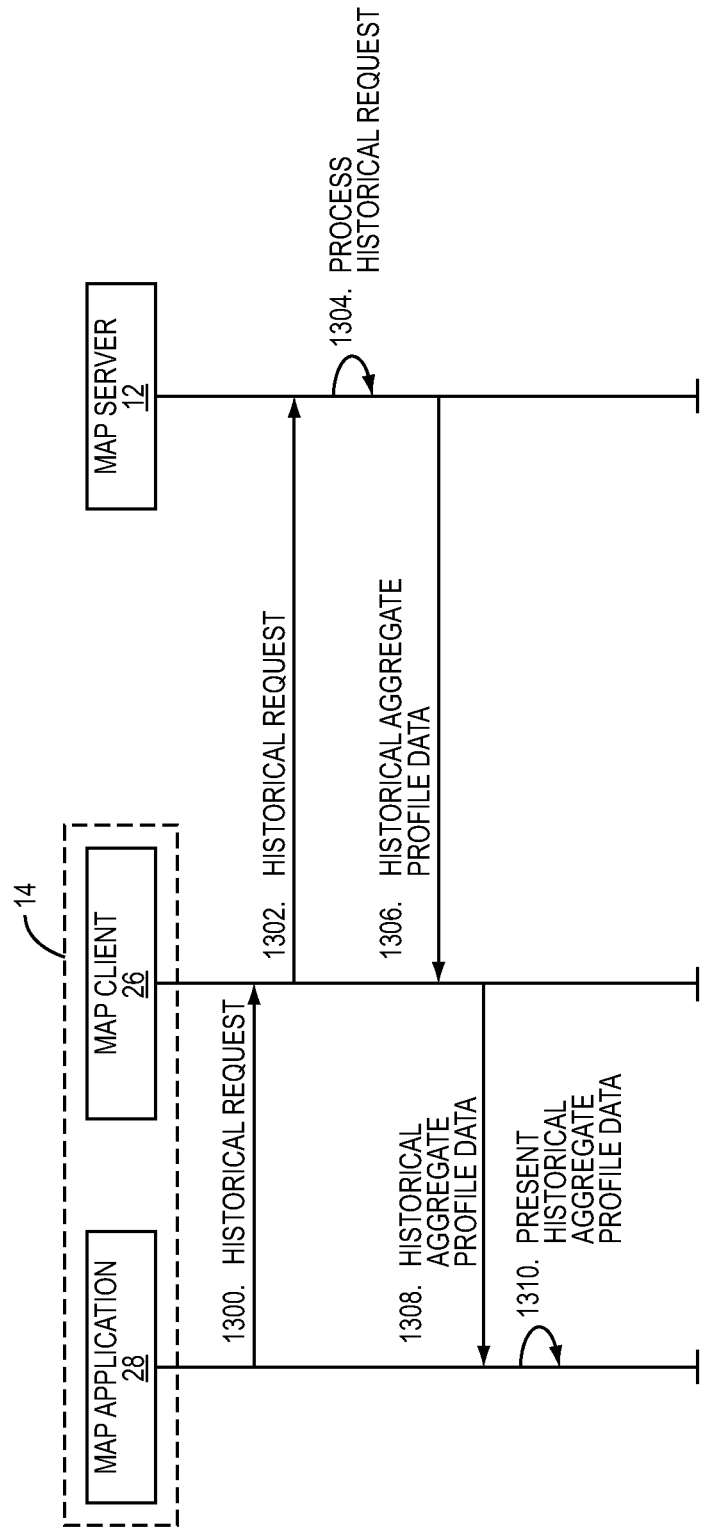
Figure 9:
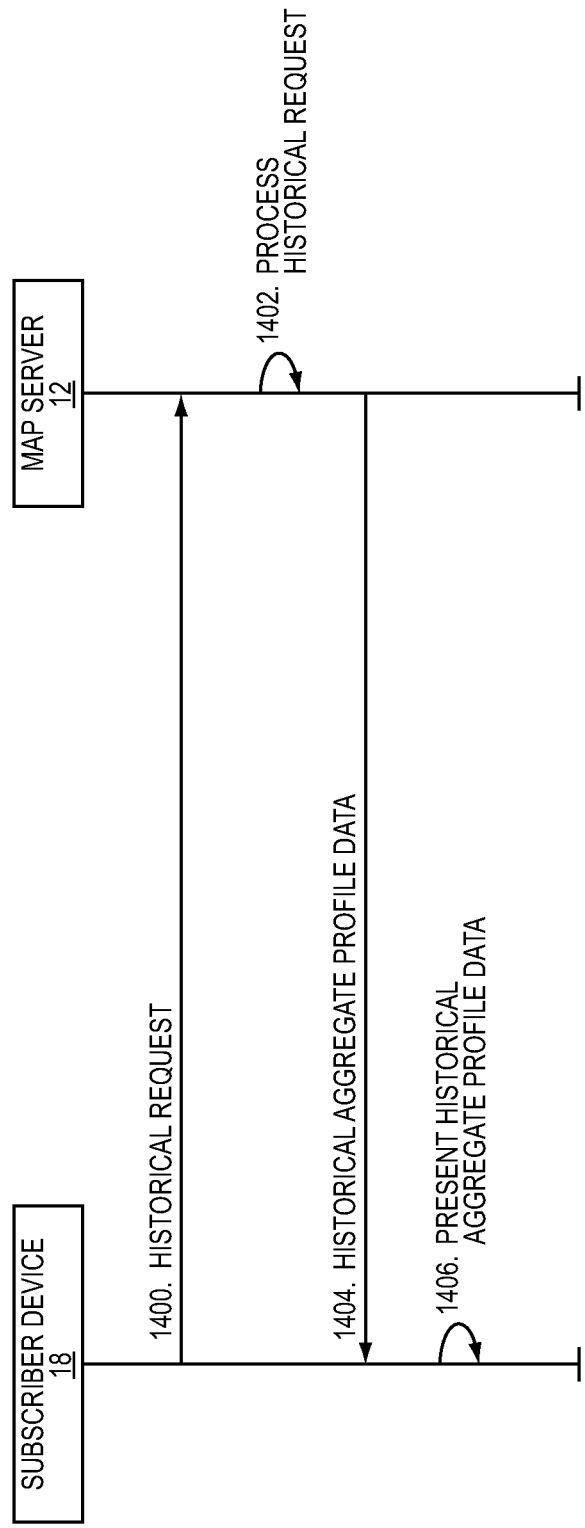
Figure 10:
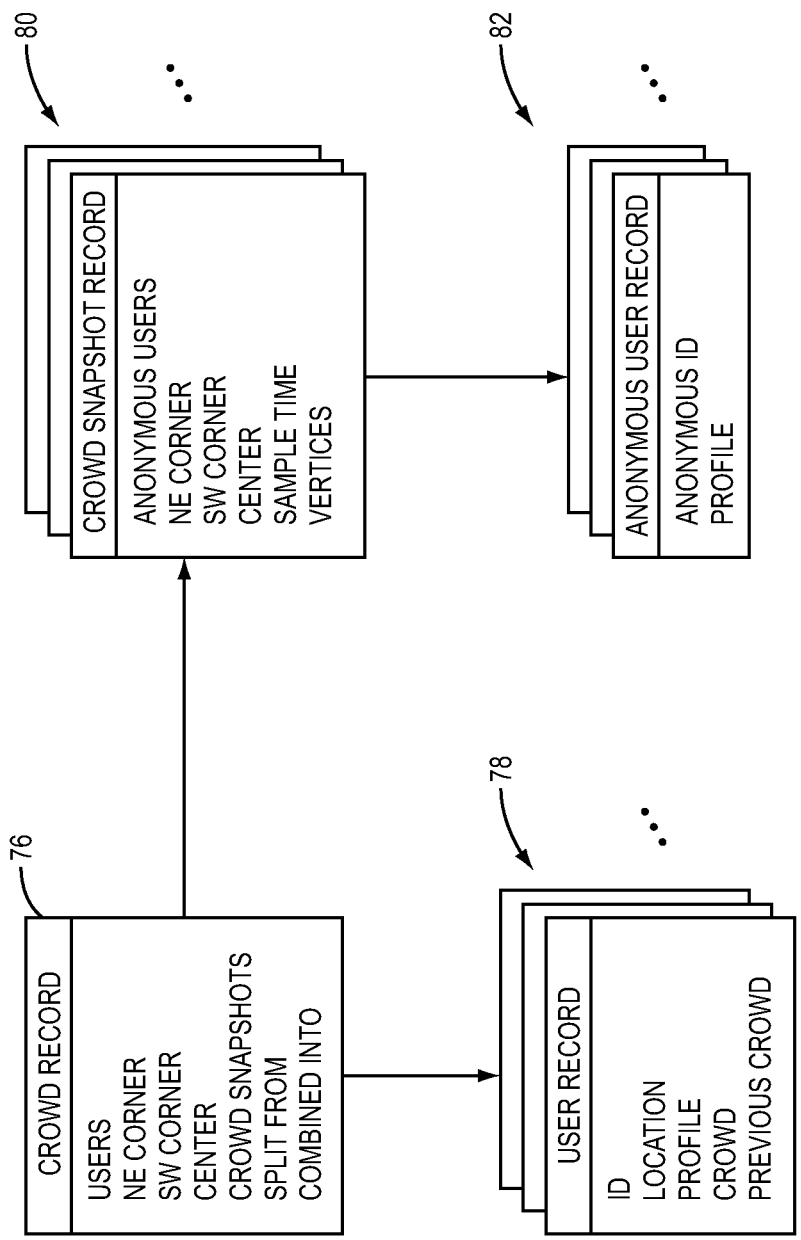
Figure 12:
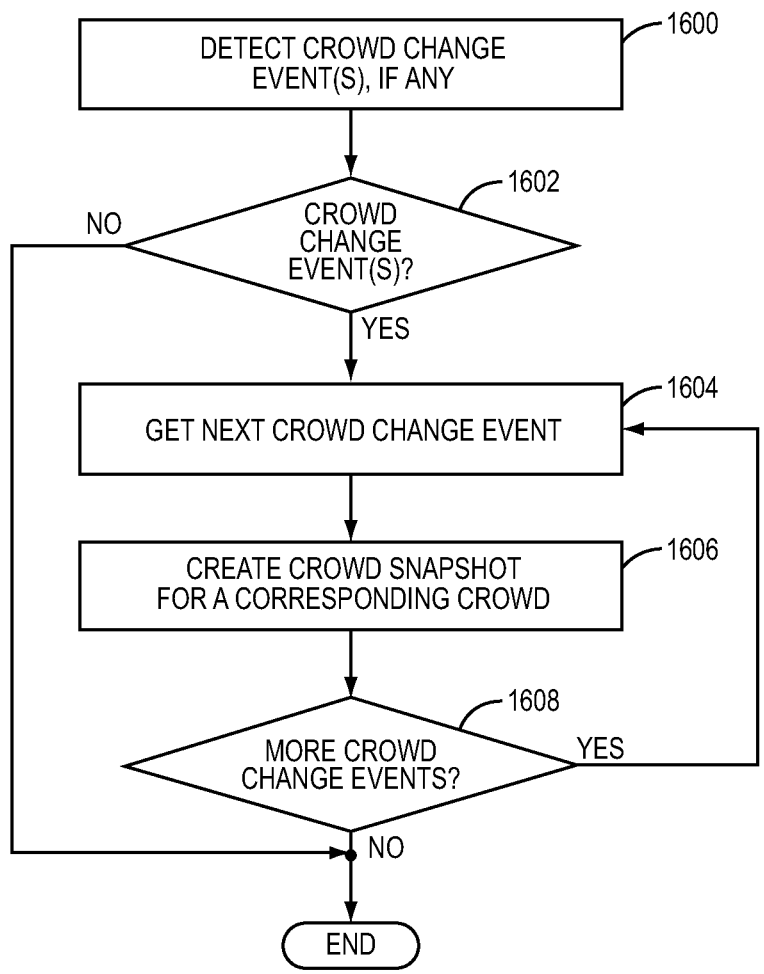
Figure 13:
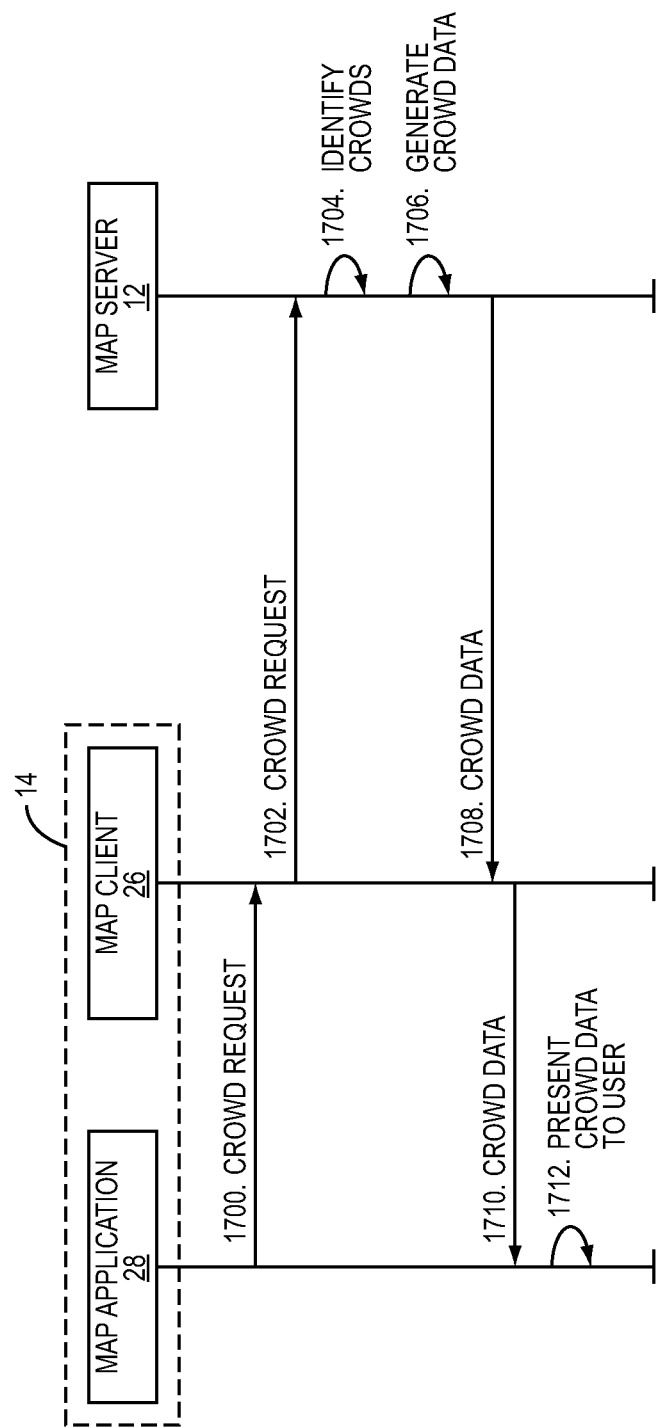
Figure 14:
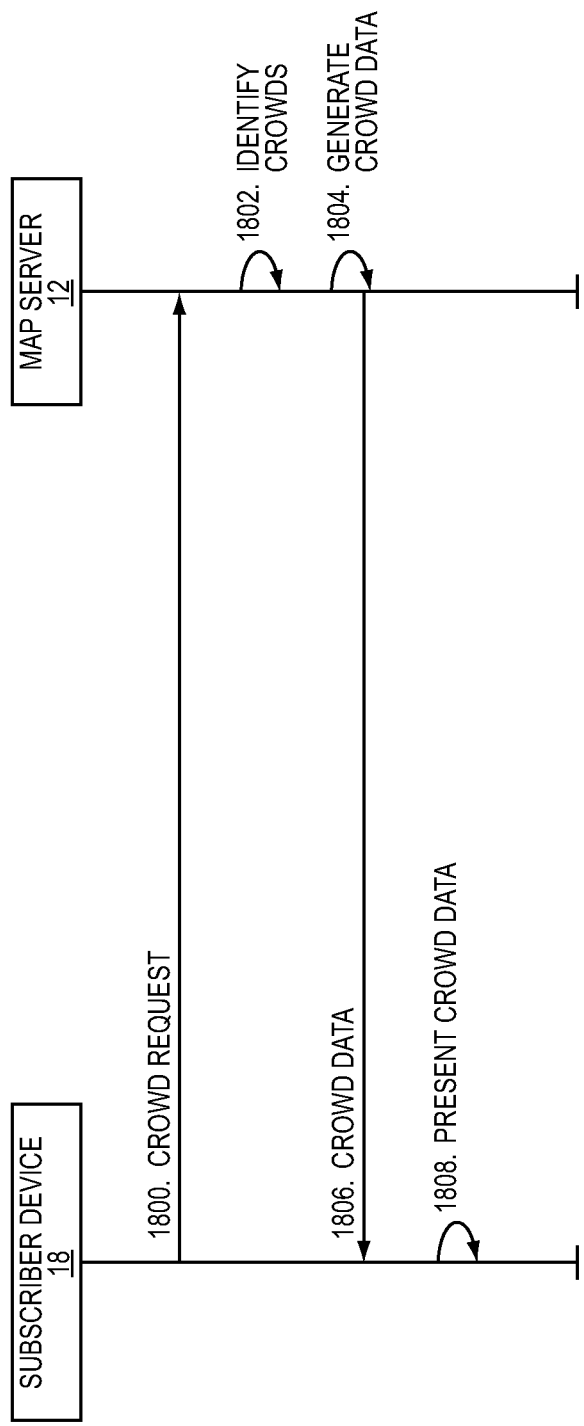
Figure 15:
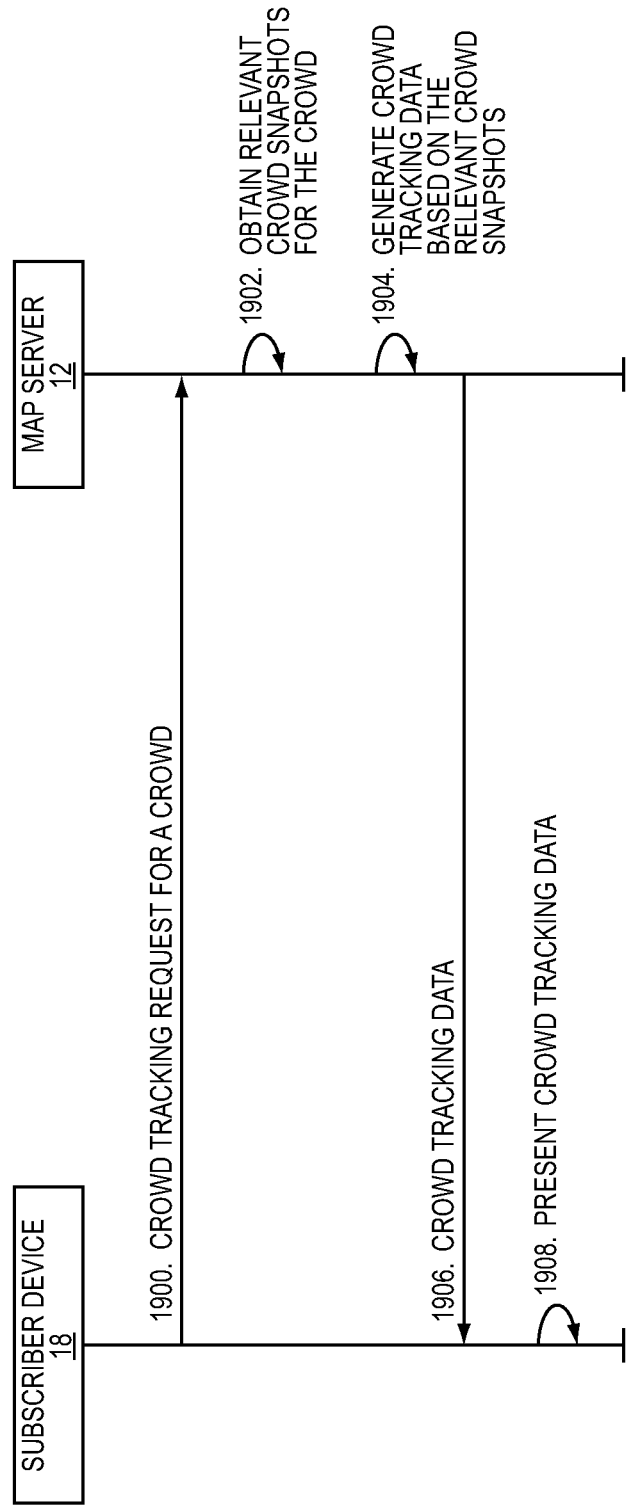
Figure 16:
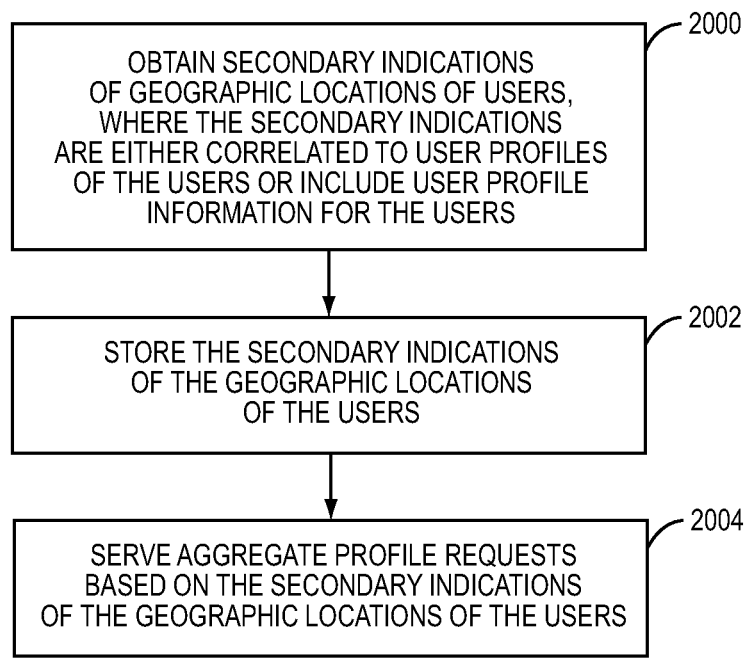
Figure 17A:
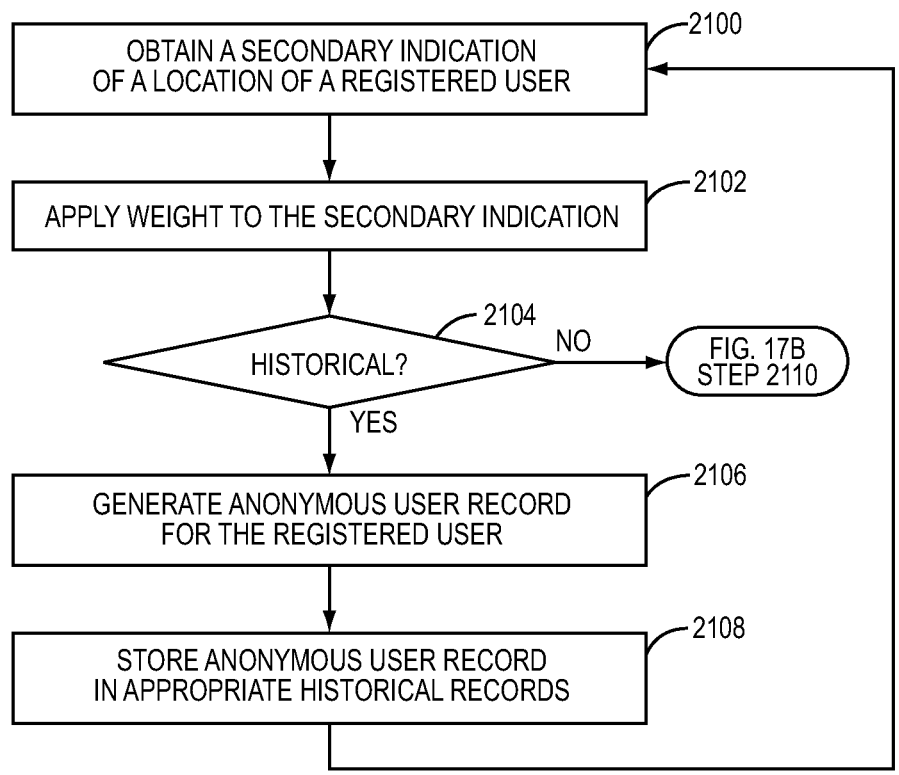
Figure 17B:
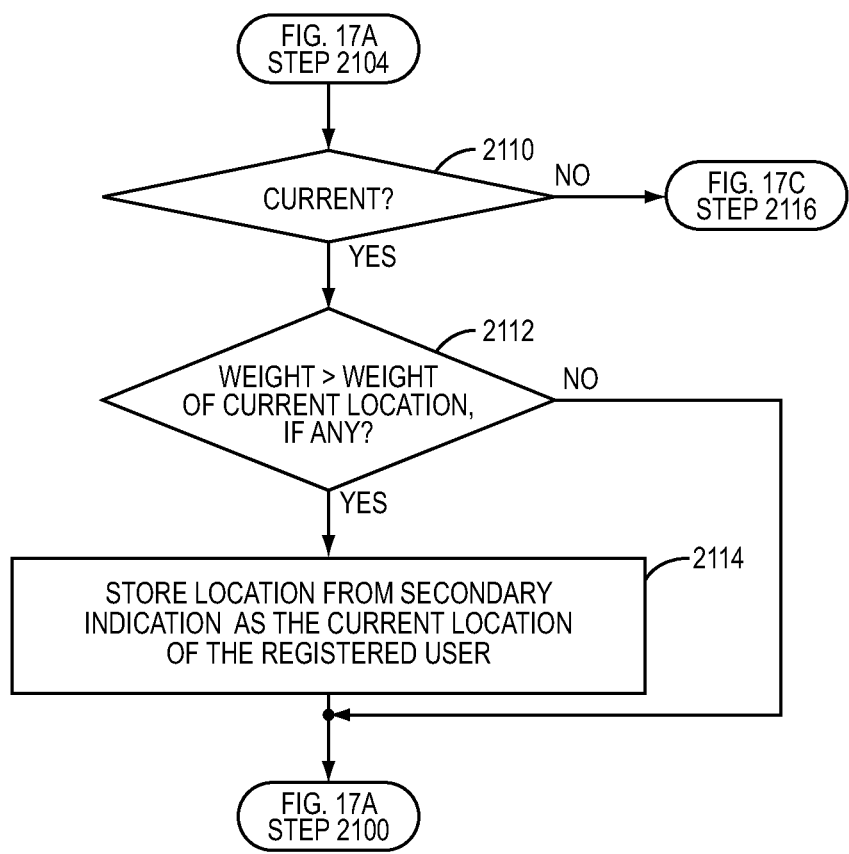
Figure 17C:
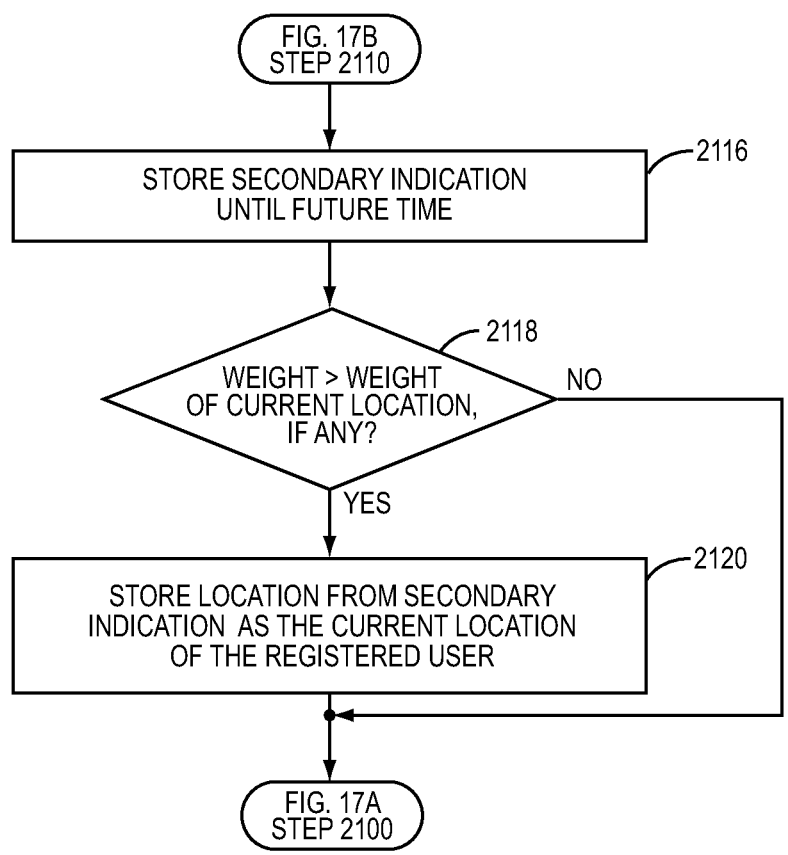
Figure 18A:
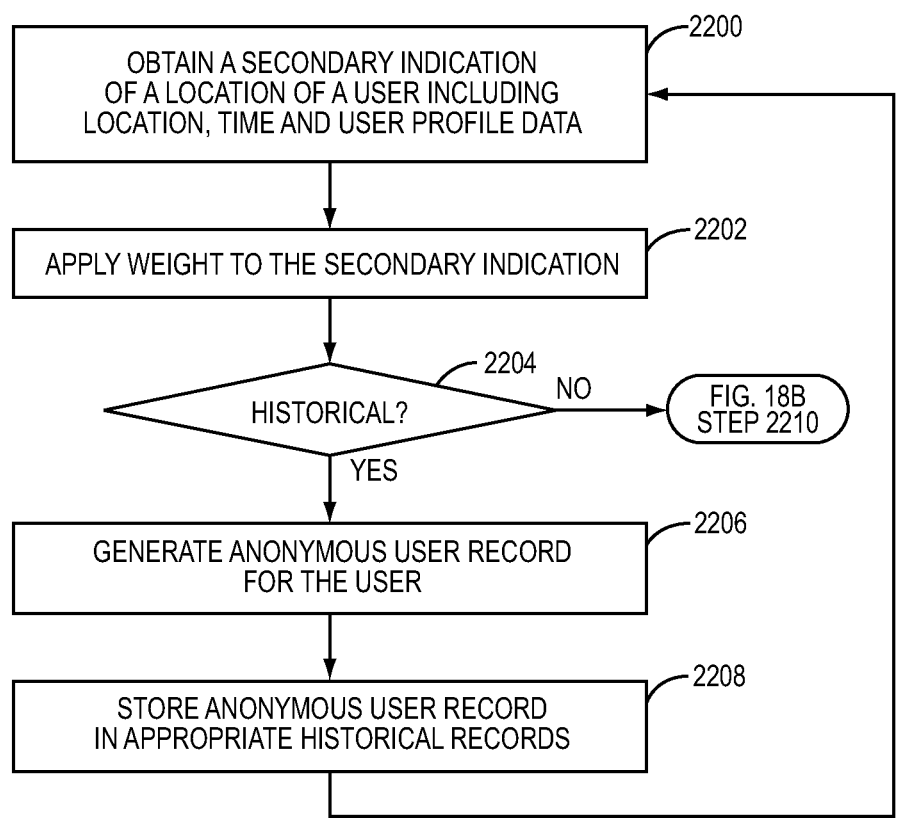
Figure 18B:
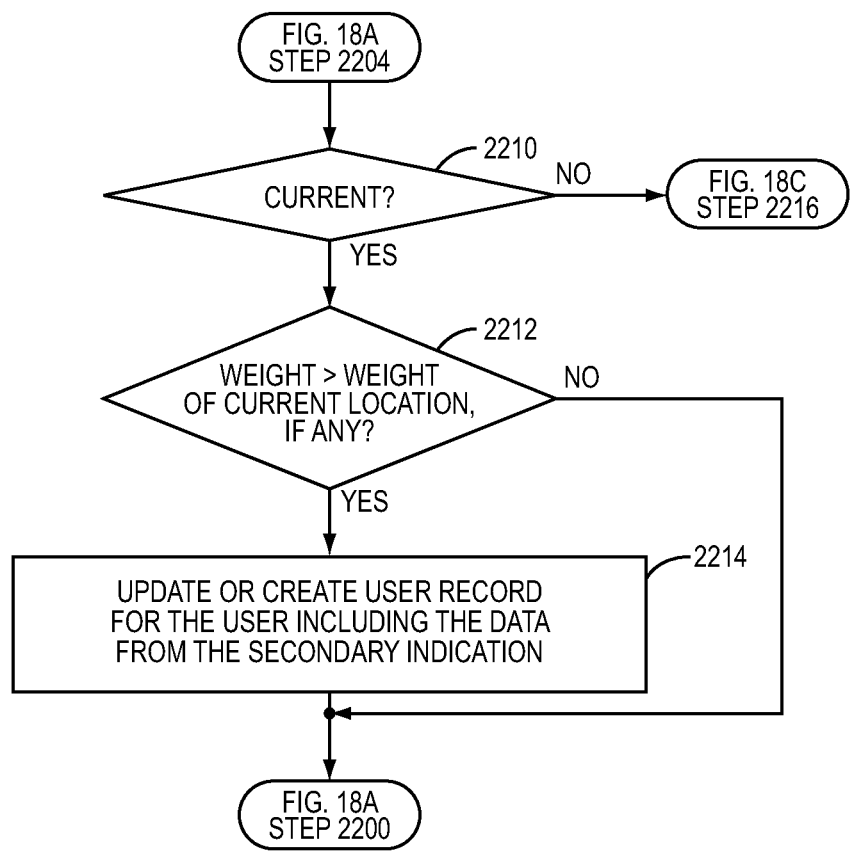
Figure 18C:
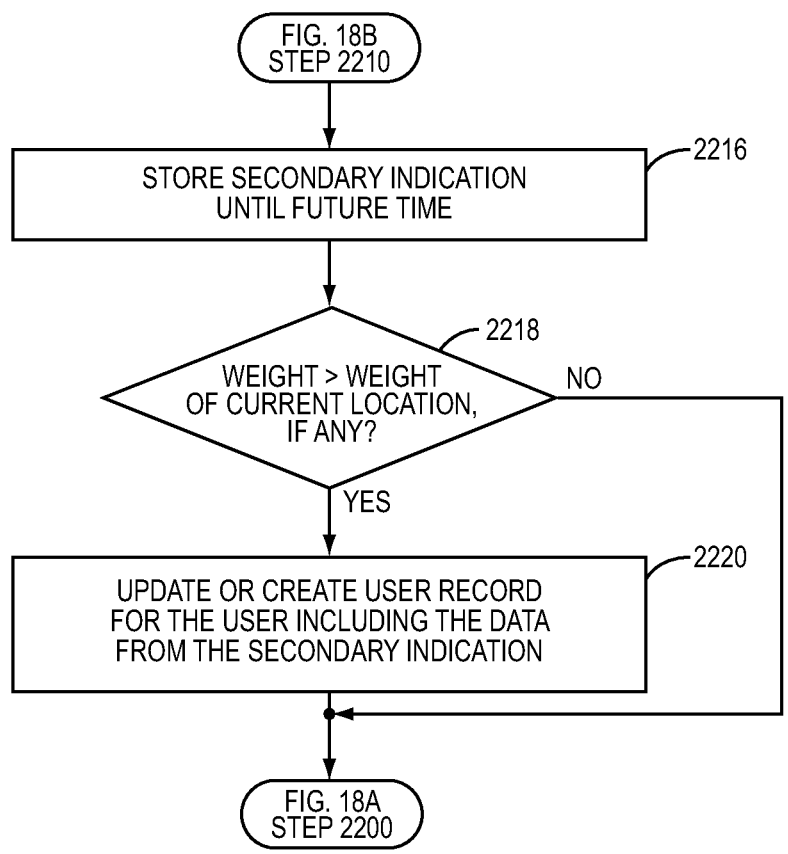
Figure 19A:
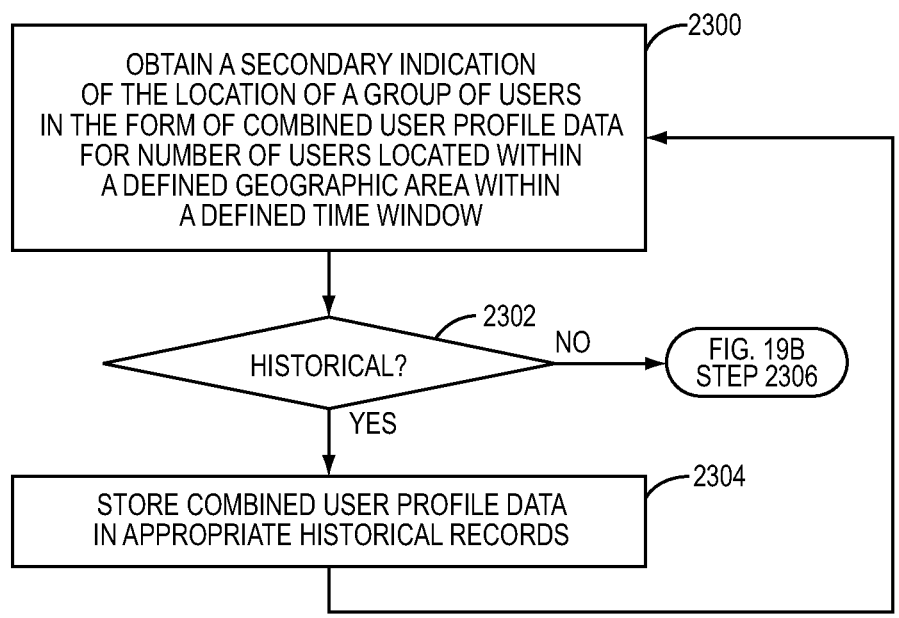
Figure 19B:
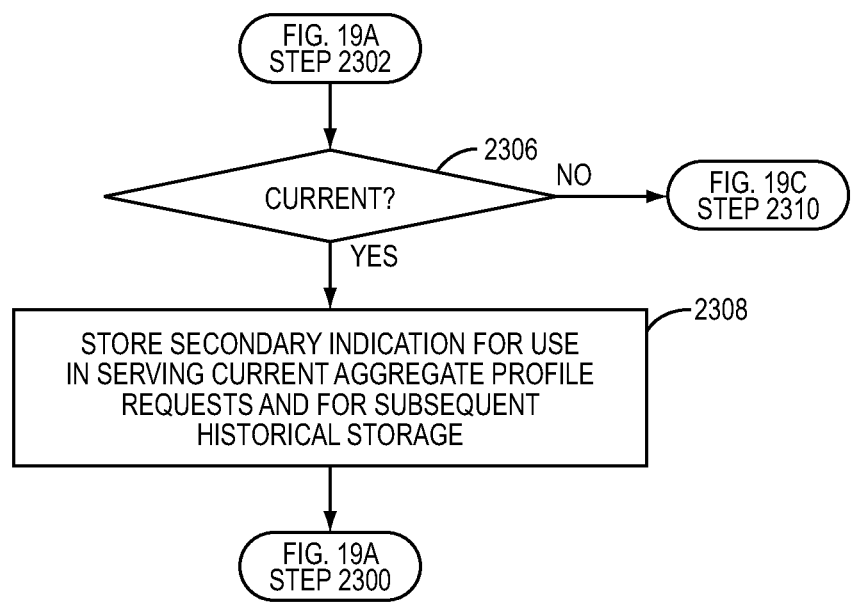
Figure 19C:
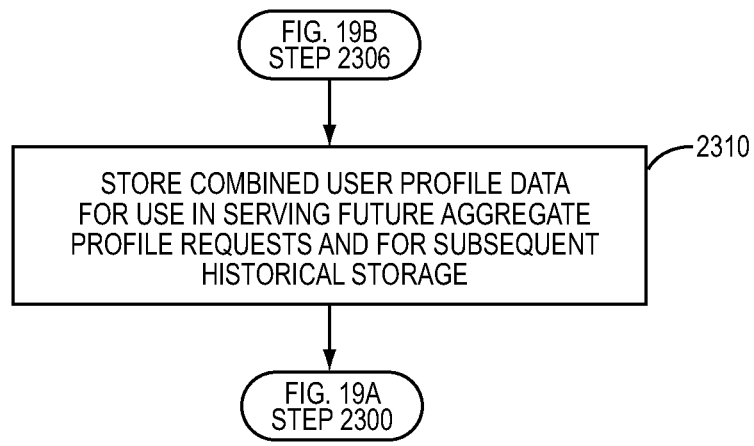
Figure 20:
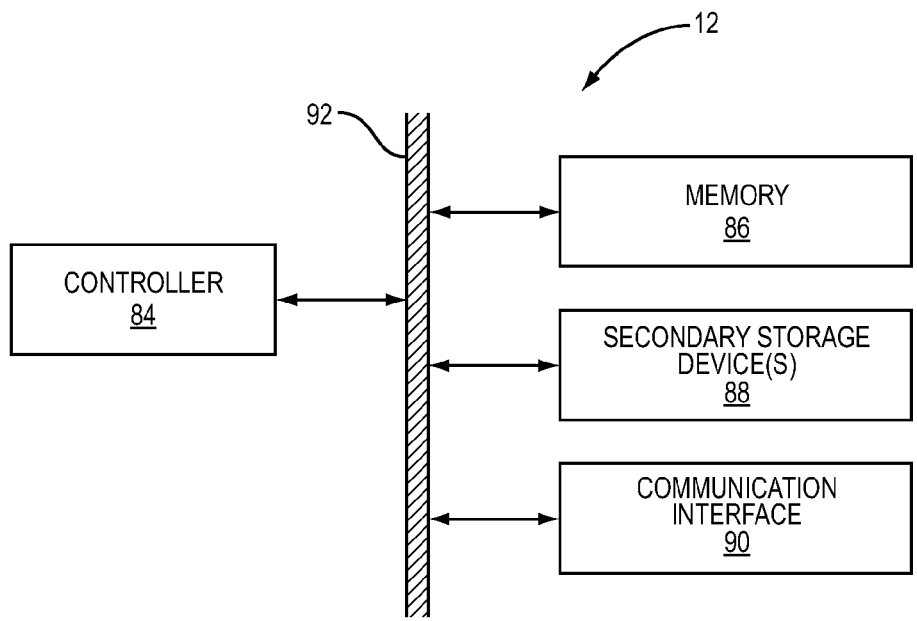
Figure 21:
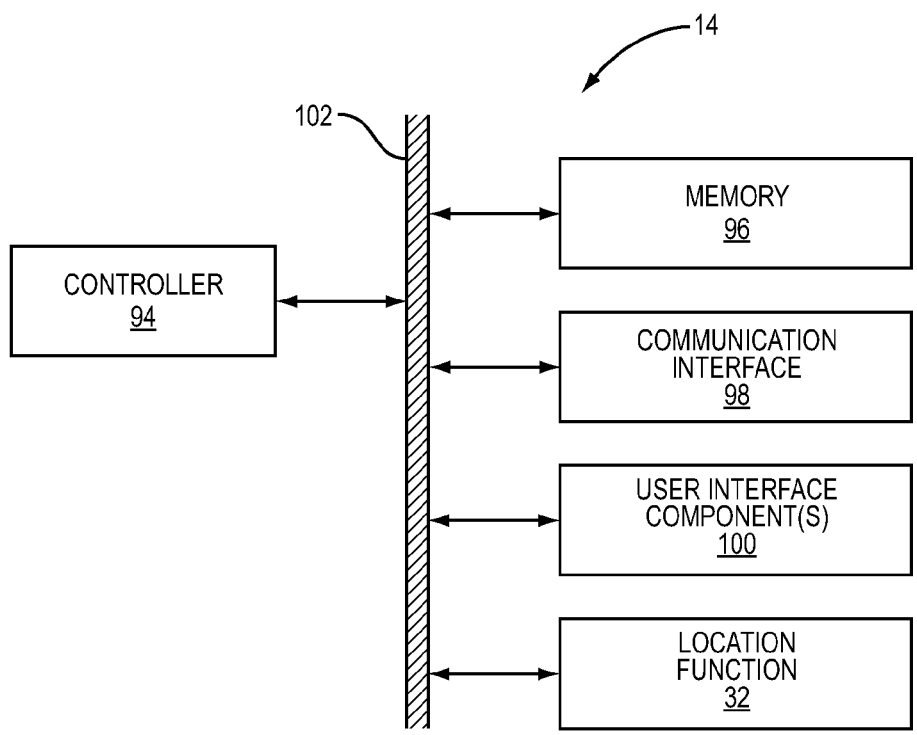
Figure 22:
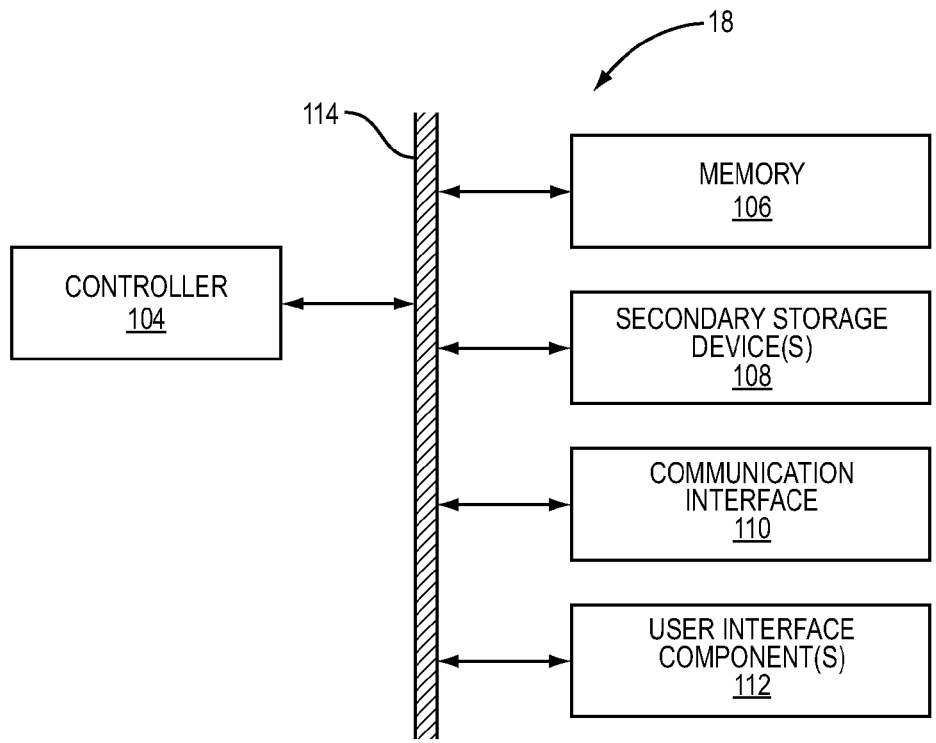
Figure 23:
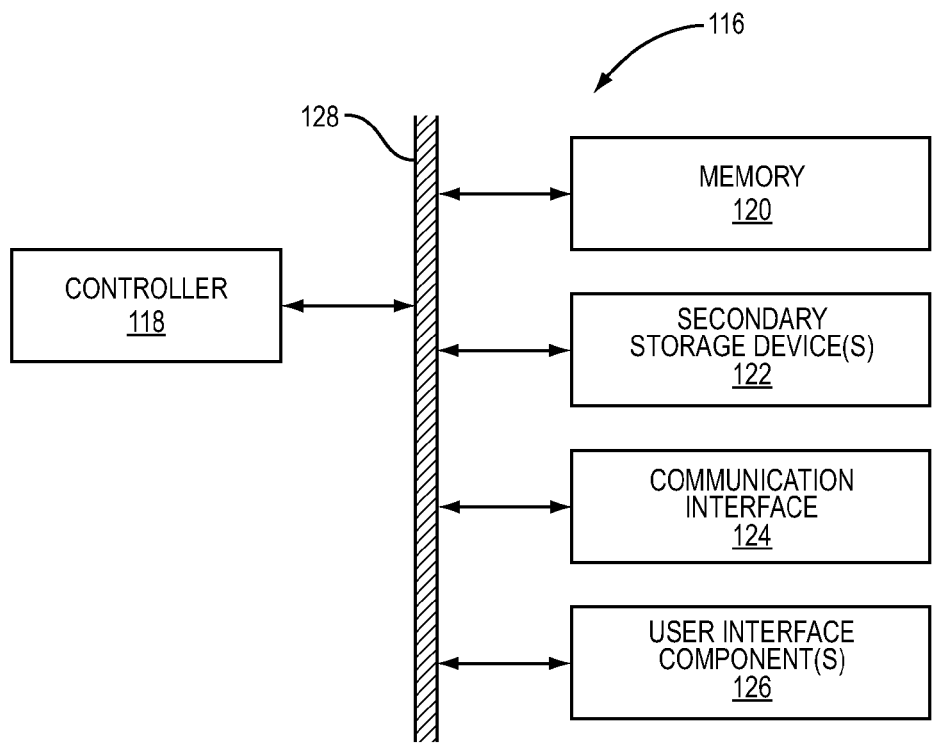

FIG. 6 graphically illustrates anonymization of a user record according to one embodiment of the present disclosure;

FIG. 7 is a flow chart for a quadtree based storage process that may be used to store anonymized user profile data for location buckets according to one embodiment of the present disclosure;

FIG. 8 illustrates the operation of the system of FIG. 1 wherein a mobile device is enabled to request and receive historical data from the MAP server according to one embodiment of the present disclosure;

FIG. 9 illustrates the operation of the system of FIG. 1 wherein the subscriber device is enabled to request and receive historical data from the MAP server according to one embodiment of the present disclosure;

FIG. 10 illustrates exemplary data records that may be used to represent crowds, users, crowd snapshots, and anonymous users according to one embodiment of the present disclosure;

FIGS. 11A through 11D illustrate one embodiment of a spatial crowd formation process that may be used to enable crowd tracking according to one embodiment of the present disclosure;

FIG. 12 illustrates a process for creating crowd snapshots according to one embodiment of the present disclosure;

FIG. 13 illustrates the operation the system of FIG. 1 to enable the mobile devices to request crowd data for currently formed crowds according to one embodiment of the present disclosure;

FIG. 14 illustrates the operation of the system of FIG. 1 to enable a subscriber device to request crowd data for current crowds according to one embodiment of the present disclosure;

FIG. 15 illustrates the operation of the MAP server of FIG. 1 to serve a request for crowd tracking data for a crowd according to one embodiment of the present disclosure;

FIG. 16 illustrates the operation of the MAP server of FIG. 1 to obtain and utilize secondary indications of the locations of users according to one embodiment of the present disclosure;

FIGS. 17A through 17C illustrate the operation of the secondary indications manager of the MAP server of FIG. 1 according to one embodiment of the present disclosure;

FIGS. 18A through 18C illustrate the operation of the secondary indications manager of the MAP server of FIG. 1 according to another embodiment of the present disclosure;

FIGS. 19A through 19C illustrate the operation of the secondary indications manager of the MAP server of FIG. 1 according to yet another embodiment of the present disclosure;

FIG. 20 is a block diagram of the MAP server of FIG. 1 according to one embodiment of the present disclosure;

FIG. 21 is a block diagram of one of the mobile devices of FIG. 1 according to one embodiment of the present disclosure;

FIG. 22 is a block diagram of the subscriber device of FIG. 1 according to one embodiment of the present disclosure; and FIG. 23 is a block diagram of a computing device hosting one of the secondary indications sources of FIG. 1 according to one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods are disclosed for obtaining secondary indications of locations of users for use by a location-based service. In one embodiment, a secondary indication of a location of one or more users is obtained from a source of secondary indications of locations of users. As used herein, a secondary indication of the location of one or more users is an indication of the location of the one or more users derived from data whose primary purpose is not to serve as a location update for the one or more users. The source of secondary indications may be, for example, a financial institution that provides secondary indications of locations of users based on credit card usage of the users, a source of public records that provides secondary indications of locations of users based on information contained in public records (e.g., newspapers), an electronic invitation service that provides secondary indications of locations of users based on electronic invitations sent to and accepted by the users, or a source of geo-tagged and time-stamped digital images that provides secondary indications of locations of users based on geo-tags and timestamps of digital images in which the users appear. The secondary indication includes a location of the one or more users and timing information defining when the one or more users were or will be located at the location. In one embodiment, the secondary indication also includes information identifying the one or more users that correlates the secondary indication with known user profiles of the one or more users. In another embodiment, the secondary indication also includes user profile data for the one or more users provided by the source of secondary indications. The secondary indication of the location of the one or more users is then stored and utilized by the location-based service. In one embodiment, the secondary indication is utilized to store historical aggregate user profile data by location and/or to provide aggregate user profile data for crowds of users formed via a spatial crowd formation process.

FIG. 1 illustrates a Mobile Aggregate Profile (MAP) system 10 that obtains secondary indications of locations of users and utilizes the secondary indications to provide a location-based service according to one embodiment of the present disclosure. In this embodiment, the system 10 includes a MAP server 12, a number of mobile devices 14-1 through 14-N having associated users 16-1 through 16-N, a subscriber device 18 having an associated subscriber 20, a third-party service 22, and one or more secondary indications sources 23 communicatively coupled via a network 24. The network 24 may be any type of network or any combination of networks. Specifically, the network 24 may include wired components, wireless components, or both wired and wireless components. In one exemplary embodiment, the network 24 is a distributed public network such as the Internet, where the mobile devices 14-1 through 14-N are enabled to connect to the network 24 via local wireless connections (e.g., WiFi or IEEE 802.11 connections) or wireless telecommunications connections (e.g., 3G or 4G telecommunications connections such as GSM, LTE, W-CDMA, or WiMAX connections). Note that the mobile devices 14-1 through 14-N may generally be referred to herein as mobile devices 14, and one of the mobile devices 14-1 through 14-N may be generally referred to herein as a mobile device 14. Likewise, the users 16-1 through 16-N may generally be referred to herein as users 16, and one of the users 16-1 through 16-N may generally be referred to herein as a user 16.

As discussed below in detail, the MAP server 12 operates to obtain current locations, including location updates, and user profiles of the users 16 of the mobile devices 14. The current locations of the users 16 can be expressed as positional geographic coordinates such as latitude-longitude pairs, and a height vector (if applicable), or any other similar information capable of identifying a given physical point in space in a two-dimensional or three-dimensional coordinate system. Using the current locations and user profiles of the users 16, the MAP server 12 is enabled to provide a number of features such as, but not limited to, maintaining a historical record of anonymized user profile data by location, generating aggregate profile data over time for a Point of Interest (POI) or Area of Interest (AOI) using the historical record of anonymized user profile data, identifying crowds of users using current locations and/or user profiles of the users 16, generating aggregate profiles for crowds of users at a POI or in an AOI using the current user profiles of users in the crowds, and crowd tracking. Note that while the MAP server 12 is illustrated as a single server for simplicity and ease of discussion, it should be appreciated that the MAP server 12 may be implemented as a single physical server or multiple physical servers operating in a collaborative manner for purposes of redundancy and/or load sharing. While not essential, for additional information regarding the operation of the MAP server 12, as an example, the interested reader is directed to U.S. patent application Ser. No. 12/645,532, entitled FORMING CROWDS AND PROVIDING ACCESS TO CROWD DATA IN A MOBILE ENVIRONMENT, which was filed Dec. 23, 2009; U.S. patent application Ser. No. 12/645,539, entitled ANONYMOUS CROWD TRACKING, which was filed Dec. 23, 2009; U.S. patent application Ser. No. 12/645,535, entitled MAINTAINING A HISTORICAL RECORD OF ANONYMIZED USER PROFILE DATA BY LOCATION FOR USERS IN A MOBILE ENVIRONMENT, which was filed Dec. 23, 2009; U.S. patent application Ser. No. 12/645,546, entitled CROWD FORMATION FOR MOBILE DEVICE USERS, which was filed Dec. 23, 2009; U.S. patent application Ser. No. 12/645,556, entitled SERVING A REQUEST FOR DATA FROM A HISTORICAL RECORD OF ANONYMIZED USER PROFILE DATA IN A MOBILE ENVIRONMENT, which was filed Dec. 23, 2009; U.S. patent application Ser. No. 12/645,560, entitled HANDLING CROWD REQUESTS FOR LARGE GEOGRAPHIC AREAS, which was filed Dec. 23, 2009; and U.S. patent application Ser. No. 12/645,544, entitled MODIFYING A USER'S CONTRIBUTION TO AN AGGREGATE PROFILE BASED ON TIME BETWEEN LOCATION UPDATES AND EXTERNAL EVENTS, which was filed Dec. 23, 2009; all of which are commonly owned and assigned and are hereby incorporated herein by reference in their entireties.

In addition, as discussed below in detail, the MAP server 12 may utilize secondary indications of geographic locations of users, such as the users 16, to supplement location updates collected by the mobile devices 14 of the users 16 and the corresponding user profiles of the users 16. The MAP server 12 obtains the secondary indications from the one or more secondary indications sources 23, which may be sources of information regarding credit card usages or transactions, sources of public records or information such as newspapers, electronic invitation services, photo services, or the like. Secondary indications may be particularly beneficial for a number of reasons. For example, the users 16 may not always have their mobile devices 14 with them or the mobile devices 14 may sometimes be turned off intentionally or inadvertently. In these cases, secondary indications of the locations of the users 16 may allow the MAP server 12 to continue to gather the locations of the users 16 even in those situations where the users 16 do not have their mobile devices 14 or their mobile devices 14 are turned off. As another example, for any of a number of reasons, the MAP server 12 may be starved for data for all geographic regions or some geographic regions, and secondary indications may be used to supplement any data collected by the MAP server 12 in order to provide meaningful results. Note however that these beneficial reasons for using secondary indications of geographic locations of users are exemplary and are not intended to limit the scope of the present disclosure.

The mobile devices 14 may be mobile smart phones, tablet computers, portable media player devices, mobile gaming devices, or the like. Some exemplary mobile devices that may be programmed or otherwise configured to operate as the mobile devices 14 are the Apple® iPhone, the Palm Pre®, the Samsung Rogue™, the Blackberry Storm™, the Motorola Droid or similar phone running Google's Android™ Operating System, an Apple® iPad, and the Apple® iPod Touch® device. However, this list of exemplary mobile devices is not exhaustive and is not intended to limit the scope of the present disclosure.

The mobile devices 14-1 through 14-N include MAP clients 26-1 through 26-N (generally referred to herein as MAP clients 26 or individually as MAP client 26), MAP applications 28-1 through 28-N (generally referred to herein as MAP applications 28 or individually as MAP application 28), third-party applications 30-1 through 30-N (generally referred to herein as third-party applications 30 or individually as third-party application 30), and location functions 32-1 through 32-N (generally referred to herein as location functions 32 or individually as location function 32), respectively. The MAP client 26 is preferably implemented in software. In general, in one embodiment, the MAP client 26 is a middleware layer operating to interface an application layer (i.e., the MAP application 28 and the third-party applications 30) to the MAP server 12. More specifically, the MAP client 26 enables the MAP application 28 and the third-party applications 30 to request and receive data from the MAP server 12. In addition, the MAP client 26 enables applications, such as the MAP application 28 and the third-party applications 30, to access data from the MAP server 12. For example, as discussed below in detail, the MAP client 26 enables the MAP application 28 to request anonymized aggregate profiles for crowds of users located at a POI or within an AOI and/or request anonymized historical user profile data for a POI or AOI.

The MAP application 28 is also preferably implemented in software. The MAP application 28 generally provides a user interface component between the user 16 and the MAP server 12. More specifically, among other things, the MAP application 28 enables the user 16 to initiate historical requests for historical data or crowd requests for crowd data (e.g., aggregate profile data and/or crowd characteristics data) from the MAP server 12 for a POI or AOI. The MAP application 28 also enables the user 16 to configure various settings. For example, the MAP application 28 may enable the user 16 to select a desired social networking service (e.g., Facebook, MySpace, LinkedIN, etc.) from which to obtain the user profile of the user 16 and provide any necessary credentials (e.g., username and password) needed to access the user profile from the social networking service.

The third-party applications 30 are preferably implemented in software. The third-party applications 30 operate to access the MAP server 12 via the MAP client 26. The third-party applications 30 may utilize data obtained from the MAP server 12 in any desired manner. As an example, one of the third party applications 30 may be a gaming application that utilizes historical aggregate profile data to notify the user 16 of POIs or AOIs where persons having an interest in the game have historically congregated. It should be noted that while the MAP client 26 is illustrated as being separate from the MAP application 28 and the third-party applications 30, the present disclosure is not limited thereto. The functionality of the MAP client 26 may alternatively be incorporated into the MAP application 28 and the third-party applications 30.

The location function 32 may be implemented in hardware, software, or a combination thereof. In general, the location function 32 operates to determine or otherwise obtain the location of the mobile device 14. For example, the location function 32 may be or include a Global Positioning System (GPS) receiver.

The subscriber device 18 is a physical device such as a personal computer, a mobile computer (e.g., a notebook computer, a netbook computer, a tablet computer, etc.), a mobile smart phone, or the like. The subscriber 20 associated with the subscriber device 18 is a person or entity. In general, the subscriber device 18 enables the subscriber 20 to access the MAP server 12 via a web browser to obtain various types of data, preferably for a fee. For example, the subscriber 20 may pay a fee to have access to historical aggregate profile data for one or more POIs and/or one or more AOIs, pay a fee to have access to crowd data such as aggregate profiles for crowds located at one or more POIs and/or located in one or more AOIs, pay a fee to track crowds, or the like. Note that the web browser is exemplary. In another embodiment, the subscriber device 18 is enabled to access the MAP server 12 via a custom application.

Lastly, the third-party service 22 is a service that has access to data from the MAP server 12 such as a historical aggregate profile data for one or more POIs or one or more AOIs, crowd data such as aggregate profiles for one or more crowds at one or more POIs or within one or more AOIs, or crowd tracking data. Based on the data from the MAP server 12, the third-party service 22 operates to provide a service such as, for example, targeted advertising. For example, the third-party service 22 may obtain anonymous aggregate profile data for one or more crowds located at a POI and then provide targeted advertising to known users located at the POI based on the anonymous aggregate profile data. Note that while targeted advertising is mentioned as an exemplary third-party service 22, other types of third-party services 22 may additionally or alternatively be provided. Other types of third-party services 22 that may be provided will be apparent to one of ordinary skill in the art upon reading this disclosure.

Figure 2:
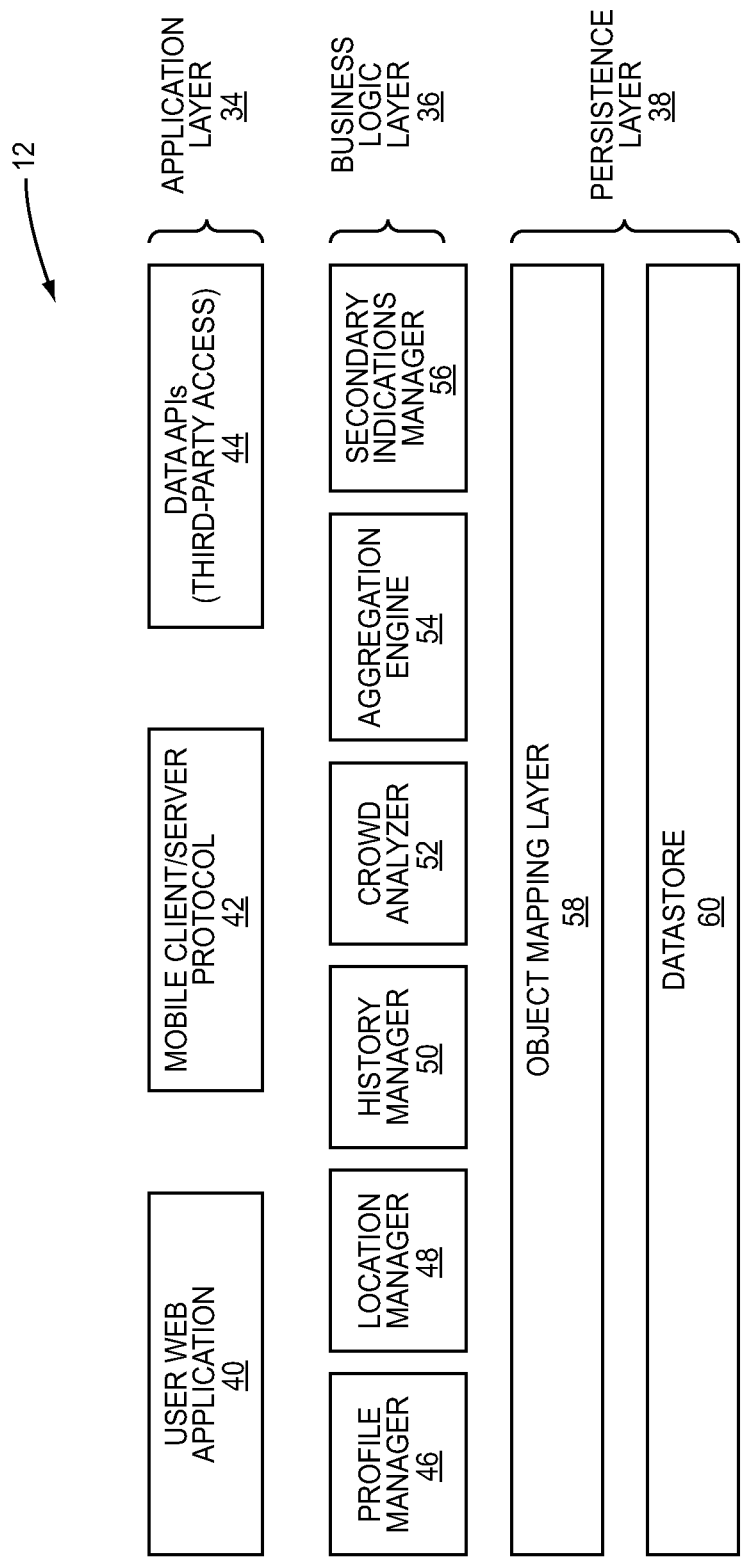
FIG. 2 is a block diagram of the MAP server of FIG. 1 according to one embodiment of the present disclosure.

FIG. 2 is a block diagram of the MAP server 12 of FIG. 1 according to one embodiment of the present disclosure. As illustrated, the MAP server 12 includes an application layer 34, a business logic layer 36, and a persistence layer 38. The application layer 34 includes a user web application 40, a mobile client/server protocol component 42, and one or more data Application Programming Interfaces (APIs) 44. The user web application 40 is preferably implemented in software and operates to provide a web interface for users, such as the subscriber 20, to access the MAP server 12 via a web browser. The mobile client/server protocol component 42 is preferably implemented in software and operates to provide an interface between the MAP server 12 and the MAP clients 26 hosted by the mobile devices 14. The data APIs 44 enable third-party services, such as the third-party service 22, to access the MAP server 12.

The business logic layer 36 includes a profile manager 46, a location manager 48, a history manager 50, a crowd analyzer 52, an aggregation engine 54, and a secondary indications manager 56, each of which is preferably implemented in software. The profile manager 46 generally operates to obtain the user profiles of the users 16. The profile manager 46 may obtain the user profiles of the users 16 from the mobile devices 14. For example, the users 16 may enter their user profiles at the mobile devices 14, and the mobile devices 14 may then send the user profiles of the users 16 to the profile manager 46 of the MAP server 12. As another example, the users 16 may enable the mobile devices 14 to obtain the user profiles of the users 16 from social networking services such as, for example, Facebook®, LinkedIn®, or the like. The profile manager 46 may alternatively obtain the user profiles of the users 16 directly from social networking services such as, for example, Facebook®, LinkedIn®, or the like. The profile manager 46 may normalize the user profiles of the users 16 and then store the user profiles of the users 16 in the persistence layer 38. Normalization may be desired where, for example, the user profiles of the users 16 may originate from different sources (e.g., different social networking services).

The location manager 48 operates to obtain the current locations of the users 16 via corresponding location updates. The location manager 48 may obtain the location updates directly from the mobile devices 14 of the users 16 or from location-based services which themselves obtain the location updates directly from the mobile devices 14 of the users 16. An exemplary location-based service is the Yahoo! FireEagle service. However, other location-based services that collect location updates from the mobile devices 14 of the users 16 may be used.

The history manager 50 generally operates to maintain a historical record of anonymized user profile data by location. Note that while anonymization is preferred, it is not required. The crowd analyzer 52 operates to form crowds of users. In one embodiment, the crowd analyzer 52 utilizes a spatial crowd formation algorithm. However, the present disclosure is not limited thereto. In addition, the crowd analyzer 52 may also operate to track crowds. The aggregation engine 54 generally operates to provide aggregate profile data in response to requests from the mobile devices 14, the subscriber device 18, and the third-party service 22. The aggregate profile data may be historical aggregate profile data for one or more POIs or one or more AOIs or aggregate profile data for crowd(s) currently at one or more POIs or within one or more AOIs. Lastly, as described below in detail, the secondary indications manager 56 operates to obtain and store secondary indications of locations of users such as, but not limited to, the users 16 for utilization by the MAP server 12.

The persistence layer 38 includes an object mapping layer 58 and a datastore 60. The object mapping layer 58 is preferably implemented in software. The datastore 60 is preferably a relational database, which is implemented in a combination of hardware (i.e., physical data storage hardware) and software (i.e., relational database software). In this embodiment, the business logic layer 36 is implemented in an object-oriented programming language such as, for example, Java. As such, the object mapping layer 58 operates to map objects used in the business logic layer 36 to relational database entities stored in the datastore 60. Note that, in one embodiment, data is stored in the datastore 60 in a Resource Description Framework (RDF) compatible format.

In an alternative embodiment, rather than being a relational database, the datastore 60 may be implemented as an RDF datastore. More specifically, the RDF datastore may be compatible with RDF technology adopted by Semantic Web activities. Namely, the RDF datastore may use the Friend-Of-A-Friend (FOAF) vocabulary for describing people, their social networks, and their interests. In this embodiment, the MAP server 12 may be designed to accept raw FOAF files describing persons, their friends, and their interests. These FOAF files are currently output by some social networking services such as Livejournal and Facebook. The MAP server 12 may then persist RDF descriptions of the users 16 as a proprietary extension of the FOAF vocabulary that includes additional properties desired for the system 10.

Figure 3:
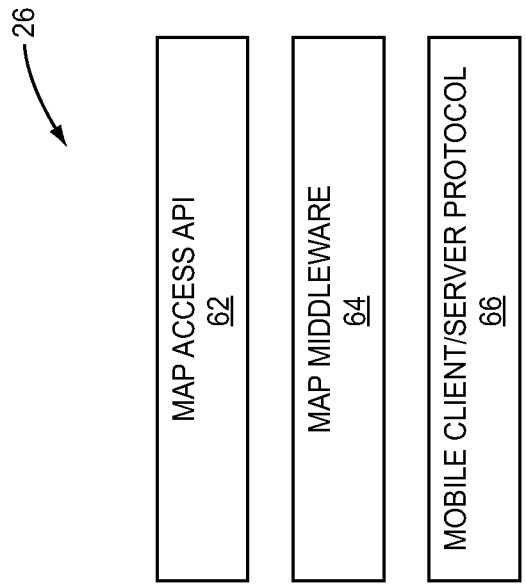
FIG. 3 is a block diagram of the MAP client of one of the mobile devices of FIG. 1 according to one embodiment of the present disclosure.

FIG. 3 illustrates the MAP client 26 of FIG. 1 in more detail according to one embodiment of the present disclosure. As illustrated, in this embodiment, the MAP client 26 includes a MAP access API 62, a MAP middleware component 64, and a mobile client/server protocol component 66. The MAP access API 62 is implemented in software and provides an interface by which the MAP client 26 and the third-party applications 30 are enabled to access the MAP client 26. The MAP middleware component 64 is implemented in software and performs the operations needed for the MAP client 26 to operate as an interface between the MAP application 28 and the third-party applications 30 at the mobile device 14 and the MAP server 12. The mobile client/server protocol component 66 enables communication between the MAP client 26 and the MAP server 12 via a defined protocol.

Using the current locations of the users 16 and the user profiles of the users 16, the MAP server 12 can provide a number of features. A first feature that may be provided by the MAP server 12 is historical storage of anonymized user profile data by location. This historical storage of anonymized user profile data by location is performed by the history manager 50 of the MAP server 12. More specifically, in the preferred embodiment, a geographic region (e.g., a continent, a country, a state, a city, or the like) is divided into a grid of geographic areas, which are referred to herein as "location buckets." The history manager 50 maintains lists of users located in each of the location buckets. Preferably, the location buckets are defined by floor (latitude, longitude) to a desired resolution. The higher the resolution, the smaller the size of the location buckets. For example, in one embodiment, the location buckets are defined by floor (latitude, longitude) to a resolution of $1/10,000^{th}$ of a degree.

As discussed below in detail, at a predetermined time interval such as, for example, 15 minutes, the history manager 50 makes a copy of the lists of users in the location buckets, anonymizes the user profiles of the users in the lists to provide anonymized user profile data for the corresponding location buckets, and stores the anonymized user profile data in a number of history objects. In one embodiment, a history object is stored for each location bucket having at least one user. In another embodiment, a quadtree algorithm is used to efficiently create history objects for geographic regions (i.e., groups of one or more adjoining location buckets).

Figure 4:
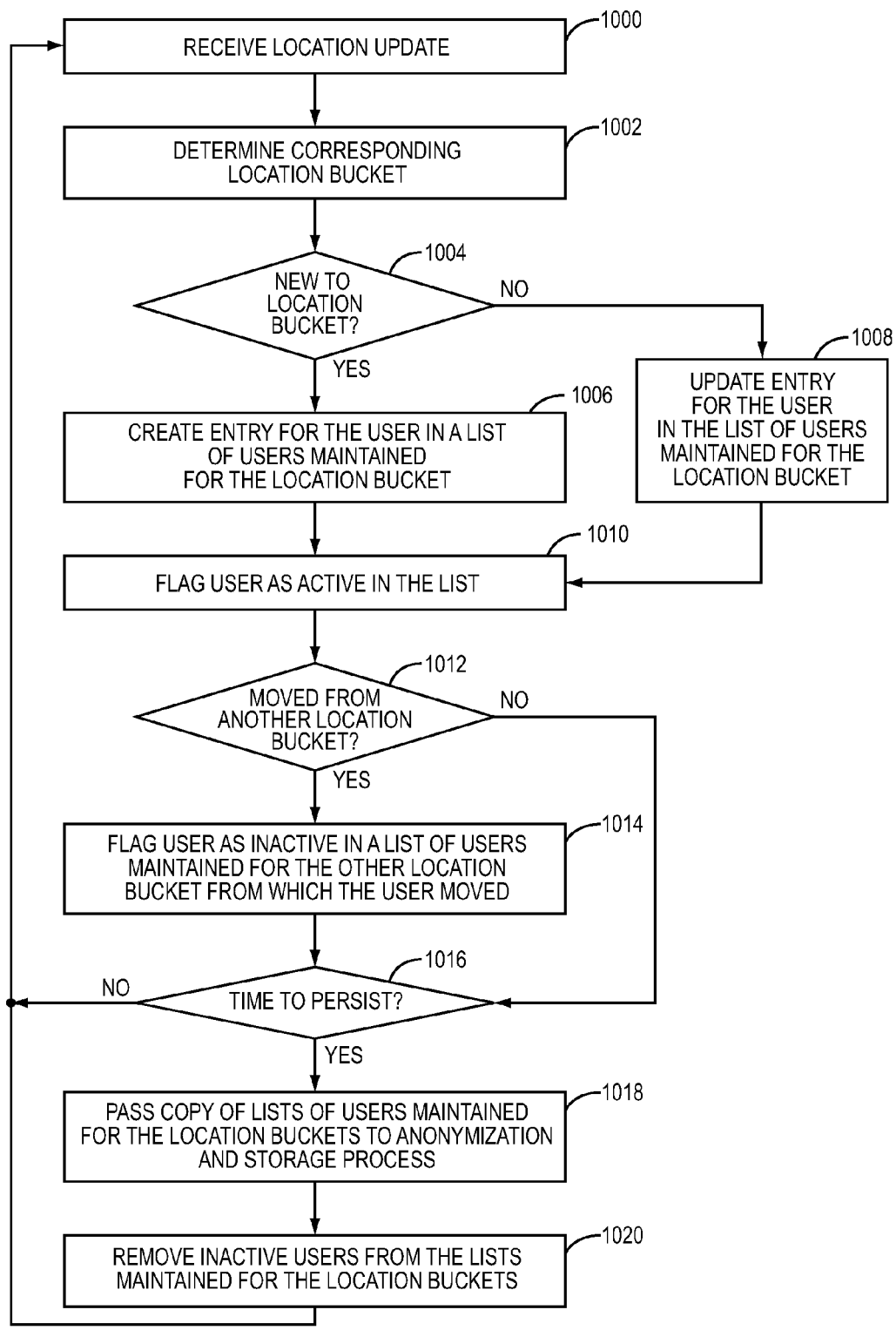
FIG. 4 is a flow chart illustrating the operation of a foreground bucketization process performed by the MAP server to maintain the lists of users for location buckets for purposes of maintaining a historical record of anonymized user profile data by location according to one embodiment of the present disclosure.

FIG. 4 is a flow chart illustrating the operation of a foreground "bucketization" process performed by the history manager 50 to maintain the lists of users for location buckets according to one embodiment of the present disclosure. First, the history manager 50 receives a location update for a user 16 (step 1000). The history manager 50 then determines a location bucket corresponding to the updated location (i.e., the current location) of the user 16 (step 1002). In the preferred embodiment, the location of the user 16 is expressed as latitude and longitude coordinates, and the history manager 50 determines the location bucket by determining floor values of the latitude and longitude coordinates, which can be written as floor (latitude, longitude) at a desired resolution. As an example, if the latitude and longitude coordinates for the location of the user 16 are 32.24267381553987 and −111.9249213502935, respectively, and the floor values are to be computed to a resolution of $1/10,000^{th}$ of a degree, then the floor values for the latitude and longitude coordinates are 32.2426 and −111.9249. The floor values for the latitude and longitude coordinates correspond to a particular location bucket.

After determining the location bucket for the location of the user 16, the history manager 50 determines whether the user 16 is new to the location bucket (step 1004). In other words, the history manager 50 determines whether the user 16 is already on the list of users for the location bucket. If the user 16 is new to the location bucket, the history manager 50 creates an entry for the user 16 in the list of users for the location bucket (step 1006). Returning to step 1004, if the user 16 is not new to the location bucket, the history manager 50 updates the entry for the user 16 in the list of users for the location bucket (step 1008). At this point, whether proceeding from step 1006 or 1008, the user 16 is flagged as active in the list of users for the location bucket (step 1010).

The history manager 50 then determines whether the user 16 has moved from another location bucket (step 1012). More specifically, the history manager 50 determines whether the user 16 is included in the list of users for another location bucket and is currently flagged as active in that list. If the user 16 has not moved from another location bucket, the process proceeds to step 1016. If the user 16 has moved from another location bucket, the history manager 50 flags the user 16 as inactive in the list of users for the other location bucket from which the user 16 has moved (step 1014).

At this point, whether proceeding from step 1012 or 1014, the history manager 50 determines whether it is time to persist (step 1016). More specifically, as mentioned above, the history manager 50 operates to persist history objects at a predetermined time interval such as, for example, every 15 minutes. Thus, the history manager 50 determines that it is time to persist if the predetermined time interval has expired. If it is not time to persist, the process returns to step 1000 and is repeated for a next received location update, which will typically be for another user. If it is time to persist, the history manager 50 creates a copy of the lists of users for the location buckets and passes the copy of the lists to an anonymization and storage process (step 1018). In this embodiment, the anonymization and storage process is a separate process performed by the history manager 50. The history manager 50 then removes inactive users from the lists of users for the location buckets (step 1020). The process then returns to step 1000 and is repeated for a next received location update, which will typically be for another user.

Figure 5:
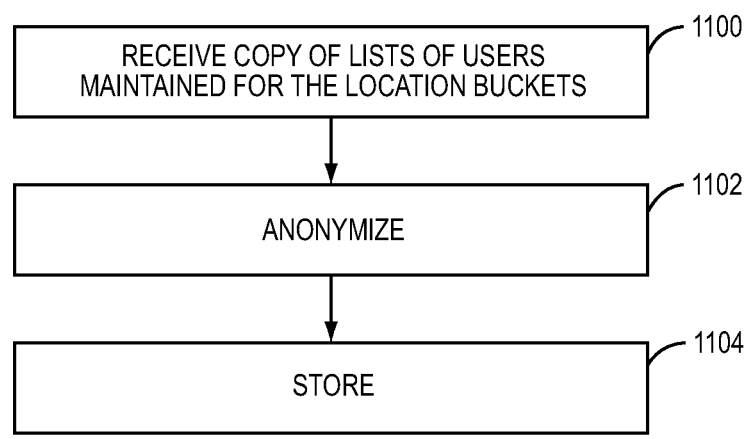
FIG. 5 is a flow chart illustrating the anonymization and storage process performed by the MAP server for the location buckets in order to maintain a historical record of anonymized user profile data by location according to one embodiment of the present disclosure.

FIG. 5 is a flow chart illustrating the anonymization and storage process performed by the history manager 50 at the predetermined time interval according to one embodiment of the present disclosure. First, the anonymization and storage process receives the copy of the lists of users for the location buckets passed to the anonymization and storage process by the bucketization process of FIG. 4 (step 1100). Next, anonymization is performed for each of the location buckets having at least one user in order to provide anonymized user profile data for the location buckets (step 1102). Anonymization prevents connecting information stored in the history objects stored by the history manager 50 back to the users 16 or at least substantially increases a difficulty of connecting information stored in the history objects stored by the history manager 50 back to the users 16. Lastly, the anonymized user profile data for the location buckets is stored in a number of history objects (step 1104). In one embodiment, a separate history object is stored for each of the location buckets, where the history object of a location bucket includes the anonymized user profile data for the location bucket. In another embodiment, as discussed below, a quadtree algorithm is used to efficiently store the anonymized user profile data in a number of history objects such that each history object stores the anonymized user profile data for one or more location buckets.

FIG. 6 graphically illustrates one embodiment of the anonymization process of step 1102 of FIG. 5. In this embodiment, anonymization is performed by creating anonymous user records for the users 16 in the lists of users for the location buckets. The anonymous user records are not connected back to the users 16. More specifically, as illustrated in FIG. 6, each user 16 in the lists of users for the location buckets has a corresponding user record 68. The user record 68 includes a unique user identifier (ID) for the user 16, the current location of the user 16, and the user profile of the user 16. The user profile includes keywords for each of a number of profile categories, which are stored in corresponding profile category records 70-1 through 70-M. Each of the profile category records 70-1 through 70-M includes a user ID for the corresponding user 16 which may be the same user ID used in the user record 68, a category ID, and a list of keywords for the profile category.

For anonymization, an anonymous user record 72 is created from the user record 68. In the anonymous user record 72, the user ID is replaced with a new user ID that is not connected back to the user 16, which is also referred to herein as an anonymous user ID. This new user ID is different than any other user ID used for anonymous user records created from the user record of the user 16 for any previous or subsequent time periods. In this manner, anonymous user records for a single user 16 created over time cannot be linked to one another.

In addition, anonymous profile category records 74-1 through 74-M are created for the profile category records 70-1 through 70-M. In the anonymous profile category records 74-1 through 74-M, the user ID is replaced with a new user ID, which may be the same new user ID included in the anonymous user record 72. The anonymous profile category records 74-1 through 74-M include the same category IDs and lists of keywords as the corresponding profile category records 70-1 through 70-M. Note that the location of the user 16 is not stored in the anonymous user record 72. With respect to location, it is sufficient that the anonymous user record 72 is linked to a location bucket.

In another embodiment, the history manager 50 performs anonymization in a manner similar to that described above with respect to FIG. 6. However, in this embodiment, the profile category records for the group of users in a location bucket, or the group of users in a number of location buckets representing a node in a quadtree data structure (see below), may be selectively randomized among the anonymous user records of those users. In other words, each anonymous user record would have a user profile including a selectively randomized set of profile category records (including keywords) from a cumulative list of profile category records for all of the users in the group.

In yet another embodiment, rather than creating anonymous user records 72 for the users 16 in the lists maintained for the location buckets, the history manager 50 may perform anonymization by storing an aggregate user profile for each location bucket, or each group of location buckets representing a node in a quadtree data structure (see below). The aggregate user profile may include a list of all keywords and potentially the number of occurrences of each keyword in the user profiles of the corresponding group of users. In this manner, the data stored by the history manager 50 is not connected back to the users 16.

FIG. 7 is a flow chart illustrating the storing step (step 1104) of FIG. 5 in more detail according to one embodiment of the present disclosure. First, the history manager 50 processes the location buckets using a quadtree algorithm to produce a quadtree data structure, where each node of the quadtree data structure includes one or more of the location buckets having a combined number of users that is at most a predefined maximum number of users (step 1200). Initially, a geographic area served by the MAP server 12 is divided into a number of geographic regions, each including multiple location buckets. These geographic regions are also referred to herein as base quadtree regions. The geographic area served by the MAP server 12 may be, for example, a city, a state, a country, a continent, or the like. Further, the geographic area may be the only geographic area served by the MAP server 12 or one of a number of geographic areas served by the MAP server 12. Preferably, each of the base quadtree regions has a size of $2^n \times 2^n$ location buckets, where n is an integer greater than or equal to 1. Each base quadtree region is then recursively divided into four quadrants using the quadtree algorithm. Once the combined number of users in the location buckets within a quadrant is less than or equal to a predefined maximum number of users (e.g., 3 users) or a predefined maximum depth is reached, division of that quadrant stops and that quadrant is identified as a node in the quadtree data structure.

The history manager 50 then stores a history object for each node in the quadtree data structure having at least one user (step 1202). Each history object includes location information, timing information, data, and quadtree data structure information. The location information included in the history object defines a combined geographic area of the location bucket(s) forming the corresponding node of the quadtree data structure. For example, the location information may be latitude and longitude coordinates for a northeast corner of the combined geographic area of the node of the quadtree data structure and a southwest corner of the combined geographic area for the node of the quadtree data structure. The timing information includes information defining a time window for the history object, which may be, for example, a start time for the corresponding time interval and an end time for the corresponding time interval. The data includes the anonymized user profile data for the users in the list(s) maintained for the location bucket(s) forming the node of the quadtree data structure for which the history object is stored. In addition, the data may include a total number of users in the location bucket(s) forming the node of the quadtree data structure. Lastly, the quadtree data structure information includes information defining a quadtree depth of the node in the quadtree data structure.

FIG. 8 illustrates the operation of the system 10 of FIG. 1 wherein a mobile device 14 is enabled to request and receive historical data from the MAP server 12 according to one embodiment of the present disclosure. As illustrated, in this embodiment, the MAP application 28 of the mobile device 14 sends a historical request to the MAP client 26 of the mobile device 14 (step 1300). In one embodiment, the historical request identifies either a POI or an AOI and a time window. A POI is a geographic point whereas an AOI is a geographic area. In one embodiment, the historical request is for a POI and a time window, where the POI is a POI corresponding to the current location of the user 16, a POI selected from a list of POIs defined by the user 16 of the mobile device 14, a POI selected from a list of POIs defined by the MAP application 28 or the MAP server 12, a POI selected by the user 16 from a map, a POI implicitly defined via a separate application (e.g., POI is implicitly defined as the location of the nearest Starbucks coffee house in response to the user 16 performing a Google search for "Starbucks"), or the like. If the POI is selected from a list of POIs, the list of POIs may include static POIs which may be defined by street addresses or latitude and longitude coordinates, dynamic POIs which may be defined as the current locations of one or more friends of the user 16, or both.

In another embodiment, the historical request is for an AOI and a time window, where the AOI may be an AOI of a geographic area of a predefined shape and size centered at the current location of the user 16, an AOI selected from a list of AOIs defined by the user 16, an AOI selected from a list of AOIs defined by the MAP application 28 or the MAP server 12, an AOI selected by the user 16 from a map, an AOI implicitly defined via a separate application (e.g., AOI is implicitly defined as an area of a predefined shape and size centered at the location of the nearest Starbucks coffee house in response to the user 16 performing a Google search for "Starbucks"), or the like. If the AOI is selected from a list of AOIs, the list of AOIs may include static AOIs, dynamic AOIs which may be defined as areas of a predefined shape and size centered at the current locations of one or more friends of the user 16, or both. Note that the POI or AOI of the historical request may be selected by the user 16 via the MAP application 28. In yet another embodiment, the MAP application 28 automatically uses the current location of the user 16 as the POI or as a center point for an AOI of a predefined shape and size.

The time window for the historical request may be relative to the current time. For example, the time window may be the last hour, the last day, the last week, the last month, or the like. Alternatively, the time window may be an arbitrary time window selected by the user 16 such as, for example, yesterday from 7 pm-9 pm, last Friday, last week, or the like. Note that while in this example the historical request includes a single POI or AOI and a single time window, the historical request may include multiple POIs or AOIs and/or multiple time windows.

In one embodiment, the historical request is made in response to user input from the user 16 of the mobile device 14. For instance, in one embodiment, the user 16 selects either a POI or an AOI and a time window and then instructs the MAP application 28 to make the historical request by, for example, selecting a corresponding button on a graphical user interface. In another embodiment, the historical request is made automatically in response to some event such as, for example, opening the MAP application 28.

Upon receiving the historical request from the MAP application 28, the MAP client 26 forwards the historical request to the MAP server 12 (step 1302). Note that the MAP client 26 may, in some cases, process the historical request from the MAP application 28 before forwarding the historical request to the MAP server 12. For example, if the historical request from the MAP application 28 is for multiple POIs/AOIs and/or for multiple time windows, the MAP client 26 may process the historical request from the MAP application 28 to produce multiple historical requests to be sent to the MAP server 12. For instance, a separate historical request may be produced for each POI/AOI and time window combination. However, for this discussion, the historical request is for a single POI or AOI for a single time window.

Upon receiving the historical request from the MAP client 26, the MAP server 12 processes the historical request (step 1304). More specifically, the historical request is processed by the history manager 50 of the MAP server 12. First, the history manager 50 obtains history objects that are relevant to the historical request from the datastore 60 of the MAP server 12. The relevant history objects are those recorded for locations relevant to the POI or AOI and the time window for the historical request. The history manager 50 then processes the relevant history objects to provide historical aggregate profile data for the POI or AOI. The historical aggregate profile data may be provided in a time context and/or a geographic context. In this embodiment, the historical aggregate profile data is based on the user profiles of the anonymous user records in the relevant history objects as compared to the user profile of the user 16 or a select subset thereof. In another embodiment, the historical aggregate profile data is based on the user profiles of the anonymous user records in the relevant history objects as compared to a target user profile defined or otherwise specified by the user 16.

For the time context, the history manager 50 divides the time window for the historical request into a number of time bands. Each time band is a fragment of the time window. Then, for each time band, the history manager 50 identifies a subset of the relevant history objects that are relevant to the time band (i.e., history objects recorded for time periods within the time band or that overlap the time band) and generates an aggregate profile for each of those history objects based on the user profiles of the anonymous user records in the history objects and the user profile, or a select subset of the user profile, of the user 16. Then, the history manager 50 averages or otherwise combines the aggregate profiles for the history objects relevant to the time band. The resulting data for the time bands forms historical aggregate profile data that is to be returned to the MAP client 26, as discussed below.

For the geographic context, the history manager 50 generates an average aggregate profile for each of a number of grids surrounding the POI or within the AOI. More specifically, history objects relevant to the POI or the AOI and the time window of the historical request are obtained. Then, the user profiles of the anonymous users in the relevant history objects are used to generate average aggregate profiles for a number of grids, or geographic regions, at or surrounding the POI or the AOI. These average aggregate profiles for the grids form historical aggregate profile data that is to be returned to the MAP client 26, as discussed below.

Once the MAP server 12 has processed the historical request, the MAP server 12 returns the resulting historical aggregate profile data to the MAP client 26 (step 1306). As discussed above, the historical aggregate profile data may be in a time context or a geographic context. In an alternative embodiment, the data returned to the MAP client 26 may be raw historical data. The raw historical data may be the relevant history objects or data from the relevant history objects such as, for example, the user records in the relevant history objects, the user profiles of the anonymous user records in the relevant history objects, or the like.

Upon receiving the historical aggregate profile data, the MAP client 26 passes the historical aggregate profile data to the MAP application 28 (step 1308). Note that in an alternative embodiment where the data returned by the MAP server 12 is raw historical data, the MAP client 26 may process the raw historical data to provide desired data. For example, the MAP client 26 may process the raw historical data in order to generate average aggregate profiles for time bands within the time window of the historical request and/or to generate average aggregate profiles for regions near the POI or within the AOI of the historical request in a manner similar to that described above. The MAP application 28 then presents the historical aggregate profile data to the user 16 (step 1310).

FIG. 9 illustrates the operation of the system 10 of FIG. 1 wherein the subscriber device 18 is enabled to request and receive historical aggregate profile data from the MAP server 12 according to one embodiment of the present disclosure. Note that, in a similar manner, the third-party service 22 may send historical requests to the MAP server 12. As illustrated, in this embodiment, the subscriber device 18 sends a historical request to the MAP server 12 (step 1400). In one embodiment, the subscriber device 18 sends the historical request to the MAP server 12 via a web browser. The historical request preferably identifies either a POI or an AOI and a time window. The historical request may be made in response to user input from the subscriber 20 of the subscriber device 18 or made automatically in response to an event such as, for example, navigation to a website associated with a POI (e.g., navigation to a website of a restaurant).

Upon receiving the historical request, the MAP server 12 processes the historical request (step 1402). More specifically, as discussed above, the historical request is processed by the history manager 50 of the MAP server 12. First, the history manager 50 obtains history objects that are relevant to the historical request from the datastore 60 of the MAP server 12. The relevant history objects are those relevant to the POI or the AOI and the time window for the historical request. The history manager 50 then processes the relevant history objects to provide historical aggregate profile data for the POI or the AOI in a time context and/or a geographic context. In this embodiment, the historical aggregate profile data is based on comparisons of the user profiles of the anonymous user records in the relevant history objects to one another. In another embodiment, the aggregate profile data is based on comparisons of the user profiles of the anonymous user records in the relevant history objects and a target user profile.

Once the MAP server 12 has processed the historical request, the MAP server 12 returns the resulting historical aggregate profile data to the subscriber device 18 (step 1404). The historical aggregate profile data may be in the time context or the geographic context. In this embodiment where the historical aggregate profile data is to be presented via a web browser of the subscriber device 18, the MAP server 12 formats the historical aggregate profile data in a suitable format before sending the historical aggregate profile data to the web browser of the subscriber device 18. Upon receiving the historical aggregate profile data, the subscriber device 18 presents the historical aggregate profile data to the subscriber 20 (step 1406).

FIGS. 10 through 15 describe the operation of the crowd analyzer 52 of the MAP server 12 to form and track crowds of users and the operation of the MAP server 12 to serve crowd data requests and crowd tracking requests according to one embodiment of the present disclosure. FIG. 10 illustrates exemplary data records that may be used to represent crowds, users, crowd snapshots, and anonymous users according to one embodiment of the present disclosure. As illustrated, for each crowd created by the crowd analyzer 52 of the MAP server 12 (i.e., each crowd created that has three or more users), a corresponding crowd record 76 is created and stored in the datastore 60 of the MAP server 12. The crowd record 76 for a crowd includes a users field, a North-East (NE) corner field, a South-West (SW) corner field, a center field, a crowd snapshots field, a split from field, and a combined into field. The users field stores a set or list of user records 78 corresponding to a subset of the users 16 that are currently in the crowd. The NE corner field stores a location corresponding to a NE corner of a bounding box for the crowd. The NE corner may be defined by latitude and longitude coordinates and optionally an altitude. Similarly, the SW corner field stores a location of a SW corner of the bounding box for the crowd. Like the NE corner, the SW corner may be defined by latitude and longitude coordinates and optionally an altitude. Together, the NE corner and the SW corner define a bounding box for the crowd, where the edges of the bounding box pass through the current locations of the outermost users in the crowd. The center field stores a location corresponding to a center of the crowd. The center of the crowd may be defined by latitude and longitude coordinates and optionally an altitude. Together, the NE corner, the SW corner, and the center of the crowd form spatial information defining the location of the crowd. Note, however, that the spatial information defining the location of the crowd may include additional or alternative information depending on the particular implementation. The crowd snapshots field stores a list of crowd snapshot records 80 corresponding to crowd snapshots for the crowd. The split from field may be used to store a reference to a crowd record 76 corresponding to another crowd from which the crowd split, and the combined into field may be used to store a reference to a crowd record 76 corresponding to another crowd into which the crowd has been merged.

Each of the user records 78 includes an ID field, a location field, a profile field, a crowd field, and a previous crowd field. The ID field stores a unique ID for the user 16 for which the user record 78 is stored. The location field stores the current location of the user 16, which may be defined by latitude and longitude coordinates and optionally an altitude. The profile field stores the user profile of the user 16, which may be defined as a list of keywords for one or more profile categories. The crowd field is used to store a reference to a crowd record 76 of a crowd of which the user 16 is currently a member. The previous crowd field may be used to store a reference to a crowd record 76 of a crowd of which the user 16 was previously a member.

Each of the crowd snapshot records 80 includes an anonymous users field, a NE corner field, a SW corner field, a center field, a sample time field, and a vertices field. The anonymous users field stores a set or list of anonymous user records 82, which are anonymized versions of the user records 78 for the users 16 that are in the crowd at a time the crowd snapshot was created. The NE corner field stores a location corresponding to a NE corner of a bounding box for the crowd at the time the crowd snapshot was created. The NE corner may be defined by latitude and longitude coordinates and optionally an altitude. Similarly, the SW corner field stores a location of a SW corner of the bounding box for the crowd at the time the crowd snapshot was created. Like the NE corner, the SW corner may be defined by latitude and longitude coordinates and optionally an altitude. The center field stores a location corresponding to a center of the crowd at the time the crowd snapshot was created. The center of the crowd may be defined by latitude and longitude coordinates and optionally an altitude. Together, the NE corner, the SW corner, and the center of the crowd form spatial information defining the location of the crowd at the time the crowd snapshot was created. Note, however, that the spatial information defining the location of the crowd at the time the crowd snapshot was created may include additional or alternative information depending on the particular implementation. The sample time field stores a timestamp indicating a time at which the crowd snapshot was created. The timestamp preferably includes a date and a time of day at which the crowd snapshot was created. The vertices field stores locations of users in the crowd at the time the crowd snapshot was created that define an actual outer boundary of the crowd (e.g., a polygon) at the time the crowd snapshot was created. Note that the actual outer boundary of a crowd may be used to show the location of the crowd when displayed to a user.

Each of the anonymous user records 82 includes an anonymous ID field and a profile field. The anonymous ID field stores an anonymous user ID, which is preferably a unique user ID that is not tied, or linked, back to any of the users 16 and particularly not tied back to the user 16 or the user record 78 for which the anonymous user record 82 has been created. In one embodiment, the anonymous user records 82 for a crowd snapshot record 80 are anonymized versions of the user records 78 of the users 16 in the crowd at the time the crowd snapshot was created. The manner in which the user records 78 are anonymized to create the anonymous user records 82 may be the same as that described above with respect to maintaining a historical record of anonymized user profile data according to location. The profile field stores the anonymized user profile of the anonymous user, which may be defined as a list of keywords for one or more profile categories.

FIGS. 11A through 11D illustrate one embodiment of a spatial crowd formation process that may be used to enable the crowd tracking feature. In this embodiment, the spatial crowd formation process is triggered in response to receiving a location update for one of the users 16 and is preferably repeated for each location update received for the users 16. As such, first, the crowd analyzer 52 receives a location update, or a new location, for a user 16 (step 1500). In response, the crowd analyzer 52 retrieves an old location of the user 16, if any (step 1502). The old location is the current location of the user 16 prior to receiving the new location of the user 16. The crowd analyzer 52 then creates a new bounding box of a predetermined size centered at the new location of the user 16 (step 1504) and an old bounding box of a predetermined size centered at the old location of the user 16, if any (step 1506). The predetermined size of the new and old bounding boxes may be any desired size. As one example, the predetermined size of the new and old bounding boxes is 40 meters by 40 meters. Note that if the user 16 does not have an old location (i.e., the location received in step 1500 is the first location received for the user 16), then the old bounding box is essentially null. Also note that while bounding "boxes" are used in this example, the bounding regions may be of any desired shape.

Next, the crowd analyzer 52 determines whether the new and old bounding boxes overlap (step 1508). If so, the crowd analyzer 52 creates a bounding box encompassing the new and old bounding boxes (step 1510). For example, if the new and old bounding boxes are 40×40 meter regions and a 1×1 meter square at the northeast corner of the new bounding box overlaps a 1×1 meter square at the southwest corner of the old bounding box, the crowd analyzer 52 may create a 79×79 meter square bounding box encompassing both the new and old bounding boxes.

The crowd analyzer 52 then determines the individual users and crowds relevant to the bounding box created in step 1510 (step 1512). Note that the crowds relevant to the bounding box are pre-existing crowds resulting from previous iterations of the spatial crowd formation process. In this embodiment, the crowds relevant to the bounding box are crowds having crowd bounding boxes that are within or overlap the bounding box established in step 1510. In order to determine the relevant crowds, the crowd analyzer 52 queries the datastore 60 of the MAP server 12 to obtain crowd records for crowds that are within or overlap the bounding box established in step 1510. The individual users relevant to the bounding box are users 16 that are currently located within the bounding box and are not already members of a crowd. In order to identify the relevant individual users, the crowd analyzer 52 queries the datastore 60 of the MAP server 12 for user records of users 16 that are currently located in the bounding box created in step 1510 and are not already members of a crowd. Next, the crowd analyzer 52 computes an optimal inclusion distance for individual users based on user density within the bounding box (step 1514). More specifically, in one embodiment, the optimal inclusion distance for individuals, which is also referred to herein as an initial optimal inclusion distance, is set according to the following equation:

$$\text{initial\_optimal\_inclusion\_dist} = a \cdot \sqrt{\frac{A_{BoundingBox}}{\text{number\_of\_users}}},$$

where a is a number between 0 and 1, $A_{BoundingBox}$ is an area of the bounding box, and number_of_users is the total number of users in the bounding box. The total number of users in the bounding box includes both individual users that are not already in a crowd and users that are already in a crowd. In one embodiment, a is ⅔.

The crowd analyzer 52 then creates a crowd of one user for each individual user within the bounding box established in step 1510 that is not already included in a crowd and sets the optimal inclusion distance for those crowds to the initial optimal inclusion distance (step 1516). The crowds created for the individual users are temporary crowds created for purposes of performing the crowd formation process. At this point, the process proceeds to FIG. 11B where the crowd analyzer 52 analyzes the crowds in the bounding box established in step 1510 to determine whether any of the crowd members (i.e., users in the crowds) violate the optimal inclusion distance of their crowds (step 1518). Any crowd member that violates the optimal inclusion distance of his or her crowd is then removed from that crowd and the previous crowd fields in the corresponding user records are set (step 1520). More specifically, in this embodiment, a member is removed from a crowd by removing the user record of the member from the set or list of user records in the crowd record of the crowd and setting the previous crowd stored in the user record of the member to the crowd from which the member has been removed. The crowd analyzer 52 then creates a crowd of one user for each of the users removed from their crowds in step 1520 and sets the optimal inclusion distance for the newly created crowds to the initial optimal inclusion distance (step 1522).

Next, the crowd analyzer 52 determines the two closest crowds in the bounding box (step 1524) and a distance between the two closest crowds (step 1526). The distance between the two closest crowds is the distance between the crowd centers of the two closest crowds, which are stored in the crowd records for the two closest crowds. The crowd analyzer 52 then determines whether the distance between the two closest crowds is less than the optimal inclusion distance of a larger of the two closest crowds (step 1528). If the two closest crowds are of the same size (i.e., have the same number of users), then the optimal inclusion distance of either of the two closest crowds may be used. Alternatively, if the two closest crowds are of the same size, the optimal inclusion distances of both of the two closest crowds may be used such that the crowd analyzer 52 determines whether the distance between the two closest crowds is less than the optimal inclusion distances of both of the crowds. As another alternative, if the two closest crowds are of the same size, the crowd analyzer 52 may compare the distance between the two closest crowds to an average of the optimal inclusion distances of the two crowds.

If the distance between the two closest crowds is greater than the optimal inclusion distance, the process proceeds to step 1540. However, if the distance between the two closest crowds is less than the optimal inclusion distance, the two crowds are merged (step 1530). The manner in which the two crowds are merged differs depending on whether the two crowds are pre-existing crowds or temporary crowds created for the spatial crowd formation process. If both crowds are pre-existing crowds, one of the two crowds is selected as a non-surviving crowd and the other is selected as a surviving crowd. If one crowd is larger than the other, the smaller crowd is selected as the non-surviving crowd and the larger crowd is selected as a surviving crowd. If the two crowds are of the same size, one of the crowds is selected as the surviving crowd and the other crowd is selected as the non-surviving crowd using any desired technique. The non-surviving crowd is then merged into the surviving crowd by adding the set or list of user records for the non-surviving crowd to the set or list of user records for the surviving crowd and setting the merged into field of the non-surviving crowd to a reference to the crowd record of the surviving crowd. In addition, the crowd analyzer 52 sets the previous crowd fields of the user records in the set or list of user records from the non-surviving crowd to a reference to the crowd record of the non-surviving crowd.

If one of the crowds is a temporary crowd and the other crowd is a pre-existing crowd, the temporary crowd is selected as the non-surviving crowd, and the pre-existing crowd is selected as the surviving crowd. The non-surviving crowd is then merged into the surviving crowd by adding the set or list of user records from the crowd record of the non-surviving crowd to the set or list of user records in the crowd record of the surviving crowd. However, since the non-surviving crowd is a temporary crowd, the previous crowd field(s) of the user record(s) of the user(s) in the non-surviving crowd are not set to a reference to the crowd record of the non-surviving crowd. Similarly, the crowd record of the temporary record may not have a merged into field, but, if it does, the merged into field is not set to a reference to the surviving crowd.

If both the crowds are temporary crowds, one of the two crowds is selected as a non-surviving crowd and the other is selected as a surviving crowd. If one crowd is larger than the other, the smaller crowd is selected as the non-surviving crowd and the larger crowd is selected as a surviving crowd. If the two crowds are of the same size, one of the crowds is selected as the surviving crowd and the other crowd is selected as the non-surviving crowd using any desired technique. The non-surviving crowd is then merged into the surviving crowd by adding the set or list of user records for the non-surviving crowd to the set or list of user records for the surviving crowd. However, since the non-surviving crowd is a temporary crowd, the previous crowd field(s) of the user record(s) of the user(s) in the non-surviving crowd are not set to a reference to the crowd record of the non-surviving crowd. Similarly, the crowd record of the temporary record may not have a merged into field, but, if it does, the merged into field is not set to a reference to the surviving crowd.

Next, the crowd analyzer 52 removes the non-surviving crowd (step 1532). In this embodiment, the manner in which the non-surviving crowd is removed depends on whether the non-surviving crowd is a pre-existing crowd or a temporary crowd. If the non-surviving crowd is a pre-existing crowd, the removal process is performed by removing or nulling the users field, the NE corner field, the SW corner field, and the center field of the crowd record of the non-surviving crowd. In this manner, the spatial information for the non-surviving crowd is removed from the corresponding crowd record such that the non-surviving or removed crowd will no longer be found in response to spatial-based queries on the datastore 60. However, the crowd snapshots for the non-surviving crowd are still available via the crowd record for the non-surviving crowd. In contrast, if the non-surviving crowd is a temporary crowd, the crowd analyzer 52 may remove the crowd by deleting the corresponding crowd record.

The crowd analyzer 52 also computes a new crowd center for the surviving crowd (step 1534). Again, a center of mass algorithm may be used to compute the crowd center of a crowd. In addition, a new optimal inclusion distance for the surviving crowd is computed (step 1536). In one embodiment, the new optimal inclusion distance for the resulting crowd is computed as:

$$\text{average} = \frac{1}{n+1} \cdot \left( \text{initial\_optimal\_inclusion\_dist} + \sum_{i=1}^{n} d_i \right),$$

$$\text{optimial\_inclusion\_dist} = \text{average} + \sqrt{\left( \frac{1}{n} \cdot \sum_{i=1}^{n} (d_i - \text{average})^2 \right)},$$

where n is the number of users in the crowd and $d_i$ is a distance between the ith user and the crowd center. In other words, the new optimal inclusion distance is computed as the average of the initial optimal inclusion distance and the distances between the users in the crowd and the crowd center plus one standard deviation.

At this point, the crowd analyzer 52 determines whether a maximum number of iterations have been performed (step 1538). The maximum number of iterations is a predefined number that ensures that the crowd formation process does not indefinitely loop over steps 1518 through 1536 or loop over steps 1518 through 1536 more than a desired maximum number of times. If the maximum number of iterations has not been reached, the process returns to step 1518 and is repeated until either the distance between the two closest crowds is not less than the optimal inclusion distance of the larger crowd or the maximum number of iterations has been reached. At that point, the crowd analyzer 52 removes crowds with less than three users, or members (step 1540) and the process ends. Note that three (3) users is the minimum number of users in a crowd in this embodiment. However, the present disclosure is not limited thereto. As discussed above, in this embodiment, the manner in which a crowd is removed depends on whether the crowd is a pre-existing crowd or a temporary crowd. If the crowd is a pre-existing crowd, a removal process is performed by removing or nulling the users field, the NE corner field, the SW corner field, and the center field of the crowd record of the crowd. In this manner, the spatial information for the crowd is removed from the corresponding crowd record such that the crowd will no longer be found in response to spatial-based queries on the datastore 60. However, the crowd snapshots for the crowd are still available via the crowd record for the crowd. In contrast, if the crowd is a temporary crowd, the crowd analyzer 52 may remove the crowd by deleting the corresponding crowd record. In this manner, crowds having less than three members are removed in order to maintain privacy of individuals as well as groups of two users (e.g., a couple).

Figure 11A:
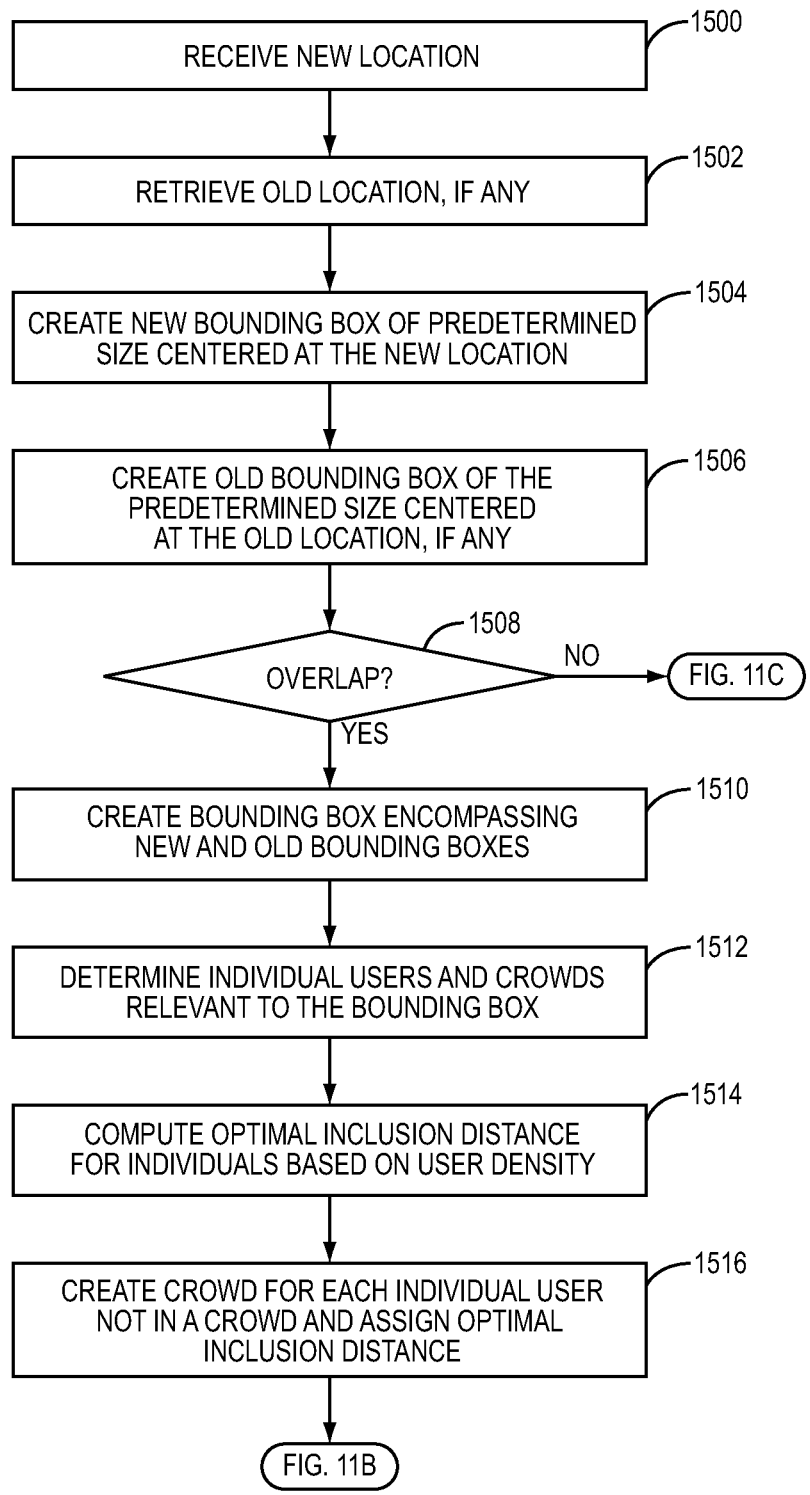
Figure 11B:
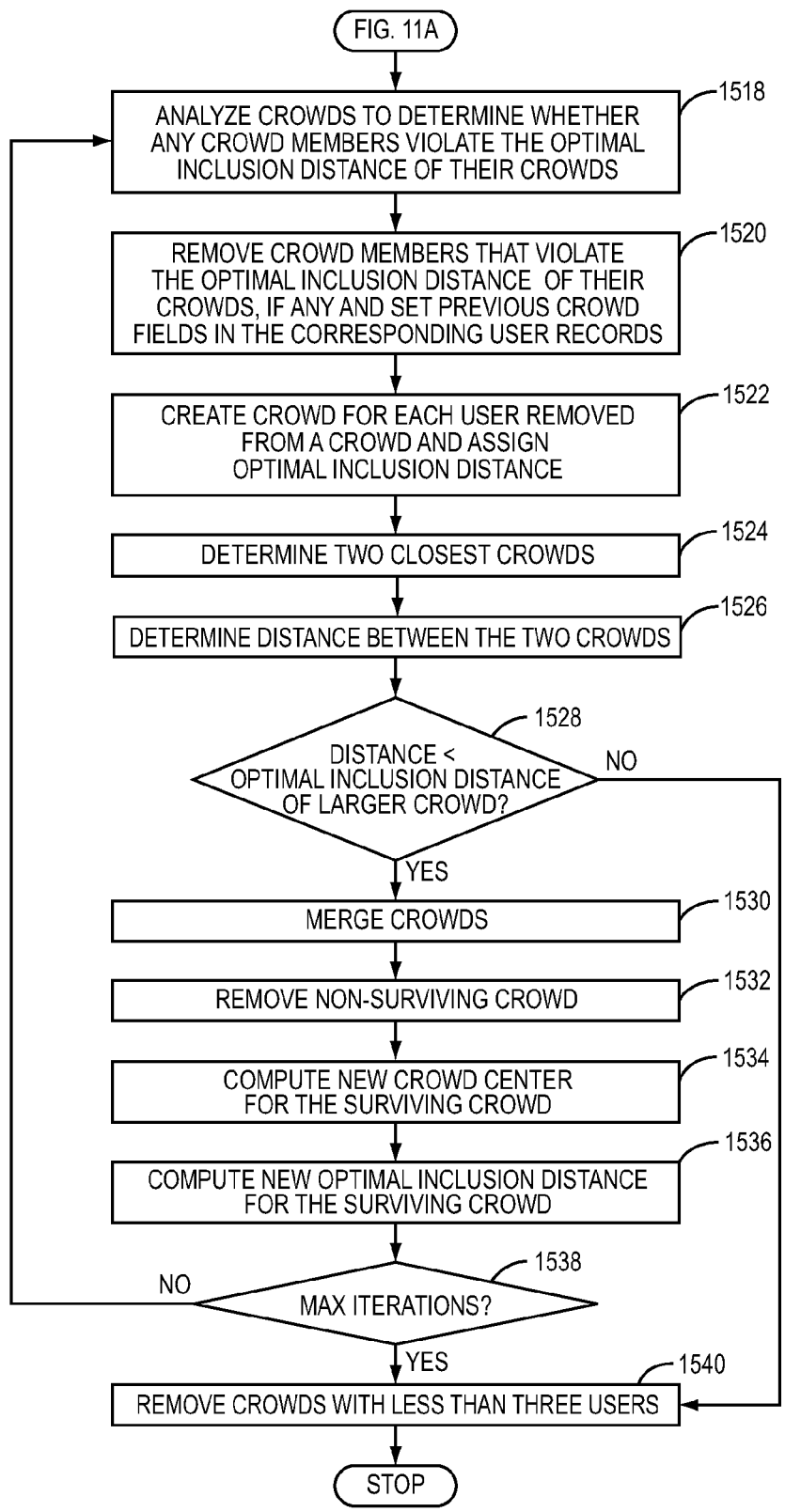
Figure 11C:
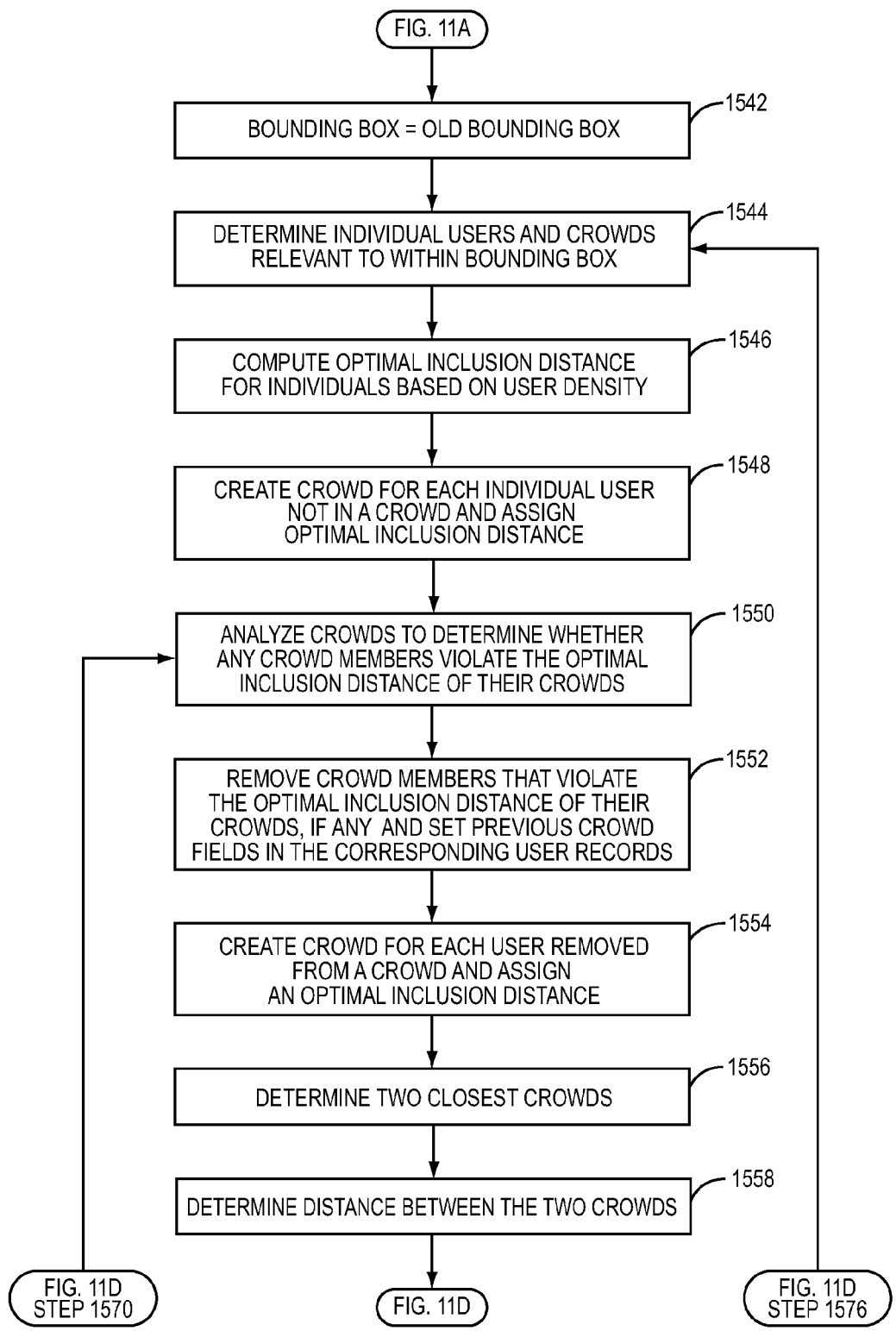
Figure 11D:
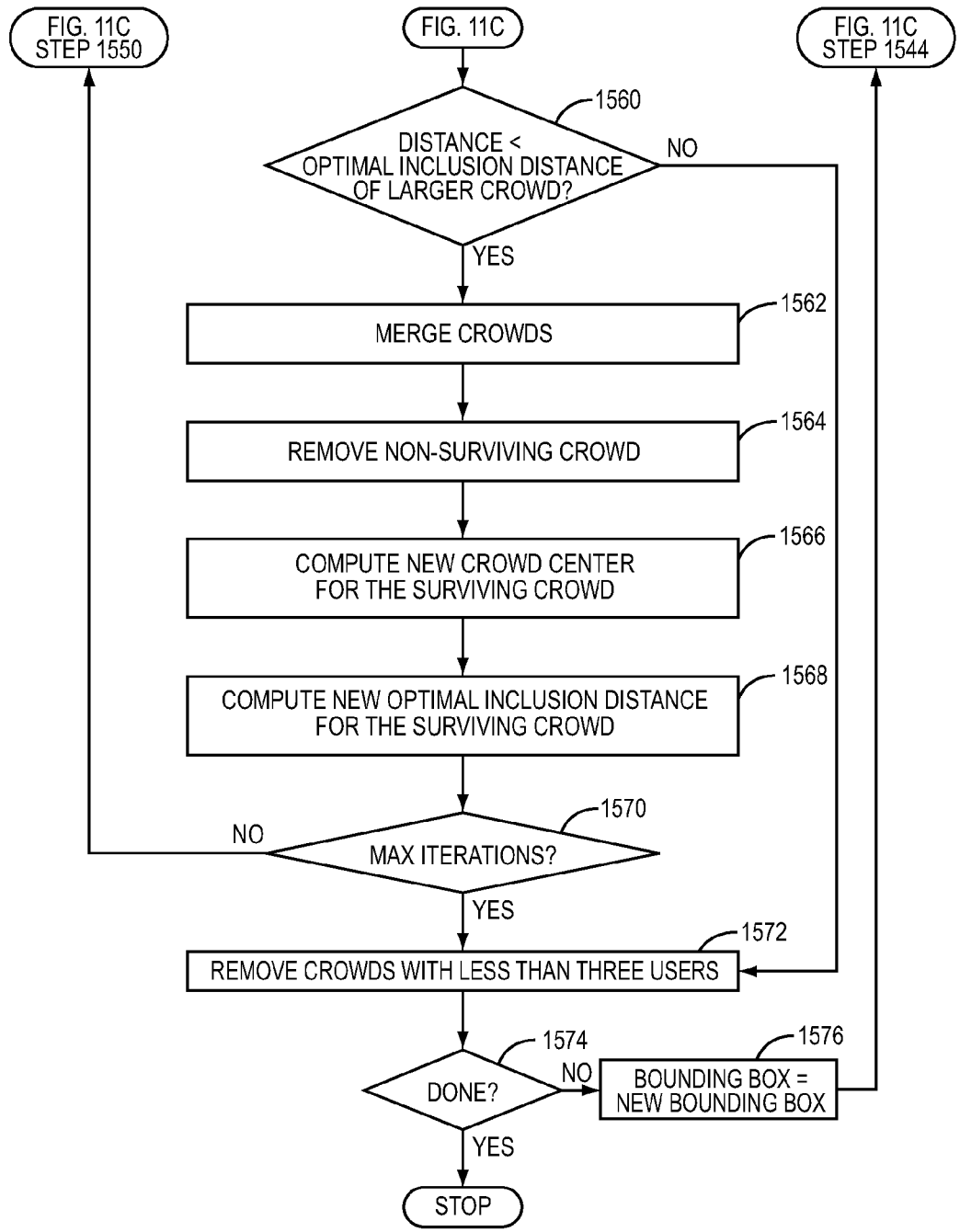

Returning to step 1508 in FIG. 11A, if the new and old bounding boxes do not overlap, the process proceeds to FIG. 11C and the bounding box to be processed is set to the old bounding box (step 1542). In general, the crowd analyzer 52 then processes the old bounding box in much that same manner as described above with respect to steps 1512 through 1540. More specifically, the crowd analyzer 52 determines the individual users and crowds relevant to the bounding box (step 1544). Again, note that the crowds relevant to the bounding box are pre-existing crowds resulting from previous iterations of the spatial crowd formation process. In this embodiment, the crowds relevant to the bounding box are crowds having crowd bounding boxes that are within or overlap the bounding box. The individual users relevant to the bounding box are users that are currently located within the bounding box and are not already members of a crowd. Next, the crowd analyzer 52 computes an optimal inclusion distance for individual users based on user density within the bounding box (step 1546). The optimal inclusion distance may be computed as described above with respect to step 1514.

The crowd analyzer 52 then creates a crowd of one user for each individual user within the bounding box that is not already included in a crowd and sets the optimal inclusion distance for the crowds to the initial optimal inclusion distance (step 1548). The crowds created for the individual users are temporary crowds created for purposes of performing the crowd formation process. At this point, the crowd analyzer 52 analyzes the crowds in the bounding box to determine whether any crowd members (i.e., users in the crowds) violate the optimal inclusion distance of their crowds (step 1550). Any crowd member that violates the optimal inclusion distance of his or her crowd is then removed from that crowd and the previous crowd fields in the corresponding user records are set (step 1552). More specifically, in this embodiment, a member is removed from a crowd by removing the user record of the member from the set or list of user records in the crowd record of the crowd and setting the previous crowd stored in the user record of the member to the crowd from which the member has been removed. The crowd analyzer 52 then creates a crowd for each of the users removed from their crowds in step 1552 and sets the optimal inclusion distance for the newly created crowds to the initial optimal inclusion distance (step 1554).

Next, the crowd analyzer 52 determines the two closest crowds in the bounding box (step 1556) and a distance between the two closest crowds (step 1558). The distance between the two closest crowds is the distance between the crowd centers of the two closest crowds. The crowd analyzer 52 then determines whether the distance between the two closest crowds is less than the optimal inclusion distance of a larger of the two closest crowds (step 1560). If the two closest crowds are of the same size (i.e., have the same number of users), then the optimal inclusion distance of either of the two closest crowds may be used. Alternatively, if the two closest crowds are of the same size, the optimal inclusion distances of both of the two closest crowds may be used such that the crowd analyzer 52 determines whether the distance between the two closest crowds is less than the optimal inclusion distances of both of the two closest crowds. As another alternative, if the two closest crowds are of the same size, the crowd analyzer 52 may compare the distance between the two closest crowds to an average of the optimal inclusion distances of the two closest crowds.

If the distance between the two closest crowds is greater than the optimal inclusion distance, the process proceeds to step 1572. However, if the distance between the two closest crowds is less than the optimal inclusion distance, the two crowds are merged (step 1562). The manner in which the two crowds are merged differs depending on whether the two crowds are pre-existing crowds or temporary crowds created for the spatial crowd formation process. If both crowds are pre-existing crowds, one of the two crowds is selected as a non-surviving crowd and the other is selected as a surviving crowd. If one crowd is larger than the other, the smaller crowd is selected as the non-surviving crowd and the larger crowd is selected as a surviving crowd. If the two crowds are of the same size, one of the crowds is selected as the surviving crowd and the other crowd is selected as the non-surviving crowd using any desired technique. The non-surviving crowd is then merged into the surviving crowd by adding the set or list of user records for the non-surviving crowd to the set or list of user records for the surviving crowd and setting the merged into field of the non-surviving crowd to a reference to the crowd record of the surviving crowd. In addition, the crowd analyzer 52 sets the previous crowd fields of the set or list of user records from the non-surviving crowd to a reference to the crowd record of the non-surviving crowd.

If one of the crowds is a temporary crowd and the other crowd is a pre-existing crowd, the temporary crowd is selected as the non-surviving crowd, and the pre-existing crowd is selected as the surviving crowd. The non-surviving crowd is then merged into the surviving crowd by adding the user records from the set or list of user records from the crowd record of the non-surviving crowd to the set or list of user records in the crowd record of the surviving crowd. However, since the non-surviving crowd is a temporary crowd, the previous crowd field(s) of the user record(s) of the user(s) in the non-surviving crowd are not set to a reference to the crowd record of the non-surviving crowd. Similarly, the crowd record of the temporary record may not have a merged into field, but, if it does, the merged into field is not set to a reference to the surviving crowd.

If both the crowds are temporary crowds, one of the two crowds is selected as a non-surviving crowd and the other is selected as a surviving crowd. If one crowd is larger than the other, the smaller crowd is selected as the non-surviving crowd and the larger crowd is selected as a surviving crowd. If the two crowds are of the same size, one of the crowds is selected as the surviving crowd and the other crowd is selected as the non-surviving crowd using any desired technique. The non-surviving crowd is then merged into the surviving crowd by adding the set or list of user records for the non-surviving crowd to the set or list of user records for the surviving crowd. However, since the non-surviving crowd is a temporary crowd, the previous crowd field(s) of the user record(s) of the user(s) in the non-surviving crowd are not set to a reference to the crowd record of the non-surviving crowd. Similarly, the crowd record of the temporary record may not have a merged into field, but, if it does, the merged into field is not set to a reference to the surviving crowd.

Next, the crowd analyzer 52 removes the non-surviving crowd (step 1564). In this embodiment, the manner in which the non-surviving crowd is removed depends on whether the non-surviving crowd is a pre-existing crowd or a temporary crowd. If the non-surviving crowd is a pre-existing crowd, the removal process is performed by removing or nulling the users field, the NE corner field, the SW corner field, and the center field of the crowd record of the non-surviving crowd. In this manner, the spatial information for the non-surviving crowd is removed from the corresponding crowd record such that the non-surviving or removed crowd will no longer be found in response to spatial-based queries on the datastore 60. However, the crowd snapshots for the non-surviving crowd are still available via the crowd record for the non-surviving crowd. In contrast, if the non-surviving crowd is a temporary crowd, the crowd analyzer 52 may remove the crowd by deleting the corresponding crowd record.

The crowd analyzer 52 also computes a new crowd center for the surviving crowd (step 1566). Again, a center of mass algorithm may be used to compute the crowd center of a crowd. In addition, a new optimal inclusion distance for the surviving crowd is computed (step 1568). In one embodiment, the new optimal inclusion distance for the surviving crowd is computed as described above with respect to 1536.

At this point, the crowd analyzer 52 determines whether a maximum number of iterations have been performed (step 1570). If the maximum number of iterations has not been reached, the process returns to step 1550 and is repeated until either the distance between the two closest crowds is not less than the optimal inclusion distance of the larger crowd or the maximum number of iterations has been reached. At that point, the crowd analyzer 52 removes crowds with less than three users, or members (step 1572). As discussed above, in this embodiment, the manner in which a crowd is removed depends on whether the crowd is a pre-existing crowd or a temporary crowd. If the crowd is a pre-existing crowd, a removal process is performed by removing or nulling the users field, the NE corner field, the SW corner field, and the center field of the crowd record of the crowd. In this manner, the spatial information for the crowd is removed from the corresponding crowd record such that the crowd will no longer be found in response to spatial-based queries on the datastore 60. However, the crowd snapshots for the crowd are still available via the crowd record for the crowd. In contrast, if the crowd is a temporary crowd, the crowd analyzer 52 may remove the crowd by deleting the corresponding crowd record. In this manner, crowds having less than three members are removed in order to maintain privacy of individuals as well as groups of two users (e.g., a couple).

The crowd analyzer 52 then determines whether the crowd formation process for the new and old bounding boxes is done (step 1574). In other words, the crowd analyzer 52 determines whether both the new and old bounding boxes have been processed. If not, the bounding box is set to the new bounding box (step 1576), and the process returns to step 1544 and is repeated for the new bounding box. Once both the new and old bounding boxes have been processed, the crowd formation process ends.

FIG. 12 illustrates a process for creating crowd snapshots according to one embodiment of the present disclosure. In this embodiment, after the spatial crowd formation process of FIGS. 11A through 11D is performed in response to a location update for a user, the crowd analyzer 52 detects crowd change events, if any, for the relevant crowds (step 1600). The relevant crowds are pre-existing crowds that are within the bounding region(s) processed during the spatial crowd formation process in response to the location update for the user. The crowd analyzer 52 may detect crowd change events by comparing the crowd records of the relevant crowds before and after performing the spatial crowd formation process in response to the location update for the user. The crowd change events may be a change in the users in the crowd, a change to a location of one of the users within the crowd, or a change in the spatial information for the crowd (e.g., the NE corner, the SW corner, or the crowd center). Note that if multiple crowd change events are detected for a single crowd, then those crowd change events are preferably consolidated into a single crowd change event.

Next, the crowd analyzer 52 determines whether there are any crowd change events (step 1602). If not, the process ends. Otherwise, the crowd analyzer 52 gets the next crowd change event (step 1604) and generates a crowd snapshot for a corresponding crowd (step 1606). More specifically, the crowd change event identifies a crowd record stored for a crowd for which the crowd change event was detected. A crowd snapshot is then created for that crowd by creating a new crowd snapshot record for the crowd and adding the new crowd snapshot to the list of crowd snapshots stored in the crowd record for the crowd. The crowd snapshot record includes a set or list of anonymized user records, which are an anonymized version of the user records for the users in the crowd at the current time. In addition, the crowd snapshot record includes the NE corner, the SW corner, and the center of the crowd at the current time as well as a timestamp defining the current time as the sample time at which the crowd snapshot record was created. Lastly, locations of users in the crowd that define the outer boundary of the crowd at the current time are stored in the crowd snapshot record as the vertices of the crowd. After creating the crowd snapshot, the crowd analyzer 52 determines whether there are any more crowd change events (step 1608). If so, the process returns to step 1604 and is repeated for the next crowd change event. Once all of the crowd change events are processed, the process ends.

FIG. 13 illustrates the operation the system 10 of FIG. 1 to enable the mobile devices 14 to request crowd data for currently formed crowds according to one embodiment of the present disclosure. In a similar manner, requests may be received from the third-party applications 30. First, the MAP application 28 sends a crowd request to the MAP client 26 (step 1700). The crowd request is a request for crowd data for crowds currently formed near a specified POI or within a specified AOI. The crowd request may be initiated by the user 16 of the mobile device 14 via the MAP application 28 or may be initiated automatically by the MAP application 28 in response to an event such as, for example, start-up of the MAP application 28, movement of the user 16, or the like. In one embodiment, the crowd request is for a POI, where the POI is a POI corresponding to the current location of the user 16 of the mobile device 14, a POI selected from a list of POIs defined by the user 16 of the mobile device 14, a POI selected from a list of POIs defined by the MAP application 28 or the MAP server 12, a POI selected by the user 16 of the mobile device 14 from a map, a POI implicitly defined via a separate application (e.g., POI is implicitly defined as the location of the nearest Starbucks coffee house in response to the user 16 performing a Google search for "Starbucks"), or the like. If the POI is selected from a list of POIs, the list of POIs may include static POIs which may be defined by street addresses or latitude and longitude coordinates, dynamic POIs which may be defined as the current locations of one or more friends of the user 16, or both. Note that in some embodiments, the user 16 may be enabled to define a POI by selecting a crowd center of a crowd as a POI, where the POI would thereafter remain static at that point and would not follow the crowd.

In another embodiment, the crowd request is for an AOI, where the AOI may be an AOI of a predefined shape and size centered at the current location of the user 16 of the mobile device 14, an AOI selected from a list of AOIs defined by the user 16 of the mobile device 14, an AOI selected from a list of AOIs defined by the MAP application 28 or the MAP server 12, an AOI selected by the user 16 of the mobile device 14 from a map, an AOI implicitly defined via a separate application (e.g., AOI is implicitly defined as an area of a predefined shape and size centered at the location of the nearest Starbucks coffee house in response to the user 16 performing a Google search for "Starbucks"), or the like. If the AOI is selected from a list of AOIs, the list of AOIs may include static AOIs, dynamic AOIs which may be defined as areas of a predefined shape and size centered at the current locations of one or more friends of the user 16, or both. Note that in some embodiments, the user 16 may be enabled to define an AOI by selecting a crowd such that an AOI is created of a predefined shape and size centered at the crowd center of the selected crowd. The AOI would thereafter remain static and would not follow the crowd. The POI or the AOI of the crowd request may be selected by the user 16 via the MAP application 28. In yet another embodiment, the MAP application 28 automatically uses the current location of the user 16 as the POI or as a center point for an AOI of a predefined shape and size.

Upon receiving the crowd request, the MAP client 26 forwards the crowd request to the MAP server 12 (step 1702). Note that in some embodiments, the MAP client 26 may process the crowd request before forwarding the crowd request to the MAP server 12. For example, in some embodiments, the crowd request may include more than one POI or more than one AOI. As such, the MAP client 26 may generate a separate crowd request for each POI or each AOI.

In response to receiving the crowd request from the MAP client 26, the MAP server 12 identifies one or more crowds relevant to the crowd request (step 1704). More specifically, in one embodiment, the crowd analyzer 52 proactively forms crowds using a process such as that described above in FIGS. 11A through 11D and stores corresponding crowd records 76 in the datastore 60 of the MAP server 12. The crowd analyzer 52 queries the datastore 60 to identify the crowds that are relevant to the crowd request. The crowds relevant to the crowd request may be those crowds within or intersecting a bounding region, such as a bounding box, for the crowd request. If the crowd request is for a POI, the bounding region is a geographic region of a predefined shape and size centered at the POI. If the crowd request is for an AOI, the bounding region is the AOI.

Once the crowd analyzer 52 has identified the crowds relevant to the crowd request, the MAP server 12 generates crowd data for the identified crowds (step 1706). The crowd data for the identified crowds may include aggregate profiles for the crowds, information characterizing the crowds, or both. The aggregate profile of a crowd may be generated based on a comparison of the user profile of the user 16 of the mobile device 14 to the user profiles of the users 16 in the crowd, a comparison of a target user profile to the user profiles of the users 16 in the crowd, or a comparison of the user profiles of the users 16 in the crowd to one another depending on the particular implementation. For example, for each user interest in the user profile of the user 16 of the mobile device 14, the aggregate profile of a crowd may include a number of user matches or occurrences of a matching interest in the user profiles of the users 16 in the crowd. As another example, the aggregate profile of a crowd may include a degree of similarity between the user 16 of the mobile device 14 and the crowd, where the degree of similarity is a function of a total number of matches between the interests in the user profile of the user 16 of the mobile device 14 and interests in the user profiles of the users 16 in the crowd. The information characterizing a crowd may include, for example, a degree of fragmentation of the crowd, a best-case or worst-case average Degree of Separation (DOS) between the users 16 in the crowd, or the like. In addition, the crowd data may include spatial information defining the locations of the crowds, the number of users in the crowds, the amount of time the crowds have been located at or near the POI or within the AOI of the crowd request, or the like. The MAP server 12 then returns the crowd data to the MAP client 26 of the mobile device 14 (step 1708).

Upon receiving the crowd data, the MAP client 26 forwards the crowd data to the MAP application 28 (step 1710).

Note that in some embodiments the MAP client 26 may process the crowd data before sending the crowd data to the MAP application 28. The MAP application 28 then presents the crowd data to the user 16 (step 1712). The manner in which the crowd data is presented depends on the particular implementation of the MAP application 28. In one embodiment, the crowd data is overlaid upon a map. For example, the crowds may be represented by corresponding indicators overlaid on a map. The user 16 may then select a crowd in order to view additional crowd data regarding that crowd such as, for example, the aggregate profile of that crowd, characteristics of that crowd, or the like.

Note that in one embodiment, the MAP application 28 may operate to roll-up the aggregate profiles for multiple crowds into a rolled-up aggregate profile for those crowds. The rolled-up aggregate profile may be the average of the aggregate profiles of the crowds. For example, the MAP application 28 may roll-up the aggregate profiles for multiple crowds at a POI and present the rolled-up aggregate profile for the multiple crowds at the POI to the user 16. In a similar manner, the MAP application 28 may provide a rolled-up aggregate profile for an AOI. In another embodiment, the MAP server 12 may roll-up crowds for a POI or an AOI and provide the rolled-up aggregate profile in addition to or as an alternative to the aggregate profiles for the individual crowds.

FIG. 14 illustrates the operation of the system 10 of FIG. 1 to enable the subscriber device 18 to request information regarding current crowds according to one embodiment of the present disclosure. First, subscriber device 18 sends a crowd request to the MAP server 12 (step 1800). The crowd request is a request for current crowds at a specified POI or AOI. The crowd request may be initiated by the subscriber 20 at the subscriber device 18. Preferably, the subscriber 20 is enabled to identify the POI or the AOI for the crowd request by, for example, selecting the POI or the AOI on a map, selecting a crowd center of an existing crowd as a POI, selecting a crowd location of an existing crowd as a center of an AOI, selecting the POI or the AOI from a predefined list of POIs and/or AOIs, or the like. The predefined list of POIs and/or AOIs may be defined by, for example, the subscriber 20 and/or the MAP server 12.

In response to receiving the crowd request from the subscriber device 18, the MAP server 12 identifies one or more crowds relevant to the crowd request (step 1802). More specifically, in one embodiment, the crowd analyzer 52 proactively forms crowds using a process such as that described above in FIGS. 11A through 11D and stores corresponding crowd records in the datastore 60 of the MAP server 12. The crowd analyzer 52 queries the datastore 60 to identify the crowds that are relevant to the crowd request. The crowds relevant to the crowd request may be those crowds within or overlapping a bounding region, such as a bounding box, for the crowd request. If the crowd request is for a POI, the bounding region is a geographic region of a predefined shape and size centered at the POI. If the crowd request is for an AOI, the bounding region is the AOI.

Once the crowd analyzer 52 has identified the crowds relevant to the crowd request, the MAP server 12 generates crowd data for the identified crowds (step 1804). The crowd data for the identified crowds may include aggregate profiles for the crowds, information characterizing the crowds, or both. In addition, the crowd data may include the locations of the crowds, the number of users in the crowds, the amount of time the crowds have been located at or near the POI or within the AOI, or the like. The MAP server 12 then returns the crowd data to the subscriber device 18 (step 1806). In the embodiment where the subscriber 20 accesses the MAP server 12 via a web browser of the subscriber device 18, the MAP server 12 formats the crowd data into a suitable web format before sending the crowd data to the subscriber device 18. The manner in which the crowd data is formatted depends on the particular implementation. In one embodiment, the crowd data is overlaid upon a map. For example, in one embodiment, the MAP server 12 may provide the crowd data to the subscriber device 18 via one or more web pages. Using the one or more web pages, crowd indicators representative of the locations of the crowds may be overlaid on a map. The subscriber 20 may then select a crowd in order to view additional crowd data regarding that crowd such as, for example, the aggregate profile of that crowd, characteristics of that crowd, or the like. Upon receiving the crowd data, the subscriber device 18 presents the crowd data to the subscriber 20 (step 1808). Note that in one embodiment, the MAP server 12 may roll-up the aggregate profiles for multiple crowds at a POI or in an AOI to provide a rolled-up aggregate profile that may be returned in addition to or as an alternative to the aggregate profiles of the individual crowds.

FIG. 15 illustrates the operation of the MAP server 12 of FIG. 1 to serve a request for crowd tracking data for a crowd according to one embodiment of the present disclosure. First, the subscriber device 18 sends a crowd tracking data request for a crowd to the MAP server 12 (step 1900). Note that access to crowd tracking data is preferably a subscription service only available to subscribers, such as the subscriber 20 at the subscriber device 18, for a subscription fee. The crowd tracking data request identifies a particular crowd. For example, in one embodiment, the crowd data for a number of crowds near a POI or within an AOI is presented to the subscriber 20 at the subscriber device 18 in the manner described above. The subscriber 20 may then select one of those crowds and initiate a request for crowd tracking data for the selected crowd. In response, the subscriber device 18 sends the crowd tracking data request for the selected crowd to the MAP server 12.

In response to receiving the crowd tracking data request, the MAP server 12, and more specifically the crowd analyzer 52, obtains relevant crowd snapshots for the crowd (step 1902). In one embodiment, the crowd tracking data request is a general crowd tracking data request for the crowd. As such, the relevant crowd snapshots are all crowd snapshots for the crowd. In another embodiment, the crowd tracking data request may include one or more criteria to be used to identify the relevant crowd snapshots. The one or more criteria may include time-based criteria such that only those crowd snapshots for the crowd that satisfy the time-based criteria are identified as the relevant crowd snapshots. For example, the time-based criteria may define a range of dates such as Oct. 1, 2009 through Oct. 8, 2009 or define a range of times within a particular day such as 5 pm through 9 pm on Oct. 1, 2009. The one or more criteria may additionally or alternatively include user-based criteria such that only those crowd snapshots including anonymous users satisfying the user-based criteria are identified as the relevant crowd snapshots. For example, the user-based criteria may include one or more interests and a minimum number or percentage of users such that only those crowd snapshots including at least the minimum number or percentage of anonymous users having the one or more interests are identified as the relevant crowd snapshots. Note that by using user-based criteria, the subscriber 20 is enabled to track sub-crowds within a crowd.

Next, the crowd analyzer 52 of the MAP server 12 generates crowd tracking data for the crowd based on the relevant crowd snapshots (step 1904). The crowd tracking data includes data indicative of the location of the crowd over time, which can be determined based on the spatial information and sample times from the relevant crowd snapshots. In addition, the crowd tracking data may include an aggregate profile for the crowd for each of the relevant crowd snapshots or at least some of the relevant crowd snapshots, an average aggregate profile for all of the relevant crowd snapshots, an average aggregate profile for a subset of the relevant crowd snapshots, or average aggregate profiles for a number of subsets of the relevant crowd snapshots. For example, the relevant crowd snapshots may be divided into a number of time bands such that at least some of the time bands include multiple relevant crowd snapshots. An average crowd snapshot may then be created for each of the time bands. The crowd analyzer 52 may utilize the aggregation engine 54 to obtain an aggregate profile for a crowd snapshot based on the interests of the anonymous users in the crowd snapshot. More specifically, in a manner similar to that described above, an aggregate profile for a crowd snapshot may be computed by comparing the interests of the anonymous users to one another or by comparing the interests of the anonymous users to a target profile. The crowd tracking data may also contain other information derived from the relevant crowd snapshots such as, for example, the number of users in the relevant crowd snapshots, crowd characteristics for the crowd for the relevant crowd snapshots, or the like.

The crowd analyzer 52 returns the crowd tracking data for the crowd to the subscriber device 18 (step 1906). Note that in the embodiment where the subscriber device 18 interacts with the MAP server 12 via a web browser, the MAP server 12 returns the crowd tracking data to the subscriber device 18 in a format suitable for use by the web browser. For example, the crowd tracking data may be returned via a web page including a map, wherein indicators of the location of the crowd over time as defined by the relevant crowd snapshots may be overlaid upon the map. The subscriber 20 may then be enabled to select one of those indicators to view additional information regarding the crowd at that time such as, for example, an aggregate profile of a corresponding crowd snapshot of the crowd. Once the crowd tracking data is received at the subscriber device 18, the crowd tracking data is presented to the subscriber 20 (step 1908).

FIGS. 16 through 19C describe various embodiments of the operation of the secondary indications manager 56 of the MAP server 12. In general, the secondary indications manager 56 operates to obtain secondary indications of the locations of users such as, but not limited to, the users 16. In some embodiments, the secondary indications also include user profile data for the corresponding users. In these embodiments, the secondary indications are used to supplement the location updates and user profiles collected for the users 16 by the MAP server 12.

FIG. 16 illustrates the operation of the secondary indications manager 56 according to one embodiment of the present disclosure. As illustrated, the secondary indications manager 56 obtains secondary indications of the locations of users from the one or more secondary indications sources 23 and stores the secondary indications in the datastore 60 of the MAP server 12 (steps 2000 and 2002). Each secondary indication includes the location of one or more users, which may or may not be one or more of the users 16, and timing information that defines, or identifies, when the one or more users were at or will be at the location. The timing information may be a specific time or a specific time window.

In one embodiment, the secondary indications are secondary indications of the locations of the users 16, or at least some of the users 16. In this case, the secondary indications also include information identifying the users 16 such as the user IDs of the users 16 utilized by the MAP server 12. Using the information identifying the users 16, the secondary indications, and specifically the locations of the users 16 included in the secondary indications, are correlated to the user profiles of the corresponding users 16. For example, a secondary indication for the location of the user 16-1 may include the user ID of the user 16-1 and information defining a location of the user 16-1 and a specific time at which the user 16-1 was or will be at the location or a time window during which the user 16-1 was or will be at the location. In another embodiment, the secondary indications may be for one or more users in general and include: (1) a location, (2) a time at which the one or more users were or will be located at the location or a time window during which the one or more users were or will be located at the location, and (3) user profile data for the one or more users. In this embodiment, the one or more users for which the secondary indications are obtained may be one or more of the users 16, one or more users other than the users 16, or a combination thereof.

The one or more secondary indications sources 23 may include one or more sources of credit card usage data, one or more sources of public records, one or more sources of electronic invitations, or one or more sources of geo-tagged and timestamped digital images. In general, one or more sources of credit card usage data may provide secondary indications of the locations of users such as, but not limited to, the users 16 based on credit card transactions of those users. In some embodiments, the secondary indications include user profile data derived from data describing the credit card transactions and, optionally, previous credit card transactions of the users. The data describing a credit card transaction conducted by a user may include data describing a good(s) or service(s) purchased by the user via the credit card transaction and/or data describing an establishment (e.g., a store, a restaurant, etc.) from which the good(s) or service(s) were purchased by the user via the credit card transaction. For example, a purchase of hiking equipment may be used to provide user profile data including an interest in hiking. Similarly, a purchase from an athletic store may be used to provide user profile data including an interest in athletics.

More specifically, in one embodiment, the one or more sources of credit card usage data are, for example, one or more financial institutions (e.g., Chase, Citibank, or the like). In this case, through the financial institutions, users such as, but not limited to, the users 16 may choose to opt-in to having their credit card transactions serve as secondary indications of their locations. For each user 16 that chooses to opt-in, a corresponding financial service sends secondary indications of the location of the user 16 to the MAP server 12 based on credit card transactions conducted by the user 16, where the secondary indications include the user ID of the user 16 used by the MAP server 12, locations at which the user 16 conducted credit card transactions, and times at which or time windows during which the user 16 conducted the credit card transactions at those locations. In this manner, the secondary indications include locations of the user 16 and times at which or time windows during which the user 16 was at those locations. As an example, if the user 16-1 purchases an item with his credit card at location X at time Y, the corresponding financial institution may provide a secondary indication of the location of the user 16-1 to the MAP server 12 that includes the user ID of the user 16-1, the location X, and the time Y. In order to protect user privacy, in this embodiment, the secondary indications preferably do not include any specific information about the credit card purchases of the users 16 such as, for example, the particular items purchased by the users. In addition, other than the user IDs of the users 16 that are used by the MAP server 12, the secondary indications preferably do not include any other information identifying the users 16 in order to protect user privacy.

For each other user (also referred to herein as non-registered users) that chooses to opt-in, a corresponding financial service may send secondary indications of the location of the user based on credit card transactions conducted by the user, where the secondary indications include locations at which the user conducted credit card transactions, times at which or time windows during which the user conducted those credit card transactions, and user profile data for the user. Here, the user profile data included in a secondary indication resulting from a particular credit card transaction of the user may include data describing the credit card transaction and, optionally, one or more previous credit card transactions of the user. In order to protect user privacy, in this embodiment, the secondary indications for the other users may not include information identifying the other users (e.g., the names of the users) in order to protect user privacy. Further, in order to protect user privacy, any user profile data included in the secondary indications that is derived from the credit card transactions of the users may be abstracted such that details regarding the specific items purchased by the users are not included in the secondary indications.

In a similar manner, the one or more financial institutions may utilize credit card usage data to generate secondary indications for groups of users in general. More specifically, for a particular location, a financial institution may provide a secondary indication that includes the location, a time window, and user profile data for a number of users (i.e., a group of users) that have conducted credit card transactions at the location during the time window. The user profile data may be derived from data describing the credit card transactions conducted by the users at the location during the time window and, optionally, one or more previous credit card transactions conducted by the users. Again, data describing a credit card transaction conducted by a user may include data describing the good(s) or service(s) purchased by the user and/or data describing the establishment from which the user purchased the good(s) or service(s). In order to protect user privacy, the secondary indications for the groups of users preferably do not include information that identifies the users in the groups (e.g., the names of the users in the groups). Further, in order to protect user privacy, any user profile data included in the secondary indications for the groups that is derived from the credit card transactions of the users in the groups may be abstracted such that details regarding the specific items purchased by the users in the groups are not included in the secondary indications.

In a similar manner, one or more sources of public records (e.g., newspapers) may enable searching of public records to obtain secondary indications of the locations of users such as, but not limited to, the users 16. The public records may be, for example, newspapers, news or other types of websites, or the like. In one embodiment, the secondary indications manager 56 searches the one or more sources of public records in order to obtain the secondary indications. In another embodiment, the one or more sources of public records search their own public records in order to identify the secondary indications and then provide the secondary indications to the MAP server 12 proactively or upon request.

In one embodiment, the secondary indications obtained by searching the public records identify locations at which specific users such as, but not limited to, the users 16 were or will be located and times at which or time windows during which those users were or will be located at those locations. In addition, in some embodiments, the secondary indications may further include user profile data for the users derived from the public records. As an example, a news article regarding a specific person that mentions a location and a time at which that person was at that location may be used to provide a secondary indication of the location of that person to the MAP server 12.

In another embodiment, the secondary indications obtained by searching the public records include user profile data descriptive of a type of user that was or will be at a particular location at a particular time or during a particular time window. For example, a news article may be processed to determine that a sporting event between two teams occurred on Jul. 8, 2010 from 2 pm to 6 pm at a particular location (i.e., the location of the sporting arena). The news article may then be processed to provide a secondary indication including the location of the sporting arena, the time window of Jul. 8, 2010 from 2 pm to 6 pm, and user profile data including interests of persons at the sporting event (e.g., the two sports teams, high profile players on the two sports teams discussed in the news article, cities or colleges associated with the sports teams, or the like).

One or more sources of electronic invitations, such as the Evite® service, may be utilized to obtain secondary indications of the locations of users such as, but not limited to, the users 16. For instance, the one or more sources of electronic invitations may include an electronic invitation service, and the electronic invitation service may provide secondary indications of the locations of users of the electronic invitation service based on electronic invitations and acceptances of the electronic invitations. More specifically, in one embodiment, when a user of the electronic invitation service accepts an electronic invitation, the electronic invitation service may provide a secondary indication to the MAP server 12 that includes a user ID of the user, a location defined by the electronic invitation (e.g., location of the party), and a time or time window defined by the electronic invitation (e.g., a start time and, optionally, an end time of the party). In another embodiment, the secondary indication includes a location defined by the electronic invitation (e.g., location of the party), a time or time window defined by the electronic invitation (e.g., a start time and, optionally, an end time of the party), and user profile data for the user. The user profile data may be from a user profile of the user maintained by the electronic invitation service or otherwise known to the electronic invitation service, derived based on data included in the electronic invitation, or derived based on known user profiles of other users that have accepted the invitation. In another embodiment, the electronic invitation service may provide a secondary indication for an event for which an electronic invitation was sent in general such that the secondary indication includes a location of the event, a time or time window for the event, and user profile data for the event. The user profile data may be combined user profile data for users that accepted the electronic invitation where the user profile data is maintained by or otherwise known to the electronic invitation service or derived from the electronic invitation (e.g., an electronic invitation for a Super Bowl Party being indicative of the users at the party having an interest in football).

One or more source of geo-tagged and time-stamped digital images may additionally or alternatively be used to obtain secondary indications of the locations of users such as, for example, the users 16. As used herein, a geo-tagged and time-stamped digital image is a digital image that is tagged or otherwise associated with a location of capture of the digital image and a time of capture of the digital image. The one or more sources of geo-tagged and time-stamped digital images may be, for example, one or more photo sharing services. However, the present disclosure is not limited thereto. Any centralized or distributed source of geo-tagged and time-stamped digital images may be used. Persons appearing in the digital images are identified using, for example, facial recognition techniques and corresponding secondary indications are provided to the MAP server 12. The secondary indications include the locations of capture and times of capture of the corresponding digital images. In addition, for any users that are not one of the users 16 registered with the MAP server 12, the secondary indications also include user profile data for those users. The user profile data may include user-defined keyword tags applied to the digital images, data derived from user-defined captions applied to the digital images, data from user profiles of the users appearing on the digital images where the user profiles are maintained by or otherwise known to the one or more sources of geo-tagged and time-stamped digital images, or the like.

In this embodiment, the MAP server 12 then serves aggregate profile requests based on the secondary indications of the locations of the users obtained and stored in steps 2000 and 2002 (step 2004). More specifically, as discussed below in more detail, the secondary indications supplement the location and, in some embodiments, user profile data stored by the MAP server 12. Using the secondary indications and the location updates and user profiles collected for the users 16 by the location and history managers 48 and 50, the MAP server 12 is enabled to serve historical requests, current crowd requests, or both.

FIGS. 17A through 17C illustrate the operation of the secondary indications manager 56 of the MAP server 12 in more detail according to one embodiment of the present disclosure. First, the secondary indications manager 56 obtains a secondary indication of the location of one of the users 16, which is referred to herein as a registered user 16 (step 2100). More specifically, in one embodiment, the secondary indication is from a source of credit card data usage, and the secondary indication includes the user ID of the registered user 16, a location at which the registered user 16 conducted a credit card transaction, and a time at which the registered user 16 conducted the credit card transaction or a time window during which the registered user 16 conducted the credit card transaction. In another embodiment, the secondary indication is from a source of public records, and the secondary indication includes information identifying the registered user 16, a location at which the registered user 16 was or will be located, and a time at which or time period during which the registered user 16 was or will be located at the location derived from the public records. In yet another embodiment, the secondary indication is from an electronic invitation service, and the secondary indication includes the user ID of the registered user 16, a location of an event that the registered user 16 was invited to that the registered user 16 either plans to attend or has attended, and a time at which or time window during which the event was or is to be held. In yet another embodiment, the secondary indication is from a source of geo-tagged and time-stamped digital images, and the secondary indication includes the user ID of the registered user 16 who has been detected in a geo-tagged and time-stamped digital image, a location at which the digital image was captured as indicated by the geo-tag of the digital image, and a time at which the digital image was captured as indicated by the timestamp of the digital image.

Next, the secondary indications manager 56 applies a weight to the secondary indication (step 2102). In one embodiment, weights are predetermined for the one or more secondary indications sources 23. These weights may be assigned manually or assigned programmatically based on accuracy of locations identified by secondary indications previously obtained from the one or more secondary indications sources 23. Next, the secondary indications manager 56 determines whether the secondary indication is a secondary indication of a historical location of the registered user 16 (step 2104). In this embodiment, the secondary indication is a secondary indication of a historical location of the registered user 16 if the time or time window defined for the secondary indication is at least a predefined amount of time prior to the current time. Specifically, if the historical storage process of FIG. 5 is used, the secondary indication is historical if the time or time window defined by the secondary indication is for a time or time window for which historical objects have already been created and stored. If the secondary indication is not historical, the process proceeds to step 2110 (FIG. 17B).

If the secondary indication is historical, the secondary indications manager 56 generates an anonymous user record for the registered user 16 (step 2106) and stores the anonymous user record for the registered user 16 in one or more appropriate historical records based on the location and time or time window defined by the secondary indication (step 2108). More specifically, in one embodiment, the secondary indications manager 56 identifies the history object previously generated for a geographic area that includes the location defined by the secondary indication for a time period that includes the time or time window defined by the secondary indication. The secondary indications manager 56 then adds the anonymous user record generated in step 2106 in the identified history object. Note, however, to prevent redundant anonymous user records for the registered user 16 in the same history object, the secondary indications manager 56 may compare the user interests in the anonymous user record generated for the registered user 16 in step 2106 to the user interests of the other anonymous user records stored in the identified history object. If there is an exact match, then the secondary indications manager 56 may not store the anonymous user record in the history object.

In addition or alternatively, the secondary indications manager 56 may identify a relevant crowd snapshot. The relevant crowd snapshot is preferably a crowd snapshot: (1) having a boundary within which the location defined by the secondary indication is located or a crowd snapshot having a crowd center within a predefined distance from the location defined by the secondary indication and (2) captured at a time that sufficiently matches the time or time window defined by the secondary indication. The time of capture of a crowd snapshot sufficiently matches the time or time window defined by the secondary indication if the time of capture of the crowd snapshot is, for example, within a predetermined maximum amount of time from the time or time window defined for the secondary indication. The secondary indications manager 56 then stores the anonymous user record for the registered user 16 in the crowd snapshot record for the relevant crowd snapshot. Note, however, to prevent redundant anonymous user records for the registered user 16 in the same crowd snapshot, the secondary indications manager 56 may compare the user interests in the anonymous user record generated for the registered user 16 in step 2106 to the user interests of the other anonymous user records stored in the crowd snapshot record. If there is an exact match, then the secondary indications manager 56 may not store the anonymous user record in the crowd snapshot record. Once the anonymous user record is stored in the one or more appropriate historical records, the process returns to step 2100 and is repeated for the next secondary indication.

Returning to step 2104, if the secondary indication is not historical, the secondary indications manager 56 determines whether the secondary indication is for a current location of the registered user 16 (step 2110). In this embodiment, the secondary indication is a secondary indication of the current location of the registered user 16 if the time or time window defined for the secondary indication is within a predefined range of the current time. Specifically, if the historical storage process of FIG. 5 is used, the secondary indication is current if the time or time window defined by the secondary indication is for a time or time window for which history objects have not already been created and stored but for which history objects will be created and stored once the current persistence period has expired (e.g., when the current 15 minute period has expired). If the secondary indication is not current, the process proceeds to step 2116 (FIG. 17C).

If the secondary indication is current, the secondary indications manager 56 determines whether the weight of the secondary indication is greater than a weight of the current location stored for the registered user 16, if any (step 2112). If not, the process returns to step 2100 and is repeated for the next secondary indication. Otherwise, the secondary indications manager 56 stores the location defined by the secondary indication as the current location of the registered user 16 (step 2114). Preferably, the secondary indication is treated as a location update for the registered user 16 and, as such, the registered user 16 is added to the appropriate location bucket. At this point, the process then returns to step 2100 and is repeated for the next secondary indication.

Returning to step 2110, if the secondary indication is not current, then the secondary indication is for a future location of the registered user 16. As such, in this embodiment, the secondary indications manager 56 stores the secondary indication until the current time is equal to the future time or at least until the future time is within the current persistence period for storage of historical objects (step 2116). The secondary indications manager 56 then determines whether the weight of the secondary indication is greater than a weight of the current location stored for the registered user 16, if any (step 2118). If not, the process returns to step 2100 and is repeated for the next secondary indication. Otherwise, the secondary indications manager 56 stores the location defined by the secondary indication as the current location of the registered user 16 (step 2120) and the process then returns to step 2100 and is repeated for the next secondary indication.

FIGS. 18A through 18C illustrate the operation of the secondary indications manager 56 according to another embodiment of the present disclosure. In this embodiment, secondary indications are obtained for users other than the users 16 (i.e., non-registered users). Note, however, that this process may also be used for the registered users 16 particularly if the secondary indications are not tied to the registered users 16 by, for example, the user IDs of the registered users 16. In this embodiment, the secondary indications also include user profile data for the corresponding users. Otherwise, the process is substantially the same as that described above with respect to FIGS. 17A through 17C.

First, the secondary indications manager 56 obtains a secondary indication of the location of a user (step 2200). In this embodiment, the user is preferably, but not necessarily, an unregistered user. More specifically, in one embodiment, the secondary indication is from a source of credit card data usage, and the secondary indication includes a location at which the user conducted a credit card transaction, a time at which the user conducted the credit card transaction or a time window during which the user conducted the credit card transaction, and user profile data for the user. The user profile data may be derived based on the current credit card transaction and, optionally, one or more past credit card transactions of the user. The user profile data may be derived based on information describing a good(s) or service(s) purchased by the user and/or information describing an establishment(s) from which the user purchased the good(s) or service(s).

In another embodiment, the secondary indication is from a source of public records, and the secondary indication includes a location at which the user was or will be located, a time at which or time period during which the user was or will be located at the location, and user profile data for the user derived from the public records. In yet another embodiment, the secondary indication is from an electronic invitation service, and the secondary indication includes a location of an event that the user was invited to that the user either plans to attend or has attended, a time at which or time window during which the event was or is to be held, and user profile data for the user. In this case, the user profile data may be maintained by or otherwise known to the electronic invitation service, derived from the electronic invitation, derived from user profiles of other users that received and accepted the electronic invitation, or the like.

In yet another embodiment, the secondary indication is from a source of geo-tagged and time-stamped digital images, and the secondary indication includes a location of capture of a geo-tagged and time-stamped digital image in which the user was detected, a time of capture of the digital image, and user profile data for the user. Here, the user profile data may be derived from keywords or captions associated with the digital image, maintained or otherwise known to the source of the digital image, derived from known user profiles of other users detected in the digital image, or the like.

Next, the secondary indications manager 56 applies a weight to the secondary indication (step 2202). In one embodiment, weights are predetermined for the one or more secondary indications sources 23. These weights may be assigned manually or assigned programmatically based on accuracy of locations identified by secondary indications previously obtained from the one or more secondary indications sources 23. Next, the secondary indications manager 56 determines whether the secondary indication is a secondary indication of a historical location of the user (step 2204). In this embodiment, the secondary indication is a secondary indication of a historical location of the user if the time or time window defined for the secondary indication is at least a predefined amount of time prior to the current time. Specifically, if the historical storage process of FIG. 5 is used, the secondary indication is historical if the time or time window defined by the secondary indication is for a time or time window for which historical objects have already been created and stored. If the secondary indication is not historical, the process proceeds to step 2210 (FIG. 18B).

If the secondary indication is historical, the secondary indications manager 56 generates an anonymous user record for the user based on the user profile data included in the secondary indication (step 2206) and stores the anonymous user record for the user in one or more appropriate historical records based on the location and time or time window defined by the secondary indication (step 2208). More specifically, in one embodiment, the secondary indications manager 56 identifies the history object previously generated for a geographic area that includes the location defined by the secondary indication for a time period that includes the time or time window defined by the secondary indication. The secondary indications manager 56 then adds the anonymous user record generated in step 2206 to the identified history object.

In addition or alternatively, the secondary indications manager 56 may identify a relevant crowd snapshot. The relevant crowd snapshot is preferably a crowd snapshot: (1) having a boundary within which the location defined by the secondary indication is located or a crowd snapshot having a crowd center within a predefined distance from the location defined by the secondary indication and (2) captured at a time that sufficiently matches the time or time window defined by the secondary indication. The time of capture of a crowd snapshot sufficiently matches the time or time window defined by the secondary indication if the time of capture of the crowd snapshot is, for example, within a predetermined maximum amount of time from the time or time window defined for the secondary indication. The secondary indications manager 56 then stores the anonymous user record for the user in the crowd snapshot record for the relevant crowd snapshot. Once the anonymous user record is stored in the one or more appropriate historical records, the process returns to step 2200 and is repeated for the next secondary indication.

Returning to step 2204, if the secondary indication is not historical, the secondary indications manager 56 determines whether the secondary indication is for a current location of the registered user 16 (step 2210). In this embodiment, the secondary indication is a secondary indication of the current location of the user if the time or time window defined for the secondary indication is within a predefined range of the current time. Specifically, if the historical storage process of FIG. 5 is used, the secondary indication is current if the time or time window defined by the secondary indication is for a time or time window for which history objects have not already been created and stored but for which history objects will be created and stored once the current persistence period has expired (e.g., when the current 15 minute period has expired). If the secondary indication is not current, the process proceeds to step 2216 (FIG. 18C).

If the secondary indication is current, the secondary indications manager 56 determines whether the weight of the secondary indication is greater than a weight of the current location stored for the user, if any (step 2212). Note that step 2212 is optional and is preferably used only if the secondary indications obtained via the process of FIGS. 18A through 18C include information enabling secondary indications received for the same user to be identified. If not, the process returns to step 2200 and is repeated for the next secondary indication. Otherwise, the secondary indications manager 56 updates or creates a user record for the user that includes at least some of the data from the secondary indication such as the location and user profile data from the secondary indication (step 2214). Preferably, the secondary indication is treated as a location update for the user and, as such, the user is added to the appropriate location bucket. At this point, the process then returns to step 2200 and is repeated for the next secondary indication.

Returning to step 2210, if the secondary indication is not current, then the secondary indication is for a future location of the user. As such, in this embodiment, the secondary indications manager 56 stores the secondary indication until the current time is equal to the future time or at least until the future time is within the current persistence period for storage of historical objects (step 2216). The secondary indications manager 56 then determines whether the weight of the secondary indication is greater than a weight of the current location stored for the user, if any (step 2218). Note that step 2218 is optional and is preferably used only if the secondary indications obtained via the process of FIGS. 18A through 18C include information enabling secondary indications received for the same user to be identified. If not, the process returns to step 2200 and is repeated for the next secondary indication. Otherwise, the secondary indications manager 56 updates or creates a user record for the user that includes at least some of the data from the secondary indication such as the location and user profile data from the secondary indication (step 2220). The process then returns to step 2200 and is repeated for the next secondary indication.

FIGS. 19A through 19C illustrate the operation of the secondary indications manager 56 according to another embodiment of the present disclosure. In this embodiment, rather than obtaining secondary indications for the locations of specific users, the secondary indications manager 56 obtains secondary indications for groups of users. In this embodiment, a secondary indication includes a location, a time or time window, and user profile data for a number of users located at the location at the time or during the time window for the secondary indication.

First, the secondary indications manager 56 obtains a secondary indication of the location of a group of users (step 2300). In this embodiment, the group of users includes two or more users. Preferably, in this embodiment, the identities of the users in the group are not included in the secondary indication. Therefore, the users in the group of users for the secondary indication may include registered users 16 and/or unregistered users. In general, the secondary indication includes a location of the group of users which may be a specific location or a geographic area, a time at which or time window during which the group of users were located or will be located at the location, and user profile data for the group of users.

More specifically, in one embodiment, the secondary indication is from a source of credit card data usage, and the secondary indication includes a location at which the group of users conducted credit card transactions, a time at which or time window during which the group of users conducted the credit card transactions, and user profile data for the group of users. The user profile data may be derived based on the current credit card transactions and, optionally, one or more past credit card transactions of users in the group of users. The user profile data may be derived based on information describing a good(s) or service(s) purchased by the group of users and/or information describing an establishment(s) from which the group of users purchased the good(s) or service(s).

In another embodiment, the secondary indication is from a source of public records, and the secondary indication includes a location at which the group of users was or will be located, a time at which or time window during which the group of users was or will be located at the location, and user profile data for the group of users derived from the public records. In yet another embodiment, the secondary indication is from an electronic invitation service, and the secondary indication includes a location of an event that the group of users were invited to that the group of users either plan to attend or have attended, a time at which or time window during which the event was or is to be held, and user profile data for the group of users. In this case, the user profile data may be maintained by or otherwise known to the electronic invitation service, derived from the electronic invitation, or the like.

In yet another embodiment, the secondary indication is from a source of geo-tagged and time-stamped digital images, and the secondary indication includes a location at which a geo-tagged and time-stamped digital image in which the group of users were detected was captured, a time at which the digital image was captured, and user profile data for the group of users. Here, the user profile data may be derived from keywords or captions associated with the digital image or other digital images in which the users in the group of users are detected, maintained, or otherwise known to the source of the digital image, or the like.

Next, the secondary indications manager 56 determines whether the secondary indication is a secondary indication of a historical location of the group of users (step 2302). In this embodiment, the secondary indication is a secondary indication of a historical location of the group of users if the time or time window defined for the secondary indication is at least a predefined amount of time prior to the current time. Specifically, if the historical storage process of FIG. 5 is used, the secondary indication is historical if the time or time window defined by the secondary indication is for a time or time window for which historical objects have already been created and stored. If the secondary indication is not historical, the process proceeds to step 2306 (FIG. 19B).

If the secondary indication is historical, the secondary indications manager 56 stores the user profile data in one or more appropriate historical records (step 2304). Preferably, the user profile data in the secondary indication is either combined user profile data (i.e., user profile data for the users in the group are combined into a single combined user profile for the group) or is combined by the secondary indications manager 56 to provide combined user profile data for the group. In one embodiment, the secondary indications manager 56 identifies the history object previously generated for a geographic area that includes the location defined by the secondary indication for a time period that includes the time or time window defined by the secondary indication. The secondary indications manager 56 then adds the combined user profile data for the group to the history object as, for example, a corresponding anonymous user record.

In addition or alternatively, the secondary indications manager 56 may identify a relevant crowd snapshot. The relevant crowd snapshot is preferably a crowd snapshot: (1) having a boundary within which the location defined by the secondary indication is located or a crowd snapshot having a crowd center within a predefined distance from the location defined by the secondary indication and (2) captured at a time that sufficiently matches the time or time window defined by the secondary indication. The time of capture of a crowd snapshot sufficiently matches the time or time window defined by the secondary indication if the time of capture of the crowd snapshot is, for example, within a predetermined maximum amount of time from the time or time window defined for the secondary indication. The secondary indications manager 56 then stores the combined user profile from the secondary indication in the crowd snapshot record for the relevant crowd snapshot as, for example, a corresponding anonymous user record. Once the combined user profile data for the secondary indication is stored, the process returns to step 2300 and is repeated for the next secondary indication.

Returning to step 2302, if the secondary indication is not historical, the secondary indications manager 56 determines whether the secondary indication is for secondary indication of a current location of the group of users (step 2306). In this embodiment, the secondary indication is a secondary indication of the current location of the group of users if the time or time window defined for the secondary indication is within a predefined range of the current time. Specifically, if the historical storage process of FIG. 5 is used, the secondary indication is current if the time or time window defined by the secondary indication is for a time or time window for which history objects have not already been created and stored but for which history objects will be created and stored once the current persistence period has expired (e.g., when the current 15 minute period has expired). If the secondary indication is not current, the process proceeds to step 2310 (FIG. 19C).

If the secondary indication is current, the secondary indications manager 56 stores the secondary indication for use in serving current aggregate profile requests (e.g., current crowd requests) and for subsequent historical storage (step 2308). More specifically, in one embodiment, the location and combined user profile data is stored as a new user record. As such, the group of users from the secondary indication is treated as a new user having a current location equal to the location of the group and a user profile equal to the combined user profile data of the group. Further, the secondary indication is preferably treated as a location update for the group of users (treated as a new user) and, as such, the group of users is added to the appropriate location bucket. At this point, the process then returns to step 2300 and is repeated for the next secondary indication.

Returning to step 2306, if the secondary indication is not current, then the secondary indication is for a future location of the user. The secondary indications manager 56 stores the secondary indication for use in serving future aggregate profile requests (e.g., current crowd requests at a future time) and for subsequent historical storage (step 2310). More specifically, in one embodiment, the secondary indication is stored until the current time is either equal to the future time defined by the secondary indication or the future time defined by the secondary indication is within the current persistence period for historical object storage. Then, the location and combined user profile data from the secondary indication is stored as a new user record. As such, the group of users from the secondary indication is then treated as a new user having a current location equal to the location of the group and a user profile equal to the combined user profile data of the group. The process then returns to step 2300 and is repeated for the next secondary indication.

FIG. 20 is a block diagram of the MAP server 12 according to one embodiment of the present disclosure. As illustrated, the MAP server 12 includes a controller 84 connected to memory 86, one or more secondary storage devices 88, and a communication interface 90 by a bus 92 or similar mechanism. The controller 84 is a microprocessor, digital Application Specific Integrated Circuit (ASIC), Field Programmable Gate Array (FPGA), or the like. In this embodiment, the controller 84 is a microprocessor, and the application layer 34, the business logic layer 36, and the object mapping layer 58 (FIG. 2) are implemented in software and stored in the memory 86 for execution by the controller 84. Further, the datastore 60 (FIG. 2) may be implemented in the one or more secondary storage devices 88. The secondary storage devices 88 are digital data storage devices such as, for example, one or more hard disk drives. The communication interface 90 is a wired or wireless communication interface that communicatively couples the MAP server 12 to the network 24 (FIG. 1). For example, the communication interface 90 may be an Ethernet interface, local wireless interface such as a wireless interface operating according to one of the suite of IEEE 802.11 standards, or the like.

FIG. 21 is a block diagram of the mobile device 14 according to one embodiment of the present disclosure. As illustrated, the mobile device 14 includes a controller 94 connected to memory 96, a communication interface 98, one or more user interface components 100, and the location function 32 connected by a bus 102 or similar mechanism. The controller 94 is a microprocessor, digital ASIC, FPGA, or the like. In this embodiment, the controller 94 is a microprocessor, and the MAP client 26, the MAP application 28, and the third-party applications 30 are implemented in software and stored in the memory 96 for execution by the controller 94. In this embodiment, the location function 32 is a hardware component such as, for example, a GPS receiver. The communication interface 98 is a wireless communication interface that communicatively couples the mobile device 14 to the network 24 (FIG. 1). For example, the communication interface 98 may be a local wireless interface such as a wireless interface operating according to one of the suite of IEEE 802.11 standards, a mobile communication interface such as a cellular telecommunications interface, or the like. The one or more user interface components 100 include, for example, a touchscreen, a display, one or more user input components (e.g., a keypad), a speaker, or the like, or any combination thereof.

FIG. 22 is a block diagram of the subscriber device 18 according to one embodiment of the present disclosure. As illustrated, the subscriber device 18 includes a controller 104 connected to memory 106, one or more secondary storage devices 108, a communication interface 110, and one or more user interface components 112 by a bus 114 or similar mechanism. The controller 104 is a microprocessor, digital ASIC, FPGA, or the like. In this embodiment, the controller 104 is a microprocessor, and a web browser is implemented in software and stored in the memory 106 for execution by the controller 104. The one or more secondary storage devices 108 are digital storage devices such as, for example, one or more hard disk drives. The communication interface 110 is a wired or wireless communication interface that communicatively couples the subscriber device 18 to the network 24 (FIG. 1). For example, the communication interface 110 may be an Ethernet interface, local wireless interface such as a wireless interface operating according to one of the suite of IEEE 802.11 standards, a mobile communication interface such as a cellular telecommunications interface, or the like. The one or more user interface components 112 include, for example, a touchscreen, a display, one or more user input components (e.g., a keypad), a speaker, or the like, or any combination thereof.

FIG. 23 is a block diagram of a computing device 116 operating as one of the one or more secondary indications sources 23 according to one embodiment of the present disclosure. The computing device 116 may be, for example, a physical server, but is not limited thereto. As illustrated, the computing device 116 includes a controller 118 connected to memory 120, one or more secondary storage devices 122, a communication interface 124, and one or more user interface components 126 by a bus 128 or similar mechanism. The controller 118 is a microprocessor, digital ASIC, FPGA, or the like. In this embodiment, the controller 118 is a microprocessor, and software is stored in the memory 120 for execution by the controller 118 to provide secondary indications to the MAP server 12 as described above. The one or more secondary storage devices 122 are digital storage devices such as, for example, one or more hard disk drives. The communication interface 124 is a wired or wireless communication interface that communicatively couples the computing device 116 to the network 24 (FIG. 1). For example, the communication interface 124 may be an Ethernet interface, local wireless interface such as a wireless interface operating according to one of the suite of IEEE 802.11 standards, a mobile communication interface such as a cellular telecommunications interface, or the like. The one or more user interface components 126 include, for example, a touchscreen, a display, one or more user input components (e.g., a keypad), a speaker, or the like, or any combination thereof.

It should be noted that the present disclosure provides substantial opportunity for variation without departing from the spirit or scope of the present disclosure. Specifically, while secondary indications have been described herein as a means to supplement the location updates received from the mobile devices 14 of the users 16, the secondary indications described herein may be used in any system providing a location-based service. As another example, while secondary indications based on credit card usage have been described herein, secondary indications on other types of financial transactions conducted by users may additionally or alternatively be used to provide secondary indications. For instance, other types of financial transactions may be Automatic Teller Machine (ATM) transactions. Because ATMs are positioned at various known geographic locations, the associated financial institutions can track ATM transactions of users and generate secondary indications of the locations of the users based thereon. Other types of financial transactions may similarly be used.

Those skilled in the art will recognize improvements and modifications to the preferred embodiments of the present disclosure. All such improvements and modifications are considered within the scope of the concepts disclosed herein and the claims that follow.

What is claimed is:

1. A method comprising:
obtaining, at a processing device other than respective mobile devices of one or more users, a secondary indication of a previous location of the one or more users from a secondary source, the secondary source being other than the respective mobile devices of the one or more users, the secondary indication comprising the previous location of the one or more users and timing information that defines when the one or more users were at the previous location;
assigning a weight to the secondary indication based on an accuracy of locations identified by secondary indications previously obtained from the secondary source; and
utilizing, at the processing device, based on the assigned weight, the secondary indication of the location of the one or more users to provide a location-based service.

2. The method of claim 1 wherein utilizing the secondary indication comprises utilizing both the secondary indication of the location of the one or more users and user profile data for the one or more users to provide the location-based service.

3. The method of claim 2 wherein utilizing both the secondary indication of the location of the one or more users and the user profile data for the one or more users to provide the location-based service comprises:
maintaining a historical record of user profile data by location; and
serving historical requests for aggregate profile data based on the historical record of user profile data by location.

4. The method of claim 2 wherein utilizing both the secondary indication of the location of the one or more users and the user profile data for the one or more users to provide the location-based service comprises:
forming crowds of users using a spatial crowd formation process; and
providing aggregate user profile data for the crowds of users.

5. The method of claim 2 wherein the secondary indication further comprises, for each user of the one or more users, information that identifies the user, and the information that identifies the user is used to obtain the user profile data for the user from local storage.

6. The method of claim 2 wherein the secondary indication further comprises the user profile data for the one or more users.

7. The method of claim 1 wherein the secondary indication of the location of the one or more users is based on credit card usage by the one or more users such that the location included in the secondary indication is a location at which the one or more users conducted a corresponding one or more credit card transactions and the timing information is timing information that defines when the one or more users conducted the corresponding one or more credit card transactions at the location.

8. The method of claim 7 wherein the secondary indication further comprises user profile data for the one or more users, where the user profile data is based on the corresponding one or more financial transactions conducted by the one or more users at the location.

9. The method of claim 8 wherein the one or more financial transactions comprise one or more credit card transactions.

10. The method of claim 8 wherein the user profile data for the one or more users is further based on one or more previous financial transactions conducted by the one or more users.

11. The method of claim 1 wherein the secondary indication of the location of the one or more users is based on public records regarding the one or more users such that the location included in the secondary indication is a location at which the one or more users were or will be located as determined based on the public records and the timing information is timing information that defines when the one or more users were or will be located at the location as determined based on the public records.

12. The method of claim 11 wherein the secondary indication further comprises user profile data for the one or more users, where the user profile data is based on information included in the public records.

13. The method of claim 1 wherein the secondary indication of the location of the one or more users is based on an electronic invitation sent to the one or more users via an electronic invitation service such that the location included in the secondary indication is a location of an event for which the electronic invitation was sent and the timing information is timing information that defines when the event occurred or will occur.

14. The method of claim 13 wherein the secondary indication is obtained in response to the one or more users accepting the electronic invitation.

15. The method of claim 13 wherein the secondary indication further comprises user profile data for the one or more users, where the user profile data is based on the electronic invitation.

16. The method of claim 13 wherein the secondary indication further comprises user profile data for the one or more users, where the user profile data is from user profiles for the one or more users known to the electronic invitation service.

17. The method of claim 1 wherein the secondary indication of the location of the one or more users is based on detection of the one or more users in a geo-tagged and time-stamped digital image such that the location included in the secondary indication is a location at which the digital image was captured and the timing information comprises a time at which the digital image was captured.

18. The method of claim 17 wherein the secondary indication further comprises user profile data for the one or more users, where the user profile data comprises one or more keywords applied to the digital image as tags being descriptive of content of the digital image.

19. The method of claim 17 wherein the secondary indication further comprises user profile data for the one or more users, where the user profile data is based on one or more captions applied to the digital image.

20. A computing device, other than respective mobile devices of one or more users, comprising:
a communication interface adapted to communicatively couple the computing device to a network; and
a controller associated with the communication interface and adapted to:
obtain, via the communication interface, a secondary indication of a previous location of the one or more users from a secondary source of secondary locations of users, the secondary source being other than the respective mobile devices of the one or more users, the secondary indication comprising the previous location of the one or more users and timing information that defines when the one or more users were at the previous location;
assign a weight to the secondary indication based on an accuracy of locations identified by secondary indications previously obtained from the secondary source; and
utilize, based on the assigned weight, the secondary indication of the location of the one or more users to provide a location-based service.

21. A non-transitory computer readable medium storing software for instructing a controller of a computing device to:
obtain, at a processing device other than respective mobile devices of one or more users, a secondary indication of a previous location of the one or more users from a secondary source, the secondary source being other than the respective mobile devices of the one or more users, the secondary indication comprising the previous location of the one or more users and timing information that defines when the one or more users were at the previous location;
assign a weight to the secondary indication based on an accuracy of locations identified by secondary indications previously obtained from the secondary source; and
utilize, based on the assigned weight, the secondary indication of the location of the one or more users to provide a location-based service.

22. The method of claim 1, further comprising:
determining whether the secondary indication is a secondary indication of a historical location, wherein the secondary indication is the historical location secondary indication if a time or time window defined for the secondary indication is at least a predefined amount of time prior to a current time.

23. The method of claim 22, further comprising:
generating an anonymous user record when the secondary indication is historical.

* * * * *